(12) United States Patent
Koksal et al.

(10) Patent No.: US 10,646,870 B2
(45) Date of Patent: May 12, 2020

(54) MICROFLUIDIC DEVICE AND SYSTEM USING ACOUSTIC MANIPULATION

(71) Applicant: CYTONOME/ST, LLC, Bedford, MA (US)

(72) Inventors: Erin Koksal, Cambridge, MA (US); Jack Lapidas, Southborough, MA (US); Jeanne Tanner, Winchester, MA (US)

(73) Assignee: CYTONOME/ST, LLC, Bedford, MA (US)

( * ) Notice: Subject to any disclaimer, the term of this patent is extended or adjusted under 35 U.S.C. 154(b) by 132 days.

(21) Appl. No.: 15/852,430

(22) Filed: Dec. 22, 2017

(65) Prior Publication Data

US 2018/0214874 A1 Aug. 2, 2018

Related U.S. Application Data

(63) Continuation of application No. PCT/US2016/039014, filed on Jun. 23, 2016.
(Continued)

(51) Int. Cl.
*B01L 3/00* (2006.01)
*G01N 35/00* (2006.01)
(Continued)

(52) U.S. Cl.
CPC ... *B01L 3/502761* (2013.01); *B01L 3/502776* (2013.01); *G01N 15/1404* (2013.01);
(Continued)

(58) Field of Classification Search
CPC ... B01L 3/00; G01N 1/00; G01N 1/10; G01N 35/00; G01N 33/48
(Continued)

(56) References Cited

U.S. PATENT DOCUMENTS 6,159,739 A 12/2000 Weigl et al.
6,990,849 B2 1/2006 Bohm et al.
(Continued)

FOREIGN PATENT DOCUMENTS

EP 2145687 A1 1/2010
WO 2012/135663 A2 10/2012
WO 2013/191772 A1 12/2013

OTHER PUBLICATIONS

International Search Report for Application No. PCT/US2016/039014, dated Oct. 12, 2016. 3 pages.
(Continued)

*Primary Examiner* — Brian J. Sines
(74) *Attorney, Agent, or Firm* — McCarter & English, LLP; David R. Burns

(57) ABSTRACT

A microfluidic chip assembly having a plurality of microfluidic flow channels is provided. Each channel has a switching region. The microfluidic chip may further include at least one surface acoustic wave generator configured to generate a pressure pulse in the switching regions of the channels to selectively deflect particles in the flow. Attenuation elements and/or channel configurations may be used to prevent acoustic signals from interfering with neighboring switching regions. Alternatively, a microfluidic particle processing system may include a microfluidic chip assembly, a particle processing instrument, and a coupling element. The surface acoustic wave generator may be provided on the particle processing instrument. The microfluidic chip assembly may be configured for operative engagement, via the coupling element, with the particle processing instrument. The coupling element may transmit acoustic energy from the surface acoustic wave generator to the switching regions and/or to focusing regions of the flow channels.

20 Claims, 35 Drawing Sheets

Related U.S. Application Data

(60) Provisional application No. 62/184,526, filed on Jun. 25, 2015.

(51) Int. Cl.
*G01N 33/48* (2006.01)
*G01N 1/00* (2006.01)
*G01N 1/10* (2006.01)
*G01N 15/14* (2006.01)
*G01N 29/22* (2006.01)
*G01N 15/10* (2006.01)

(52) U.S. Cl.
CPC ......... *G01N 15/1484* (2013.01); *G01N 29/22* (2013.01); *B01L 2200/0636* (2013.01); *B01L 2200/0652* (2013.01); *B01L 2300/0816* (2013.01); *B01L 2300/0864* (2013.01); *B01L 2400/0436* (2013.01); *B01L 2400/0496* (2013.01); *G01N 2015/1006* (2013.01); *G01N 2015/142* (2013.01); *G01N 2015/149* (2013.01)

(58) Field of Classification Search
USPC ...................... 422/502, 503; 436/43, 63, 180
See application file for complete search history.

(56) References Cited

U.S. PATENT DOCUMENTS

| | | |
|---|---|---|
| 7,942,568 B1 | 5/2011 | Branch et al. |
| 8,573,060 B2 * | 11/2013 | Huang ...................... C02F 1/76 |
| | | 73/570.5 |
| 9,695,390 B2 | 7/2017 | Weitz et al. |
| 2007/0140041 A1 | 6/2007 | Sparey-Taylor et al. |
| 2009/0178716 A1 | 7/2009 | Kaduchak et al. |
| 2010/0078384 A1 | 4/2010 | Yang |
| 2010/0139377 A1 | 6/2010 | Huang et al. |
| 2012/0009025 A1 | 1/2012 | Gilbert et al. |
| 2012/0088295 A1 | 4/2012 | Yasuda et al. |
| 2012/0138152 A1 | 6/2012 | Villarruel et al. |
| 2012/0196314 A1 | 8/2012 | Nawaz et al. |
| 2012/0301883 A1 | 11/2012 | Pagano et al. |
| 2013/0043170 A1 | 2/2013 | Rose et al. |
| 2013/0192958 A1 * | 8/2013 | Ding ..................... B07C 5/3427 |
| | | 198/617 |
| 2013/0213488 A1 | 8/2013 | Weitz et al. |
| 2014/0008307 A1 | 1/2014 | Guldiken et al. |
| 2014/0033808 A1 * | 2/2014 | Ding ..................... G01N 29/02 |
| | | 73/61.75 |
| 2014/0318645 A1 * | 10/2014 | Koksal ..................... F17D 1/08 |
| | | 137/559 |
| 2015/0094219 A1 | 4/2015 | Trowell et al. |

OTHER PUBLICATIONS

International Preliminary Report on Patentability for Application No. PCT/US2016/039014, dated Jan. 4, 2018. 10 pages.

Korean Office Action for Application No. 10-2018-7002444, dated Jul. 14, 2018. 7 pages.

* cited by examiner

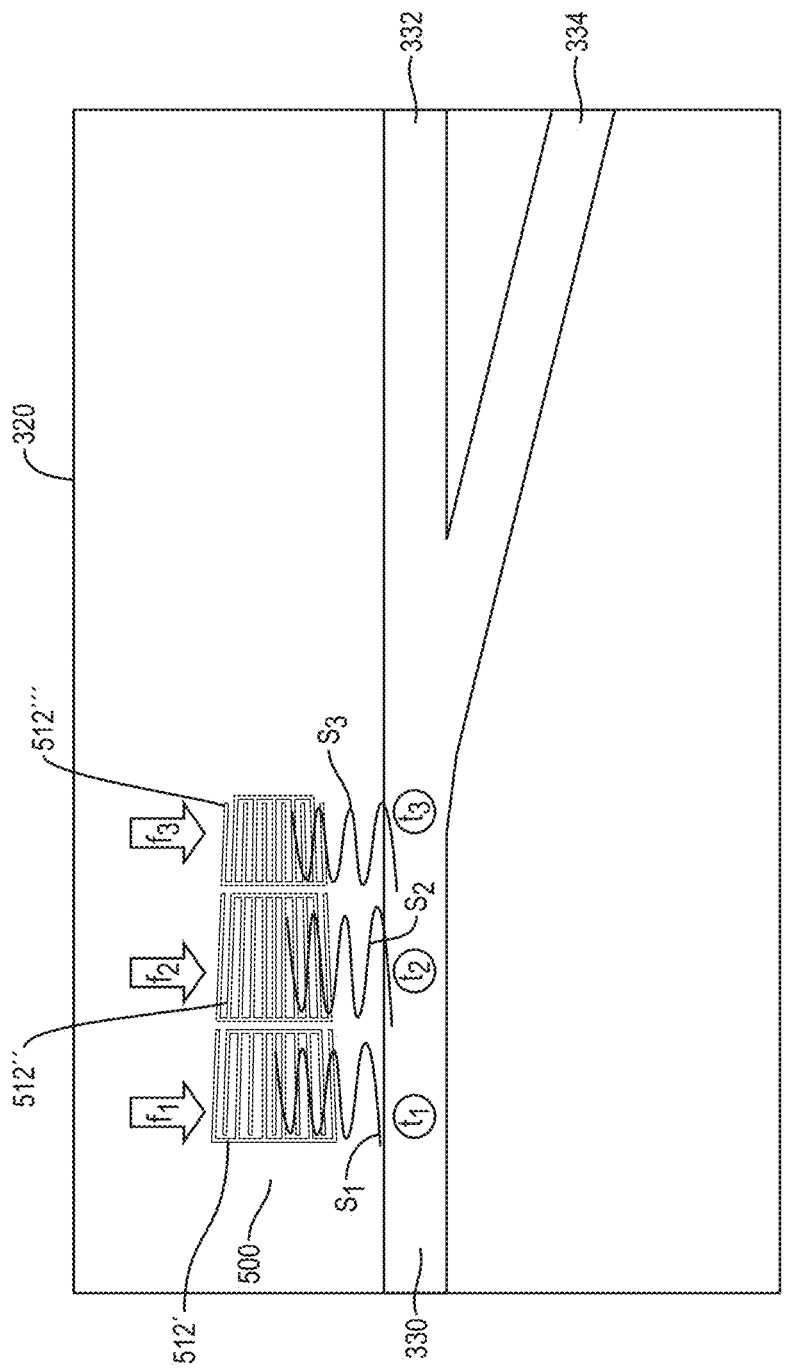

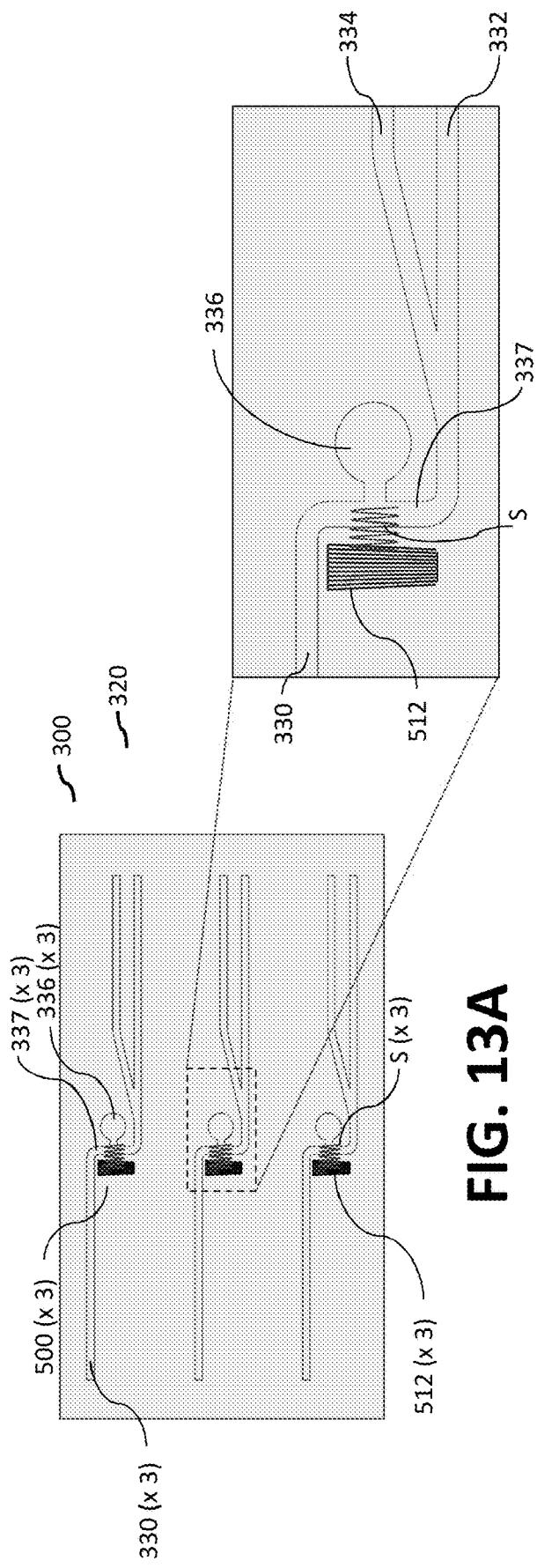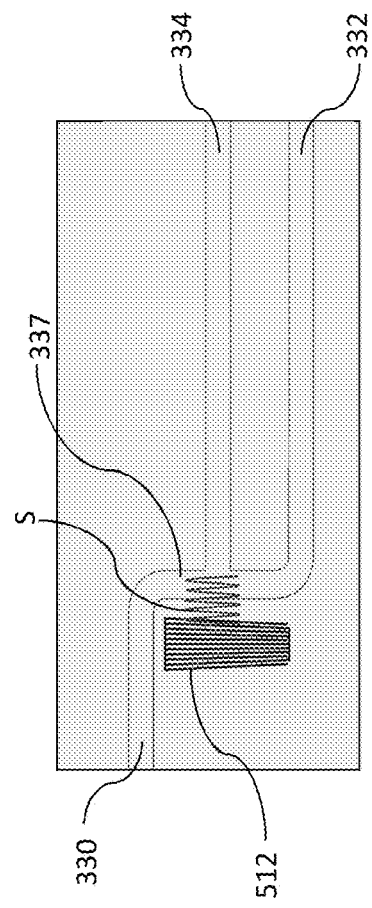
FIG. 13A
FIG. 13B

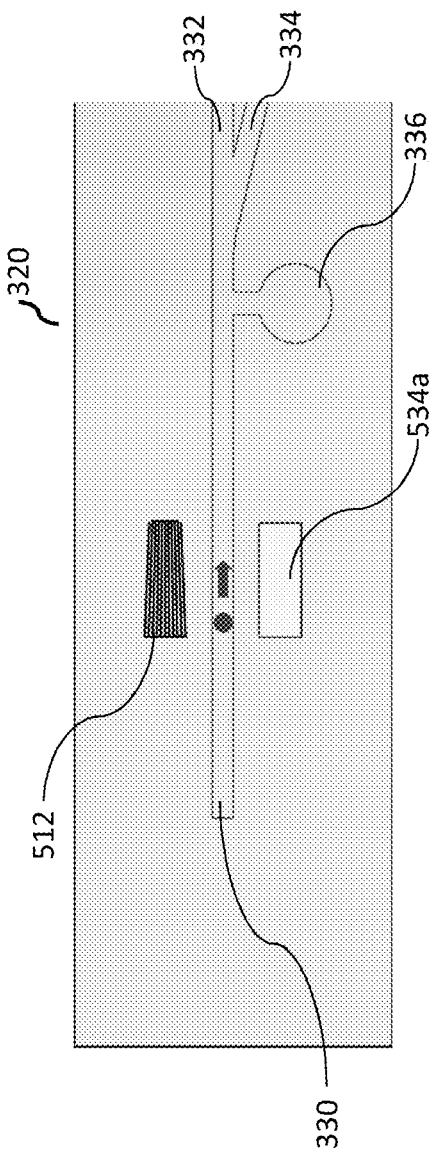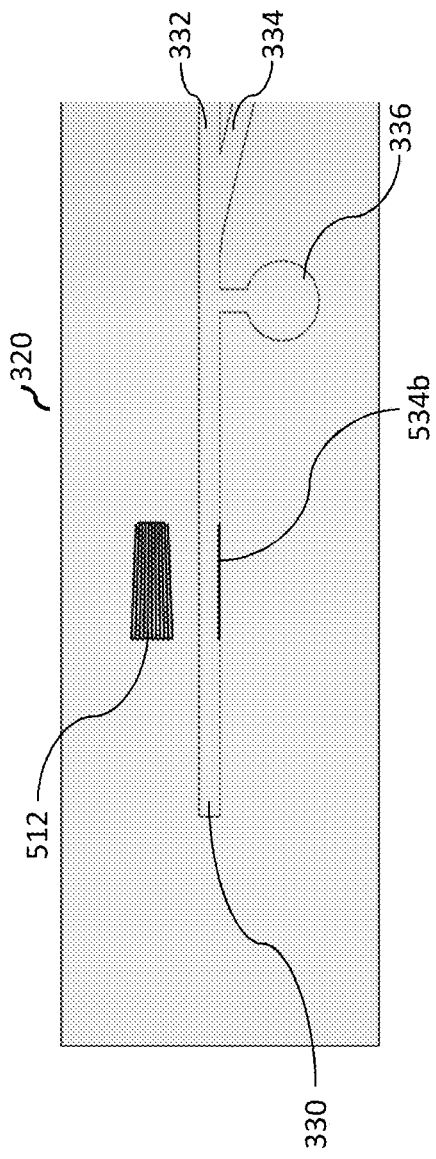
FIG. 17A
FIG. 17B

MICROFLUIDIC DEVICE AND SYSTEM USING ACOUSTIC MANIPULATION

CROSS-REFERENCE TO RELATED APPLICATIONS

This application is a continuation of International Patent Application PCT/US2016/039014, filed Jun. 23, 2016, which claims priority to and benefit of U.S. Provisional Patent Application No. 62/184,526, filed Jun. 25, 2015, the disclosures of each application listed above being incorporated herein by reference in their entirety.

TECHNICAL FIELD

Generally, this disclosure relates to acoustic manipulation of particles, droplets, and/or fluids in a microfluidic device. More particularly, this disclosure relates to acoustic manipulation of particles, droplets, and/or fluids in a microfluidic device using surface acoustic waves.

BACKGROUND

Particle separation is of great interest to many biological and biomedical applications. Hydrodynamic and bulk acoustic-based techniques have been used to focus sample core flows within sheath fluid. With respect to hydrodynamic focusing, conventional devices that have been employed to implement sheath flow have relatively complex designs and are relatively difficult to fabricate. Bulk acoustic wave (BAW) techniques, which may provide focusing of particles based on size and density in microfluidic chips, typically require that the microfluidic channels be formed of a material having excellent acoustic reflection properties (such as silicon and glass). Unfortunately, some less expensive, more commonly used, polymeric materials generally do not have such excellent acoustic reflection properties. Moreover, BAW transducers may be bulky.

More recently, surface acoustic wave (SA techniques have been developed to focus, manipulate and/or separate particles flowing within microfluidic channels. A SAW preferentially travels along the surface of a material rather than through the bulk of the material (generally, the amplitude of the acoustic wave decays exponentially transverse to the surface of the material). "Leakage" of SAWs into the fluid within the microfluidic channel results in pressure gradients in the fluid and/or streaming of the fluid. Acoustic particle manipulation may be applied to virtually any type of particle as it does not depend on the charge, polarity or labeling of the particles.

In general, surface acoustic waves propagate along a stress-free plane surface of an elastic solid substrate. Surface acoustic waves have an essentially exponential decay of amplitude into the substrate and therefore most of the displacement of the substrate occurs within about one wavelength of the surface.

A surface acoustic wave may be generated using an inter-digitated transducer (IDT) supported by a piezoelectric substrate. The transducer may be formed of two comb-shaped electrodes having interlocking teeth or fingers. An IDT converts periodically-varying electrical signals into mechanical vibrations or acoustic waves able to travel along the surface of a material. The frequency of the SAW generated by an IDT may be controlled by controlling the periodic spacing of the teeth or fingers of the IDT. As a non-limiting example, a piezoelectric substrate may be formed of a ferroelectric material such as lithium niobate.

SAW techniques may involve standing surface acoustic waves (SSAW) or travelling or streaming surface acoustic waves (TSAW). For example, a SSAW may be generated using a pair of IDTs that may be placed on the substrate on opposite sides of the microfluidic channel, with a particle focusing region being defined between the SSAW generators, The SSAW induces standing pressure waves, i.e., pressure forces or gradients associated with nodes or antinodes, within the fluid in the particle focusing region, and these gradients may be used to manipulate suspended particles.

U.S. Pat. No. 8,573,060 to Huang et al. discloses a microfluidic device wherein particles associated with a sample flowing within a channel are concentrated within a particle focus region of the channel by the effects of the SSAW. Referring to prior art FIG. 1 (taken from U.S. Pat. No. 8,573,060) a standing surface acoustic wave focusing device is schematically illustrated as a pair of IDTs deposited on a piezoelectric substrate and a microfluidic channel formed in a layer bonded to the substrate and positioned between the two IDTs. The pair of IDTs 18, 20 generates interfering surface acoustic waves, thereby creating a standing surface acoustic wave with pressure nodes (or anti-nodes) within the channel 10. Particles 12 suspended within a fluid medium 13 flowing within the channel 10 are focused to a narrow particle stream 14 at a pressure node located at the center of the channel as they flow through the particle focusing region. The lower portion of FIG. 1 schematically illustrates an enlarged cross section of the microfluidic channel to show how the standing surface acoustic wave pressure field inside the channel induces particles to collect at the pressure node. U.S. Pat. No. 8,573,060, issued Nov. 5, 2013 (U.S. Ser. No. 12/631,059) is incorporated by reference herein in its entirety.

US Patent Publication No. 2013/0213488 to Weitz et al. discloses a microfluidic device for sorting droplets or particles using TSAW. As with U.S. Pat. No. 8,573,060, US 2013/0213488 discloses that the surface acoustic waves may be created using a surface acoustic wave generator such as an IDT coupled to a material such as a piezoelectric substrate. However, in contrast to U.S. Pat. No. 8,573,060, US 2013/0213488 does not use the IDT to create interfering surface acoustic waves and a concomitant standing surface acoustic wave (SSAW), but rather to create traveling surface acoustic waves (TSAW). Referring to prior art FIG. 2 (taken from US 201310213488), the TSAW propagates on the surface of a piezoelectric substrate (1) and leaks into the fluid within the microfluidic channel (4) as a longitudinal wave. This leaked longitudinal wave causes acoustic streaming as a result of the compressibility of the bulk fluid. Particles located within the plug or droplet of acoustically streamed bulk fluid may be moved with the droplet. By controlling the applied voltage to the DT, streaming of the fluid within the microfluidic channel may be generated and used to individually direct or sort selected droplets within the microfluidic channel to particular channels or regions. As such, the traveling surface acoustic wave may act as a particle switch on a particle-by-particle basis. In FIG. 2, the SAW is shown additionally coupled to the microfluidic channel (4) via a water/glass coupling region. The SAW traveling along the piezoelectric substrate (1) is refracted as a longitudinal wave into a layer of water (2) and is subsequently refracted as a transverse wave into a layer of glass (3). At the top of the glass layer (3), the wave is refracted again, entering the water-filled channel (4) and causing acoustic streaming as indicated. US Patent Publication No.

2013/0213488 (U.S. Ser. No. 13/818,146, filed Aug. 23, 2011) is incorporated by reference herein in its entirety.

US Patent Publication No. 2014/0008307 to Guldiken et al. discloses a two-stage microfluidic device for focusing and separating particles flowing within a channel using standing surface acoustic waves. The two-stage microfluidic device has both a particle focusing stage and a particle separating stage, which is located downstream of the particle focusing stage. The particle focusing stage includes a pair of IDTs that generate a standing surface acoustic wave for focusing particles to a single pressure node (or anti-node) in the center of the channel, similar to the SSAW of U.S. Pat. No. 8,573,060. The particle separating stage includes a second pair of IDTs that also generates a standing surface acoustic wave. However, in this particle separating stage, the SSAW forms a periodic distribution of a plurality of pressure nodes and anti-nodes within the channel, thereby dividing the particles as they flow along a length of the channel into a plurality of particle streams aligned with the plurality of nodes or anti-nodes. The particles may be segregated based on their volume, density, compressibility or other acoustic contrast factor. Downstream of the particle separating stage, the various segregated streams of particles may flow into multiple collection outlets that are aligned with the streams. Guldiken also describes a method for fabricating and integrating the two-stage microfluidic device for focusing and separating particles flowing within a channel using IDTs to generate standing surface acoustic waves. US Patent Publication No. 2014/0008307 (U.S. Ser. No. 14/007,483, filed Mar. 30, 2012) is incorporated by reference herein in its entirety.

IDTs that are tunable have also been developed. US Patent Publication No. 2013/0192958 to Ding et al. discloses variable frequency or "chirp" IDTs having a gradient in their finger period, allowing them to resonate over a range of frequencies when the input frequency is varied. By varying the input frequency of a single pair of chirp IDTs, the pressure nodes may be generated at different locations across a microfluidic channel, such that depending upon the selected input frequency, particles flowing within the channel may be directed to a specific collection channel. In another embodiment, orthogonally positioned pairs of chirp IDTs may create SSAWs having pressure nodes (or anti-nodes), the location of which can be precisely adjusted by varying the input frequency to the IDTs. US Patent Publication No. 2013/0192958 (U.S. Ser. No. 13/755,865, filed Jan. 31, 2013) is incorporated by reference herein in its entirety.

US Patent Publication No. 2014/0033808 to Ding et al. discloses a pair of IDTs for creating a SSAW having a pressure node (or anti-node) that is obliquely aligned with the longitudinal axis of the flow channel. Thus, certain particles traveling down the channel will be repositioned within the channel due to the acoustic radiation forces created by the obliquely aligned pressure nodes (or anti-nodes). US Patent Publication No. 2014/0033808 (U.S. Ser. No. 13/995,709, filed Jul. 31, 2013) is incorporated by reference herein in its entirety.

PCT Publication WO 2014/004630 to Weitz et al. discloses using a pair of IDTs to create a "traveling" or "shifting" standing surface acoustic wave (TSSAW). U.S. Pat. No. 8,573,060, discussed above, employs a pair of IDTs, each generating a surface acoustic wave having the same frequency as the other, such that the interference of these surface acoustic waves creates stationary pressure nodes or antinodes. WO 2014/004630 discloses employing a pair of IDTs wherein each generates a surface acoustic wave having a frequency that slightly differs from the other. This slight mismatch in frequency creates standing waves having pressure nodes that slowly shift or move toward one of the pair of IDTs. PCT Publication WO 2014/004630 (Application No. PCT/US2013/047829 filed Jun. 26, 2013) is incorporated by reference herein in its entirety.

None of the above-cited documents disclose the use of SAW techniques for multiple channels provided on a single chip.

SUMMARY

According to aspects of the disclosure, a microfluidic particle processing chip assembly may include a substrate, a plurality of flow channels formed in the substrate, and a plurality of switching surface acoustic wave generators formed on the substrate. Each flow channel may include a focusing region for focusing a flow of particles within the flow channel, an interrogation region at least partially downstream of the focusing region, and a switching region at least partially downstream of the interrogation region. Each switching surface acoustic wave generator may be associated with at least one of the plurality of flow channels and configured to generate a surface acoustic wave in the substrate and a pressure pulse in the flow in the switching region of the flow channel. The microfluidic chip assembly may further include a plurality of attenuation elements formed on the substrate, wherein each attenuation element may be associated with one of the plurality of switching surface acoustic wave generators and be configured to attenuate the transmission of the surface acoustic wave through the substrate.

According to other aspects, a microfluidic particle processing chip assembly may include a substrate having a flow channel formed in the substrate and at least one switching surface acoustic wave generator formed on the substrate. The flow channel may have a switching region and the at least one switching surface acoustic wave generator formed on the substrate may be associated with the switching region of the flow channel. The at least one switching surface acoustic wave generator may be configured to generate a plurality of surface acoustic waves in the substrate and plurality of pressure pulses in the flow in the switching region of the flow channel. The plurality of surface acoustic waves may be sequentially generated and the plurality of pressure pulses may be longitudinally spaced along the flow channel. Further, the at least one switching surface acoustic wave generator may be configured to generate a plurality of surface acoustic waves having different frequencies.

According to some aspects, a microfluidic particle processing chip assembly may include a substrate, at least one flow channel formed in the substrate, and a switching surface acoustic wave generator formed on the substrate. The flow channel may have an interrogation region, a switching region and a first branch channel. The flow within the interrogation region may have a first flow direction and flow within the first branch channel may have a branch flow direction. The switching surface acoustic wave generator may be associated with the switching region of the flow channel and may be configured to selectively generate a surface acoustic wave in the substrate and a pressure pulse in the flow in the switching region of the flow channel. The generated surface acoustic wave may be substantially aligned with the branch flow direction of the branch channel. Alternatively and/or additionally, the surface acoustic wave may be substantially aligned with the first flow direction within the interrogation region. Further, the substrate may include a plurality of substantially identical flow channels, and the switching surface acoustic wave generator may be configured to selectively generate a surface acoustic wave in the substrate for each of the plurality of flow channels.

According to certain aspects, a microfluidic particle processing chip assembly may include a substrate having a flow channel formed in the substrate and a switching surface acoustic wave generator formed on the substrate. The flow channel may include a focusing region for focusing a flow of particles within the flow channel, an interrogation region at least partially downstream of the focusing region, and a switching region at least partially downstream of the interrogation region. The switching surface acoustic wave generator may be associated with the flow channel and configured to generate a surface acoustic wave in the substrate and a pressure gradient in the flow in the switching region of the flow channel. For example, the switching surface acoustic wave generator may generate a pressure gradient in the flow channel associated with a standing surface acoustic wave (SSAW) and/or with a traveling standing surface acoustic wave (TSSAW). Acoustic radiation forces exerted on the particles within the microfluidic channel due to the pressure gradients may move the particles from areas of higher pressure to lower pressure (nodes and anti-nodes of the standing surface acoustic wave). Further, the substrate may include a plurality of substantially identical flow channels, and one or more switching surface acoustic wave generators may be configured to generate a surface acoustic wave in the substrate for each of the plurality of flow channels.

According to yet other aspects, a microfluidic particle processing system may include a microfluidic chip assembly and a particle processing instrument. The microfluidic chip assembly may include a chip substrate provided with a plurality of flow channels formed in a substrate. Each flow channel may have a focusing region for focusing a flow of particles within the flow channel, an inspection region at least partially downstream of the focusing region, and a switching region at least partially downstream of the inspection region. The particle processing instrument may include a switching surface acoustic wave generator assembly formed on a switching substrate associated with the instrument and configured to generate at least one surface acoustic wave in the switching substrate. The microfluidic chip assembly may be configured for operative engagement via the at least one switching coupling element with the particle processing instrument, wherein the operative engagement may provide for transmission of acoustic energy from the switching surface acoustic wave generator assembly to at least one switching region of at least one flow channel. The transmitted acoustic energy may generate a pressure pulse or a pressure gradient in the flow in the switching region of the flow channel. The microfluidic chip assembly further may be configured for disengagement from the particle processing instrument. Additionally, the switching surface acoustic wave generator assembly may include a plurality of switching surface acoustic wave actuators.

A switching coupling element may be provided to transmit the acoustic energy from the switching surface acoustic wave generator assembly to the microfluidic chip assembly. The switching coupling element may be conformable and may include a fluid or a gel. Alternatively, the switching coupling element may include a reversibly solidifying and liquefying epoxy. Further, a switching transmissive element, such as a projecting element integrally provided with a superstrate layer of the microfluidic chip assembly, may be provided to direct the acoustic energy from the switching surface acoustic wave generator assembly to at least one switching region of at least one flow channel.

The surface of the switching substrate along which the surface acoustic waves travel may be planar or non-planar, e.g., curved or twisted.

The particle processing instrument further may include a focusing surface acoustic wave generator assembly formed on a focusing substrate associated with the particle processing instrument and configured to generate a surface acoustic wave in the focusing substrate and a standing pressure wave in the flow in the focusing region of the flow channel.

The microfluidic chip further may include a plurality of attenuation elements formed on the chip substrate. Each attenuation element may be associated with one of the plurality of flow channels and configured to attenuate the transmission of the switching surface acoustic wave through the chip substrate.

The microfluidic chip assembly may be provided as a component of a fluidically sealed cartridge.

According to certain aspects, a particle processing system may include a microfluidic sort module having a branched flow-channel configured to receive a stream of particles and a particle sorter configured to selectively sort particles between a first output branch channel and a second output branch channel of the branched flow-channel; and a sort monitoring system configured to monitor the performance of a sorting operation by determining a statistically-based characteristic of a sorted sample, wherein the sort monitoring system is configured to real-time evaluate the statistically-based characteristic of the sorted sample, and wherein the sorting monitoring system includes a switching optimization algorithm. The particle processing system may include a programmable controller responsive to an output of the sort monitoring system. The programmable controller may be configured to control one or more operations of the particle processing system based on a statistically-based characteristic of the sorted sample. For example, the programmable controller may be configured to adjust one or more input drive signals applied to a switching mechanism in order to align the actual sort performance with the desired sort performance.

Certain embodiments of the disclosed apparatus and methods are summarized below. These embodiments are not intended to limit the scope of the disclosure, but rather serve as descriptions of exemplary embodiments. The claims may encompass a variety of forms and embodiments which differ from these summaries.

BRIEF DESCRIPTION OF THE DRAWINGS

Exemplary embodiments of the present disclosure are further described with reference to the appended figures.

FIG. 11B schematically illustrates a top view of a switching region of a microfluidic channel according to a variation of the embodiment of FIG. 11A.

FIG. 13A schematically illustrates a perspective view of a portion of a microfluidic chip, with an enlarged view of a switching region, according to further aspects of the disclosure;

FIG. 13B schematically illustrates a top view of a portion of a microfluidic chip according to a variation of the embodiment of FIG. 13A.

FIG. 17A schematically illustrates a top view of a focusing region of a microfluidic channel according to other aspects of the disclosure; FIG. 17B schematically illustrates a top view of a focusing region of a microfluidic channel according to a variation of the embodiment of FIG. 17A.

Figure 1:
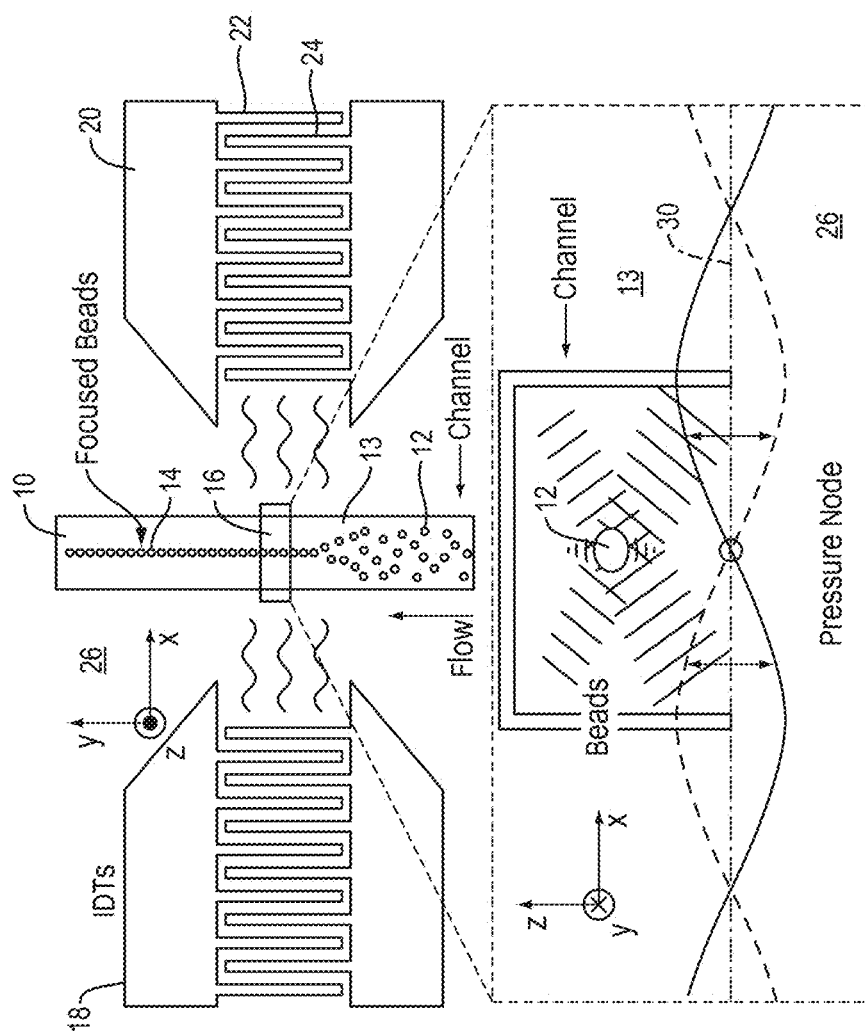
FIG. 1 schematically illustrates, with both a top view and an enlarged side view, a prior art standing surface acoustic wave focusing device.
Figure 2:
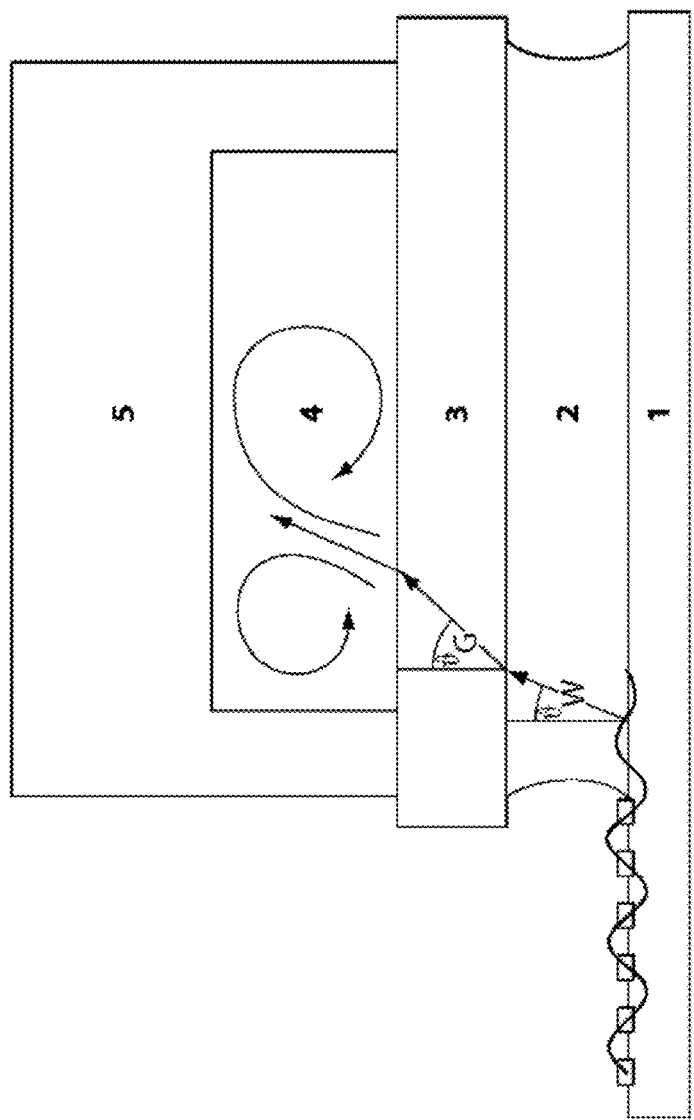
FIG. 2 schematically illustrates a prior art traveling surface acoustic wave focusing device.

While the present disclosure may be embodied with various modifications and alternative forms, specific embodiments are illustrated in the figures and described herein by way of illustrative examples. It should be understood the figures and detailed descriptions are not intended to limit the scope of the claims to the particular form disclosed, but that all modifications, alternatives, and equivalents falling within the spirit and scope of the claims are intended to be covered.

DETAILED DESCRIPTION

A microfluidic particle analysis and/or sorting system incorporating a microfluidic chip or other flow cell, in accordance some embodiments, may have a wide variety of applications as a therapeutic medical device enabling cell-based therapies, such as blood transfusion, bone marrow transplants, and/or mobilized peripheral blood implants. Embodiments of microfluidic systems may be capable of analyzing, processing and/or selecting particles based on intrinsic characteristics as determined, for example, by interaction of electromagnetic radiation or light with the cells (e.g., scatter, reflection, and/or auto fluorescence) independent of protocols and necessary reagents. According to some preferred embodiments, a microfluidic system may employ a closed, sterile, disposable cartridge including a microfluidic chip or other flow cell, such that all surfaces that come into contact with the sample fluid are isolated from the user and/or from the non-disposable instrument. Ideally, a microfluidic system analyzes and/or processes particles at high speeds. Ideally, a microfluidic sorting system also delivers sorted particles with high yield, high purity, and high efficacy.

Certain embodiments described herein relate to systems and methods for manipulating particles in a flow channel and, in particular, in a micro channel in microfluidic devices.

As used herein, the term "particles" includes, but is not limited to, cells (e.g., blood platelets, white blood cells, tumorous cells, embryonic cells, spermatozoa, etc.), organelles, and multi-cellular organisms. Particles may include liposomes, proteoliposomes, yeast, bacteria, viruses, pollens, algae, or the like. Additionally, particles may include genetic material, RNA, DNA, fragments, proteins, etc. Particles may also refer to non-biological particles. For example, particles may include metals, minerals, polymeric substances, glasses, ceramics, composites, or the like. Particles may also refer to synthetic beads (e.g., polystyrene), for example, beads provided with fluorochrome conjugated antibodies.

As used herein, the term "microfluidic system" refers to a system or device including at least one fluidic channel having microscale dimensions. The microfluidic system may be configured to handle, process, detect, analyze, eject, and/or sort a fluid sample and/or particles within a fluid sample. The term "channel" as used herein refers to a pathway formed in or through a medium or substrate that allows for movement of fluids, such as liquids and gases. The term "micro channel" refers to a channel, preferably formed in a microfluidic system or device, having cross-sectional dimensions in the range between about 1.0 µm and about 2000 µm, preferably between about 25 µm and about 500 µm, and most preferably between about 50 µm and about 300 µm. One of ordinary skill in the art will be able to determine an appropriate volume and length of the micro channel for a desired application. The ranges above are intended to include the above-recited values as upper or lower limits. In general, a micro channel may have any selected cross-sectional shape, for example, U-shaped, D-shaped, rectangular, triangular, elliptical/oval, circular, square, trapezoidal, etc. cross-sectional geometries. The geometry may be constant or may vary along the length of the micro channel. Further, a micro channel may have any selected arrangement or configuration, including linear, non-linear, merging, branching, looped, twisting, stepped, etc. configurations. A microfluidic system or device, for example, a microfluidic chip, may include any suitable number of micro channels for transporting fluids. A microfluidic chip may be provided as part of a disposable cartridge for removable engagement with a microfluidic instrument. Further, a microfluidic chip may be provided as part of a disposable cartridge, wherein the disposable cartridge is a completely enclosed and sealed or sealable fluidic channel system.

As used herein the terms "vertical," "lateral," "top," "bottom," "above", "below," "up," "down," and other similar phrases should be understood as descriptive terms providing general relationship between depicted features in the figures and not limiting on the claims, especially relating to flow channels and microfluidic chips described herein, which may be operated in any orientation.

Figure 3:
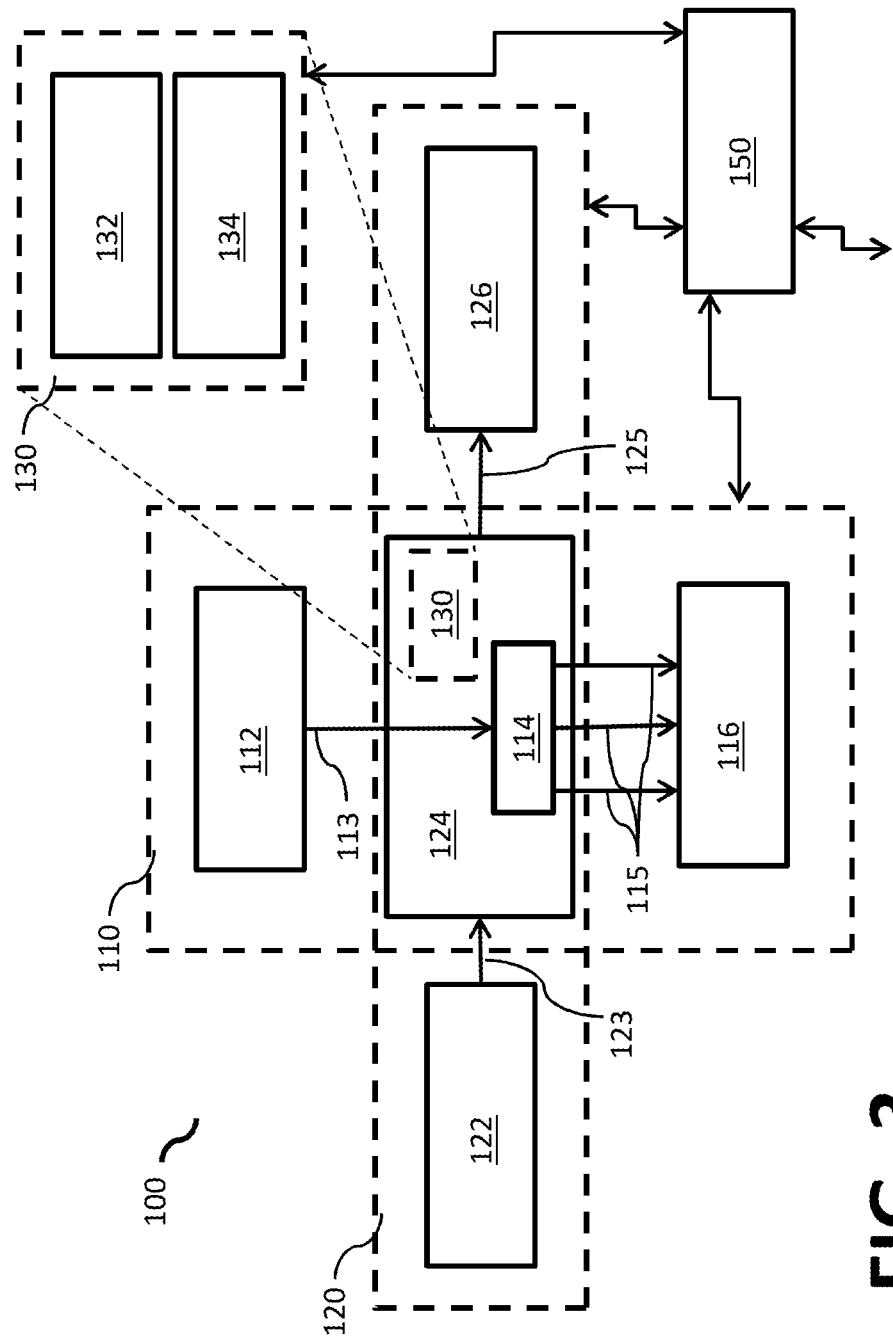
FIG. 3 schematically illustrates an exemplary particle processing system according to aspects of the present disclosure.

Referring now to the schematic of FIG. 3, a particle processing system 100 suitable for implementing an illustrative embodiment of the present disclosure is schematically shown. Particle processing system 100 may be configured, dimensioned or adapted for analyzing, sorting and/or processing (e.g., purifying, measuring, isolating, detecting, monitoring and/or enriching) particles (e.g., cells, microscopic particles, etc.). For example, system 100 may be a cytometer and/or a cell purification system or the like, although the present disclosure is not limited thereto. Rather, system 100 may take a variety of forms, and it is noted that the systems and methods described may be applied to other processing systems. Processing elements or components provided by system 100 may include transport channels, pumps, valves, mixing elements, temperature control elements, pressure control elements, droplet generators, incubation elements, wells, reagent coated surfaces or reagent storage elements, geometric physical structures (posts, guides, etc.), et al. These elements or components may reside on the microfluidic chip, the cartridge, and/or the instrument.

In exemplary embodiments, particle processing system 100 may be a microfluidic flow sorter particle processing system (e.g., a microfluidic chip based system) or the like. Aspects of exemplary microfluidic flow sorter particle processing systems and components or the like are disclosed, for example, in U.S. Pat. No. 8,529,161, "Multilayer Hydrodynamic Sheath Flow Structure" (Ser. No. 13/179,084); U.S. Pat. No. 8,277,764, "Unitary Cartridge for Particle Processing" (Ser. No. 11/295,183); U.S. Pat. No. 8,123,044, "Actuation of Parallel Microfluidic Arrays" (Ser. No. 11/800,469); U.S. Pat. No. 7,569,788, "Method and Apparatus for Sorting Particles" (Ser. No. 11/101,038); U.S. Pat. No. 7,492,522, "Optical Detector for a Particle Sorting System" (Ser. No. 11/906,621); U.S. Pat. No. 6,808,075, "Method and Apparatus for Sorting Particles" (Ser. No. 10/179,488); U.S. Pat.

No. 8,731,860, "Particle Processing Systems and Methods for Normalization/Calibration of Same" (Ser. No. 13/022, 525); U.S. Pat. No. 8,705,031, "Particle Sorting Apparatus and Method" (Ser. No. 13/363,112) and U.S. Pat. No. 8,553,229, "Fine Particle Optical Measuring Method in Fluidic Channels" to Shinoda (Ser. No. 12/259,235); and US Patent Publications Nos. 2012/0277902, "Method and Apparatus for Monitoring and. Optimizing Microfluidic Particle Sorting" (Ser. No. 13/342,756, filed Jan. 3, 2012); 2012/0307244, "Multiple Flow Channel Particle Analysis System" (Ser. No. 13/577,216, filed Aug. 3, 2012); 2013/0334407, "Large Area, Low F-Number Optical System" (Ser. No. 13/896,213, filed May 16, 2013); 2014/0085898, "Focal Plane Shifting System" (Ser. No. 14/029,485, filed Sep. 17, 2013); 2014/0318645, "Hydrodynamic Focusing Apparatus and Methods" (Ser. No. 14/213,800, filed Mar. 14, 2014); 2014/0370536, "Assemblies and Methods for Reducing Optical Crosstalk in Particle Processing Systems" (Ser. No. 14/210,366, filed Mar. 13, 2104); and 2014/0309782, "Operatorless Particle Processing Systems and Methods" (Ser. No. 14/210,381, filed Mar. 13, 2104), all of which are incorporated herein by reference in their entireties.

Still referring to FIG. 3, in exemplary embodiments, particle processing system 100 may include a particle interrogation system 110, a fluidic system 120, and a particle manipulation system 130. System 100 may also include a control system 150.

Particle interrogation system 110 may include an illumination system 112 and a detection system 116. Illumination system 112 of interrogation system 110 may provide one or more signals 113 for interrogating particles that pass through an interrogation region 114. Detection system 116 of system 100 may receive one or more signals 115 that emanate from the interrogation region 114.

Fluidic system 120 may include a microfluidic channel assembly 124 configured to receive particles via one or more input fluid communication elements 123 from a particle source supply 122 and to send particles to a collection system 126 via one or more output fluid communication elements 125. Particle source supply 122 and/or collection system 126 may be provided as part of fluidic system 120 (as shown in FIG. 3) or may be supplied separately from and subsequently engaged to fluidic system 120. Particle interrogation region 114 may be included within microfluidic channel assembly 124. According to certain aspects, microfluidic channel assembly 124 may be provided as a microfluidic chip, which may be removably and fluidically engaged to the remainder of the fluidic system 120. According to certain aspects, the microfluidic chip may be disposable.

Figure 6A:
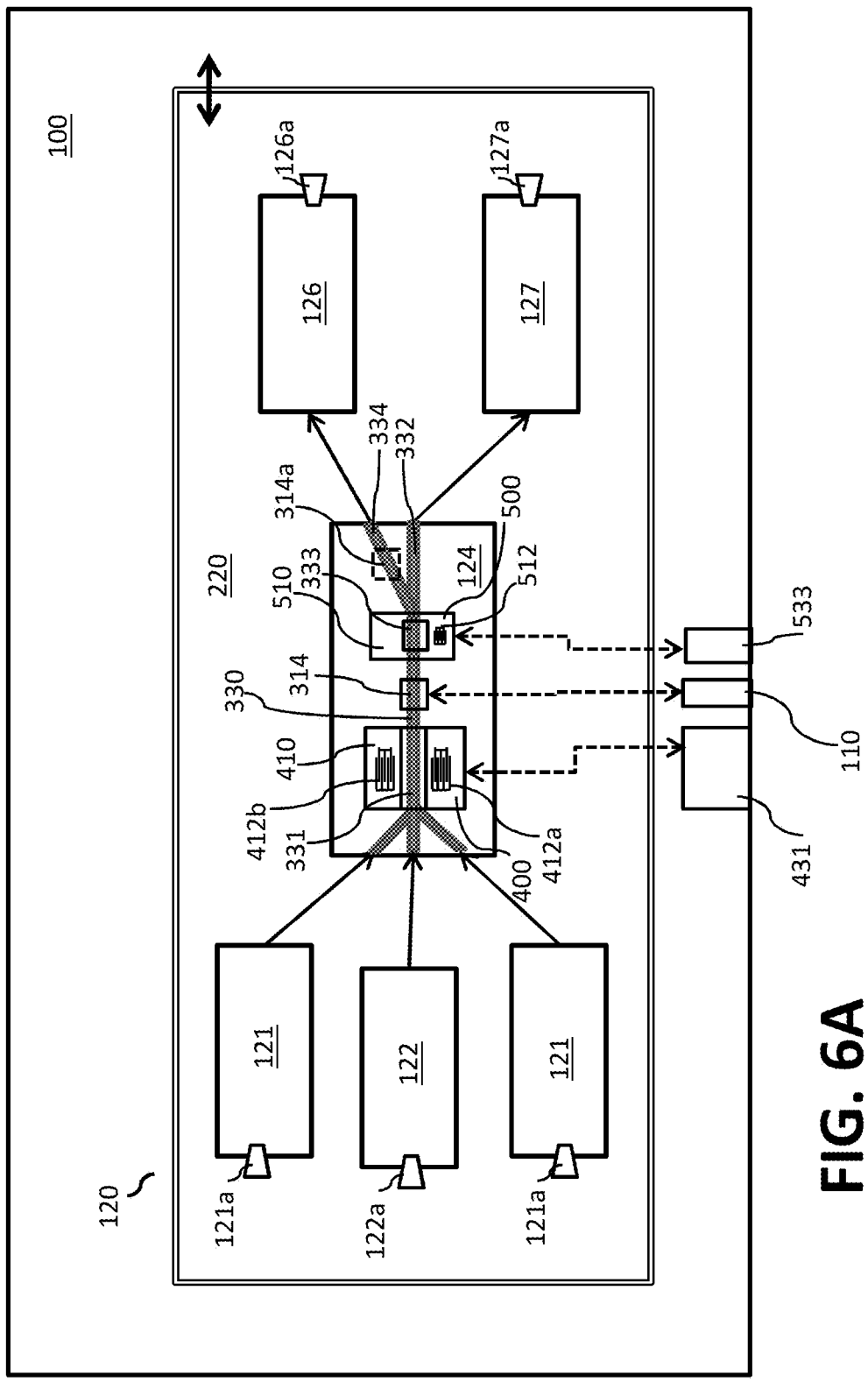
FIG. 6A schematically illustrates an exemplary fluidic system including a microfluidic chip operationally engaged to a cartridge and operationally engaged to a particle processing instrument according to aspects of the present disclosure.

Referring to FIG. 6A, according to other aspects, fluidic system 120 may be provided as a cartridge 220 enclosing all of the fluid contact surfaces used in the particle processing. During a particle processing operation, the cartridge 220 may be operationally engaged to the remainder of the particle processing system 100 without violating the enclosed and/or fluidically sealed nature of the cartridge 220 and of the fluid contact surfaces. Further, cartridge 220 may be removable from the remainder of the particle processing system 100 and disposable.

Referring back to FIG. 3, particle manipulation system 130 may include a particle focusing system 132. Particle focusing system 132 may entrain (e.g., focusing, aligning, separating, stabilizing, orienting, etc.) particles upstream of the interrogation region 114 in order to optimize or enhance the particle interrogation process. Particle manipulation system 130 may also include a particle switching system 134. Particle switching system 134 may be operative downstream of the interrogation region 114, such that particles having particular characteristics may be directed, deflected, switched etc. to a selected flow path. In certain embodiments, the particles may be directed to a selected flow path on a particle-by-particle basis.

Elements or components of the particle focusing system 132 and/or the particle switching system 134 may be included within microfluidic channel assembly 124. For example, particle focusing system 132 may include a hydrodynamic focusing region that is integrally formed with a microfluidic flow channel on a microfluidic chip. Optionally, particle focusing system 132 may include an inertial focusing region that is integrally formed with a microfluidic flow channel on a microfluidic chip. As another example, particle focusing system 132 may include one or more IDTs or other SAW generation devices for generating SAWs within microfluidic flow channels on a microfluidic chip. The IDT driver or SAW driver may be located off chip. Similarly, particle switching system 134 may include one or more IDTs for generating SAWs within microfluidic flow channels on a microfluidic chip and the IDT driver may be located off chip.

Control system 150 may receive signals from the particle interrogation system 110, from the fluidic system 120, from the particle manipulation system 130, and/or from external sources. Control system 150 may send or transmit signals to the particle interrogation system 110, to the fluidic system 120, to the particle manipulation system 130, and/or to external sources. Control system 150 may include separate or distributed control subsystems for controlling the particle interrogation system 110, the fluid system 120, the particle manipulation system 130, the overall particle processing operations, etc. Each of these separate control subsystems may interact (i.e., receiving and/or sending signals) with any of the other control subsystems.

Figure 4:
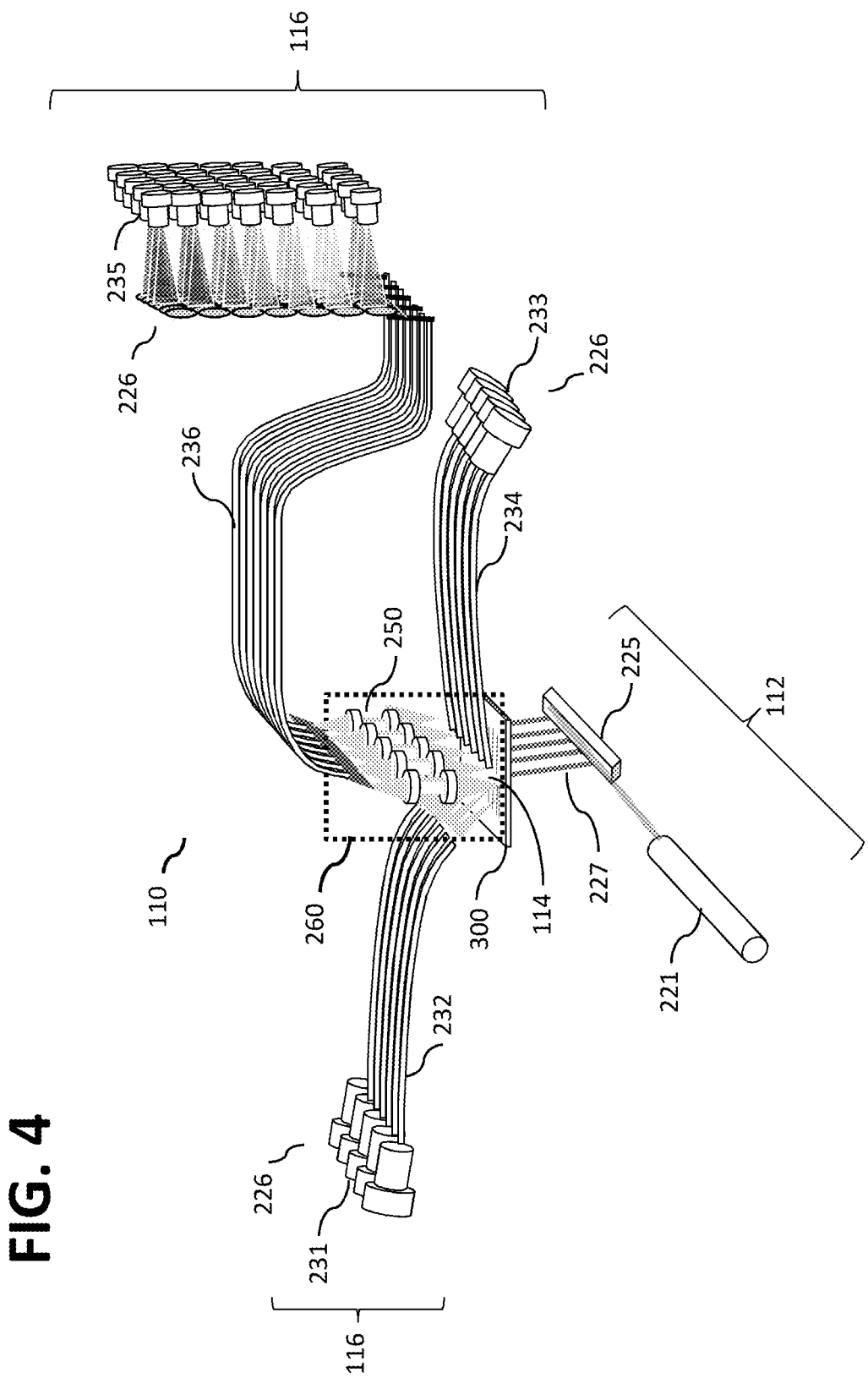
FIG. 4 schematically illustrates an exemplary particle interrogation system according to aspects of the present disclosure.

In the exemplary embodiment schematically shown in FIG. 4, a particle interrogation system 110, as may be provided as part of particle processing system 100, is illustrated as a multi-channel flow sorter particle processing system. Exemplary multi-channel flow sorter particle processing systems and components or the like are disclosed, for example, in US Patent Publication No. 2012/0307244 (Ser. No. 13/577,216; filed Aug. 3, 2012), "Multiple Flow Channel Particle Analysis System," the contents of which is hereby incorporated by reference in its entirety. Thus, according to certain aspects, microfluidic channel assembly 124 may be provided as a multi-channel microfluidic assembly 300 and particle interrogation system 110 may be configured to interrogate a plurality of particles simultaneously (or near simultaneously) flowing through a plurality of microfluidic flow channels formed within multi-channel microfluidic assembly 300. As one example, the particle interrogation system 110 may interrogate particles in the interrogation regions of the microfluidic channels sequentially (in a near simultaneous manner) by stepwise interrogation using one or more radiation sources and one or more detectors.

A receptacle or holder (not shown) may be provided for removably receiving the multi-channel microfluidic assembly 300. Further, the particle processing system 100 may include one or more stages for positioning and/or aligning the microfluidic channel assembly 124, the microfluidic assembly 300, and/or the cartridge 220 relative to the various components of particle interrogation system 110. The stages may allow for movement (translation and/or rotation) of the microfluidic channel assembly 124, the microfluidic assembly 300, and/or the cartridge 220 relative to the illumination system 112 and/or the detection system 116. Additionally, one or more stages may be provided to align the microfluidic assemblies 124, 300, 220 relative to the particle manipulation system 130, should the particle manipulation system 130 be separately provided on the microfluidic instrument.

In this specific embodiment, illumination system 112 may include at least one electromagnetic radiation or light source 221 (e.g., a laser source or the like) for illuminating at least a portion of an interrogation region 114. The electromagnetic radiation source 221 may be coupled to and/or in communication with beam shaping optics 225 (e.g., lenses, mirrors, filters, or the like) for producing and forming one or more beams of electromagnetic radiation (e.g., light) 227. Coupling elements may include fiber optics, wave guides, etc. Further, the one or more beams 227 may be used to interrogate a plurality of microfluidic flow channels simultaneously. The light source 221 may be provided as one or more monochromatic light sources and/or one or more polychromatic light sources. In general, the electromagnetic radiation source(s) 221 may have any suitable wavelength(s) appropriate for the specific application.

Detection system 116 may include a plurality of detector systems 226 configured for capturing signals associated with the sample flowing through or located within interrogation region 114. Further, detector systems 226 may monitor flow through a plurality of microfluidic flow channels simultaneously. In exemplary embodiments, detector systems 226 may be optical detector systems for inspecting individual particles for one or more particular characteristics, such as size, form, fluorescence, optical scattering, as well as other characteristics.

In some embodiments, the one or more radiation beams 227 may pass through a spatial filter, for example, an optical mask (not shown) aligned with a plurality of particle-conveying micro channels in the microfluidic assembly 300. The optical mask may take the form of an array of pinholes or slits (e.g., provided in an optically opaque layer) associated with the interrogation regions of the plurality of micro channels. Other spatial and/or spectral filter arrays may be provided in the illumination and/or detection paths of the particle interrogation system 110. For example, a masking system (using opaque regions and/or specific optical bandwidth filtered regions) may be provided to implement a multiplexing or modulating system in the emission and/or detection paths. Additionally, masking or other identification elements (e.g., barcodes) may be used to identify specific channels, chips, cartridges, or other features.

Examples of optical signals that may be produced in optical particle analysis, cytometry and/or sorting when a beam 227 intersects a particle include, without limitation, optical extinction, angle dependent optical scatter (forward and/or side scatter) and fluorescence. Optical extinction refers to the amount of electromagnetic radiation or light that a particle extinguishes, absorbs, or blocks. Angle dependent optical scatter refers to the fraction of electromagnetic radiation that is scattered or bent at each angle away from or toward the incident electromagnetic radiation beam. Fluorescent electromagnetic radiation may be electromagnetic radiation that is absorbed and/or scattered by molecules associated with a particle or cell and re-emitted at a different wavelength. In some instances, fluorescent detection may be performed using intrinsically fluorescent molecules.

In exemplary embodiments, detector systems 226 may include one or more detector assemblies to capture and observe the signals generated by the intersection of electromagnetic radiation beam 227 with a particle in a microfluidic flow channel. By way of non-limiting examples, detector systems 226 may include one or more extinction detector assemblies 231 for capturing extinction signals, one or more scatter detector assemblies 233 for capturing scatter signals, and one or more fluorescence detector assemblies 235 for capturing fluorescence signals. In a preferred embodiment, detector system 226 may include at least one extinction detector assembly 231, at least one scatter detector assembly 233, and at least one fluorescence detector assembly 235. Detector assemblies 231, 233, 235 may include one or more photomultipliers, photodiodes, cameras, or other suitable device(s).

According to certain aspects, interrogation system 110 may include one or more optical systems 250 for collecting, directing, transmitting, shaping, focusing, filtering, etc. the signals associated with the interrogation of the particles. Optical systems 250 may include one or more lenses, filters, mirrors, and/or other optical elements to collect, shape, focus, transmit, etc. the signal exiting the interrogation region 114 and being received by the detector assemblies 231, 233, 235. As a non-limiting example, a plurality of optical systems 250 may be provided as a micro-lens array 260. Optionally, fiber optics or other waveguide-type optical transmission elements 232, 234, 236 may be provided to direct the signals to the detector assemblies.

According to certain embodiments, a single detector or detector assembly may be associated with a plurality of interrogation sites (e.g., specific regions within each microfluidic flow channel and/or interrogation regions across multiple microfluidic flow channels) and thus, may receive signals (simultaneously, sequentially, overlapping, non-overlapping, etc.) from each of the plurality of interrogation sites. The detector assemblies may be connected to control electronics (not shown) to analyze the signals received from the detector assemblies and/or to control one or more aspects of the particle processing system 100. Additionally, signal processing systems designed to minimize crosstalk between the interrogation sites of the microfluidic flow channels, between the detector assemblies, between the excitation systems and/or between combined optical and electronic systems may be provided. Examples of such systems may be found in US2014/0370536, "Assemblies and Methods for Reducing Optical Crosstalk in Particle Processing Systems" (Ser. No. 14/210,366, filed Mar. 13, 2104).

As noted, particle processing system 100 may include a multi-channel microfluidic assembly 300. In the embodiment shown in FIG. 5, a multi-channel microfluidic assembly 300 may include a plurality of microfluidic flow channels 330 for conveying a fluidic sample including, for example, particles or cells, therethrough. Multi-channel microfluidic assembly 300 includes a particle interrogation region 114 that encompasses a plurality of particle interrogation sites 314, each particle interrogation site 314 associated with one of the microfluidic flow channels 330. In this particular embodiment, microfluidic assemble 300 includes 24 microfluidic flow channels 330 arranged in parallel.

In general, assembly 300 may include any suitable number of microfluidic flow channels 330 for transporting sample fluids and particles through assembly 300. Further, arrangements other than a parallel arrangement of the microfluidic flow channels 330 may be provided. In certain embodiments and as can be understood by those familiar with the art, multi-channel microfluidic assembly 300 may be provided as a combination of microfluidic chips, micro channels, cuvettes, capillaries, etc.

Figure 5:
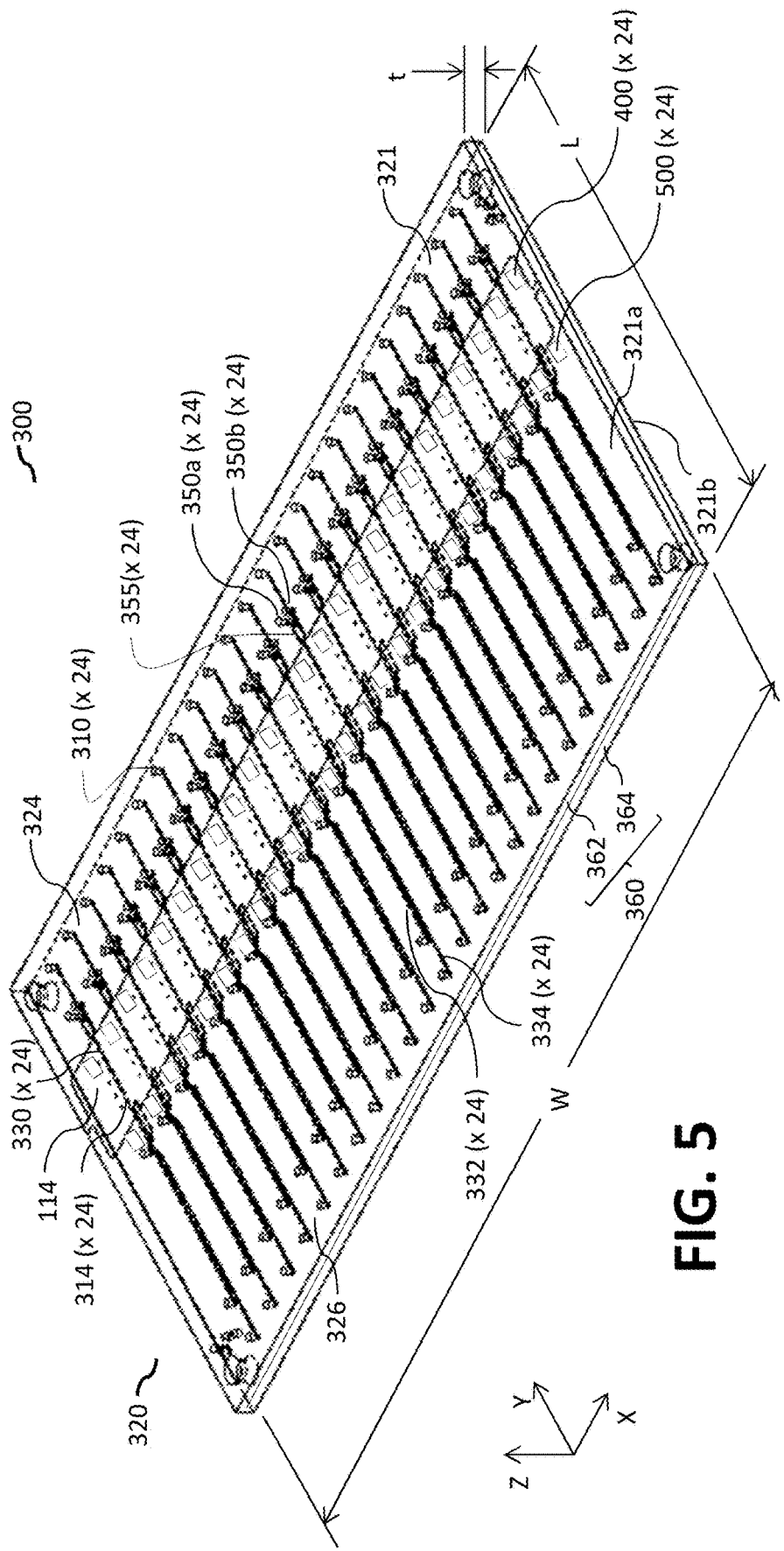
FIG. 5 illustrates, at least partially schematically, an exemplary microfluidic chip according to aspects of the present disclosure.

According to certain embodiments and still referring to FIG. 5, microfluidic assembly 300 may be configured as a microfluidic chip 320 and may include a substrate 321 having the plurality of channels 330 (e.g., micro channels) disposed or formed therein. The microfluidic channels 330 may be configured to transport fluid and/or particles through the microfluidic chip 320 for processing, handling, and/or performing any suitable operation on a liquid sample. For example, each micro channel 330 may be associated with a flow cytometer. Optionally, each micro channel 330 may be a micro-sorter.

Particles in channels 330 may be detected while flowing through the interrogation region 114. Within the interrogation region 114, individual particles may be inspected or measured for a particular characteristic, such as size, form, orientation, fluorescence intensity, etc. Interrogation region 114 may be illuminated through an upper surface 321a and/or a lower surface 321b of the substrate 321 that forms the microfluidic chip 320.

The plurality of channels 330 may be evenly distributed (i.e., evenly spaced) across the width W of the microfluidic chip 320. According to certain embodiments, a centerline-to-centerline spacing between the channels 330 may range from 0.2 mm to 5.0 mm. The centerline-to-centerline spacing between the micro channels 330 may be less than 4.0 mm, less than 3.0 mm, or even less than 1.0 mm. According to certain embodiments, the centerline-to-centerline spacing between the micro channels 330 may range from 2.5 mm to 3.0 mm. Advantageously, to minimize the footprint of the microfluidic chip 320, the centerline-to-centerline spacing between the micro channels 330 may be less than 2.0 mm, less than 1.5 mm, or even less than 1.0 mm. According to certain embodiments, the centerline-to-centerline spacing between the micro channels 330 may range from 0.7 mm to 1.2 mm.

In the embodiment illustrated in FIG. 5, the microfluidic chip 320 includes twenty-four microfluidic flow channels 330, although, in general, any number of flow channels 330 may be provided (e.g., as non-limiting examples, 2, 4, 8, 24, 36, 72, 144, or 288 channels). According to some embodiments, when microfluidic chip 320 has twenty-four microfluidic flow channels 330, the microfluidic chip 320 may have an overall width W ranging from 70 mm to 80 mm.

The substrate 321 may be provided as a substantially planar substrate, i.e., having a first dimension (e.g., thickness t) much less than its other two dimensions (e.g., length L and width W). Further, the substrate 321 of the microfluidic chip 320 may include first and second major plane surfaces: the upper surface 321a and the lower surface 321b. The substrate 321 of the microfluidic chip 320 may be formed with one or more substrate layers 360. As shown in FIG. 5, the substrate 321 may be formed by bonding or otherwise attaching an upper substrate layer 362 to a lower substrate layer 364. In general, any number of layers may be used to form microfluidic chip 320 with any number of materials forming these layers in whole or in part. Materials may be chosen for their acoustic, optical and electrical transmission characteristics, for their mechanical properties, and also for their manufacturing and formability characteristics.

The substrate layers 360 (including layers 362, 363, 364, 366) of the microfluidic chip 320 may be glass (e.g., UV fused-silica, quartz, borofloat, etc.), PolyDiMethylSiloxane (PDMS), PMMA, COC, thermoplastic elastomers (TPE), including styrenic TPE, or any other suitable material. According to some aspects, at least portions of a substrate layer may be acoustically transmissive, i.e., acoustically non-lossy. Materials having good acoustic transmission characteristics include, by way of non-limiting examples, silicon, glass, piezoelectric, substrates, etc. (i.e., materials having a relatively high modulus of elasticity). Materials with a low modulus of elasticity generally have acoustic attenuating characteristics. Materials for attenuating or dampening the transmission of an acoustic signal (i.e., acoustically lossy materials) may include air, rubber (natural and synthetic) and other elastomeric materials, low density polyethylene (LDPE), PDMS, etc. Additionally, certain materials may efficiently act as acoustic reflectors, for example, diamond layers, tungsten layers, or silicon or glass patterning. According to other aspects, it may be desirably to match acoustic impedances of adjacent materials transmitting acoustic energy from one material layer to the other. This impedance matching may be more important than minimizing acoustic transmission losses. Thus, in general, any material may be used for the various substrate layers, superstrate layers and other elements associated with transmitting or impeding acoustic energy.

The thickness of the first substrate layer 362 may range from approximately 100 μm up to approximately 1000 μm. In certain preferred embodiments, the thickness of substrate layer 362 may range from approximately 200 μm up to approximately 600 μm. For example, the thickness of substrate layer 362 may be approximately 400 μm. In other preferred embodiments, the thickness of substrate layer 362 may range from approximately 500 μm up to approximately 900 μm. By way of non-limiting examples, the thickness of substrate layer 362 may be approximately 700 μm or approximately 750 μm. In certain embodiments, the microfluidic chip 320 may be formed with only two substrate layers 362, 364. According to some embodiments, at least a portion of a substrate layer may be optically transmissive, particularly in the particle interrogation region 314 of the microfluidic channels 330. As one example, one or more micro-lenses or other on-chip optics may be provided on the substrate(s) of the microfluidic chip.

As described in more detail below, one or more of the substrate layers 360 (or portions of the substrate layers) may be a piezoelectric material (e.g., lithium niobate (LiNbO$_3$), lithium tantalate, lead zirconium titanate (LZT), zinc oxide (ZnO), aluminum nitride, a polymer such as polyvinylidene fluoride (PVdF) or other fluoropolymer, quartz, or other material).

Still referring to FIG. 5, the microfluidic chip 320 may be configured to receive and process a sample fluid. Thus, the microfluidic chip 320 may include an input region 324 in which a sample containing particles (e.g., cells, etc.) is input into the microfluidic chip 320 for processing. The sample fluid may be input via a plurality of sample inlet ports 310 through the upper surface 321a of the microfluidic chip 320. Each microfluidic flow channel 330 may be in fluid communication with the one or more sample inlet ports 310 configured to receive a sample fluid. The sample inlet ports 310 may be in fluid communication with a sample reservoir, manifold, channel, well, test tube, etc. (not shown).

The microfluidic chip 320 may also include an output region 326 for removing the processed sample from the microfluidic chip 320. Output region 326 may include one or more ports associated with each of the microfluidic flow channels for receiving the processed sample from one or more channel portions or collection regions 332, 334. These regions 332, 334 may be in fluid communication with or may include keep and/or waste reservoirs, chambers, manifolds, wells, etc. (not shown).

The microfluidic flow channel 330 may be configured to hydrodynamically focus the sample fluid and align particles within the sample fluid by using focusing fluid (e.g., sheath fluid) and a core stream forming geometry. The core stream forming geometry may be used to maintain laminar flow and to focus, streamline, decelerate, and/or accelerate the flow of a core stream of the sample fluid with a surrounding sheath of focusing fluid within the microfluidic channel. Thus, according to certain aspects, the particle focusing system 132 (see FIG. 3) may include the use of focusing fluid (e.g., sheath fluid) and hydrodynamic flow features 355 provided as part of the flow channel 330. As non-limiting examples, some exemplary hydrodynamic focusing configurations and features are disclosed, for example, in US Patent Publication No. 2014/0318645, "Hydrodynamic Focusing Apparatus and Methods" (Ser. No. 14/213,800, filed Mar. 14, 2014), the contents of which is hereby incorporated by reference in its entirety. Thus, optionally, and as shown in FIG. 5, each microfluidic flow channel 330 may be in fluid communication with one or more focusing fluid inlet ports 350a, 350b configured to receive a focusing fluid. The focusing fluid inlet ports 350a, 350b may be in fluid communication with a sheath fluid reservoir, chamber, manifold, channel, bag, bottle, container, etc. (not shown). As known to persons of skill in the art, other focusing methods such as inertial focusing may be used in addition to or instead of hydrodynamic focusing techniques. Even further, as known to persons of skill in the art, sample fluid may be supplied in the absence of any sheath or buffer fluid, and the sorting operation may be run sheathless.

Additionally or alternatively to the above-noted focusing techniques, according to certain embodiments, each of the plurality of microfluidic flow channels 330 may include a focusing mechanism 400 for entraining particles flowing within the channels 330. Focusing mechanism 400 may be provided as part of the particle focusing system 132 (see FIG. 3). According to certain aspects, the focusing mechanism 400 may include a surface acoustic wave (SAW) actuator or generation device. In a preferred embodiment, the SAW focusing actuator may include an inter-digitated transducer (IDT). Other SAW generating actuators may be used. Focusing via focusing mechanism 400 may occur in the absence or the presence of a sheath fluid.

According to certain aspects, each of the plurality of microfluidic flow channels 330 may include a switch mechanism 500 for sorting, deflecting, diverting and/or directing particles flowing within the channels 330 into various selected channel portions or collection elements 332, 334. Switch mechanism 500 may be provided as part of the particle switching system 134 (see FIG. 3). In certain preferred embodiments, switch mechanism 500 may sort particles on an individual, particle-by-particle basis. According to certain aspects, the switch mechanism 500 may include a surface acoustic wave (SAW) actuator or generation device. In a preferred embodiment, the SAW switching actuator may include an inter-digitated transducer (IDT). Other SAW generating actuators may be used.

Referring now to FIG. 6A, an exemplary fluidic system 120, wherein a cartridge 220 includes fluid contact surfaces used for the particle processing process, is schematically illustrated (double line). According to certain embodiments, fluid contact surfaces included in the cartridge 220 may be enclosed and sealed (or sealable) from an external environment. According to certain embodiments, cartridge 220 may enclose all of the fluid contact surfaces required for the particle processing operation, such that during a particle processing operation all of the fluid contact surfaces are isolated and fluidically sealed from the external environment and from the remainder of the particle processing system 100. In a preferred embodiment, a fully enclosed, sealed, cartridge 220 may be configured for removable engagement (represented by the arrow in FIG. 6A) to the remainder of the particle processing system 100.

Thus, according to certain embodiments, cartridge 220 may include one or more sample fluid chambers 122 and one or more sheath fluid chambers 121. These chambers 121, 122 may be loaded with a sample fluid and a sheath fluid via external ports 121a, 122a, respectively. Cartridge 220 may also include a one or more particle collection or keep chambers 126 and one or more waste fluid chambers 127. Fluid from these chambers 126, 127 may be extracted via external ports 126a, 127a, respectively. Some or all of ports 121a, 122a, 126a, 127a, may be sealed during the particle processing operation. According to certain embodiments, cartridge 220 may not include sheath fluid chambers 124. Even further, according to certain embodiments, cartridge 220 may include pre- and/or post-processing elements, components, chambers, and/or channels. These pre- and/or post-processing elements may include bulk selection components (bead pre-processing), assay chambers, mixing elements, reagent, lysing solution and/or washing solution storage chambers, mixing chambers, filters, temperature control elements, pressure control elements, incubation chambers, genetic material processing components, etc.

Cartridge 220 may further include a microfluidic channel assembly 124 (e.g., a microfluidic chip) operationally engaged to and in fluid communication with the fluid chambers of the cartridge 220 according to aspects of the present disclosure. As described above, the microfluidic channel assembly 124 may be provided as a microfluidic chip 320 and may include one or more microfluidic channels 330. (For ease of understanding, FIG. 6A shows only a single microfluidic channel 330.) Each microfluidic channel 330 may include a particle focusing region or site 331, a particle interrogation region or site 314, and a particle switching region or site 333.

Cartridge 220 may be operatively engaged to the remainder of the particle processing system 100. For example, each particle focusing site 331 of the one or more microfluidic channels 330 may include a particle focusing mechanism 400 which may be operatively engaged with a focusing mechanism driver 431 that is provided on the remainder of the particle processing system 100 (i.e., the instrument). Each particle interrogation site 314 of the one or more microfluidic channels 330 may be operatively engaged with a particle interrogation system 110 that is provided on the instrument. Each particle switching site 333 of the one or more microfluidic channels 330 may include a switch mechanism 500 which may be operatively engaged with a switching mechanism driver 533 that is provided on the instrument.

As shown in FIG. 6A, particle focusing site 331 is at least partially upstream of particle interrogation site 314 which is at least partially upstream of particle switching site 333. In an optional embodiment, one or more particle interrogation sites 314a may be provided downstream of the particle switching site 333. Particle interrogation sites 314a may be associated with either channel 332 (e.g., a waste channel), channel 334 (e.g., a keep channel), or both. These optional interrogation sites 314a may be used monitor the sort performance, to confirm the adequacy of the focusing, detection and/or switching optimization algorithms and/or to provide feedback to the sorting algorithm. In FIG. 6A, an optional particle interrogation site 314a (dashed lines) is shown associated with channel 334. Although not shown so as to not crowd the figure, particle interrogation site 314a may be operatively engaged with particle interrogation system 110 (or with a secondary particle interrogation system) and further may be operatively engaged with the control system 150 (see FIG. 3).

According to certain preferred aspects, the focusing mechanism 400 may include a surface acoustic wave (SAW) actuator 410 or generation device. Surface acoustic wave generator 410 may include one or more IDTs 412. According to some embodiments, a single IDT 412 may be provided and the geometry and/or the surface of the microfluidic channel 330 at the focusing site 331 may be configured to reflect the acoustic wave in the channel 330 so as to create a standing interference pattern or a standing surface acoustic wave (SSAW). Alternatively, a pair of IDTs 412a, 412b may be provided, one on either side of the microfluidic channel 330 at the focusing site 331. Each of the IDTs 412a, 412b may generate opposing surface acoustic waves that merge to create a standing interference pattern within the fluid of the microfluidic channel 330. For example, each of the IDTs 412a, 412b may generate equal and opposite surface acoustic waves. Focusing may rely on acoustic radiation forces exerted on the particles within the microfluidic channel 330 to move the particles from areas of higher pressure to lower pressure.

According to certain preferred aspects, the switch mechanism 500 may include a surface acoustic wave (SAW) actuator 510 or generation device. Surface acoustic wave generator 510 may include one or more IDTs 512. According to some embodiments, a single IDT 512 may be provided, adjacent to the microfluidic channel 330 at the switching site 333. IDT 512 may be configured to generate a traveling or streaming surface acoustic wave (TSAW) or pressure pulse in the fluid of the microfluidic channel 330. This pressure pulse may be used to drive a slug of fluid into a selected region of the microfluidic channel 330. Alternatively, a pair of IDTs 512a, 512b may be provided, one on either side of the microfluidic channel 330 at the switching site 333. Each of the IDTs 512a, 512b may be configured to independently generate a traveling surface acoustic wave or pressure pulse in the fluid. Thus, IDT 512a may drive a droplet or slug of fluid into a first selected region of the microfluidic channel 330 and IDT 512b may drive a droplet of fluid into a second selected region of the microfluidic channel 330. Switching may rely on the compressibility of the bulk fluid at the high frequency used for SAW excitation (~140 MHz) to actuate or move the bulk fluid in which the particle is embedded.

Figure 6B:
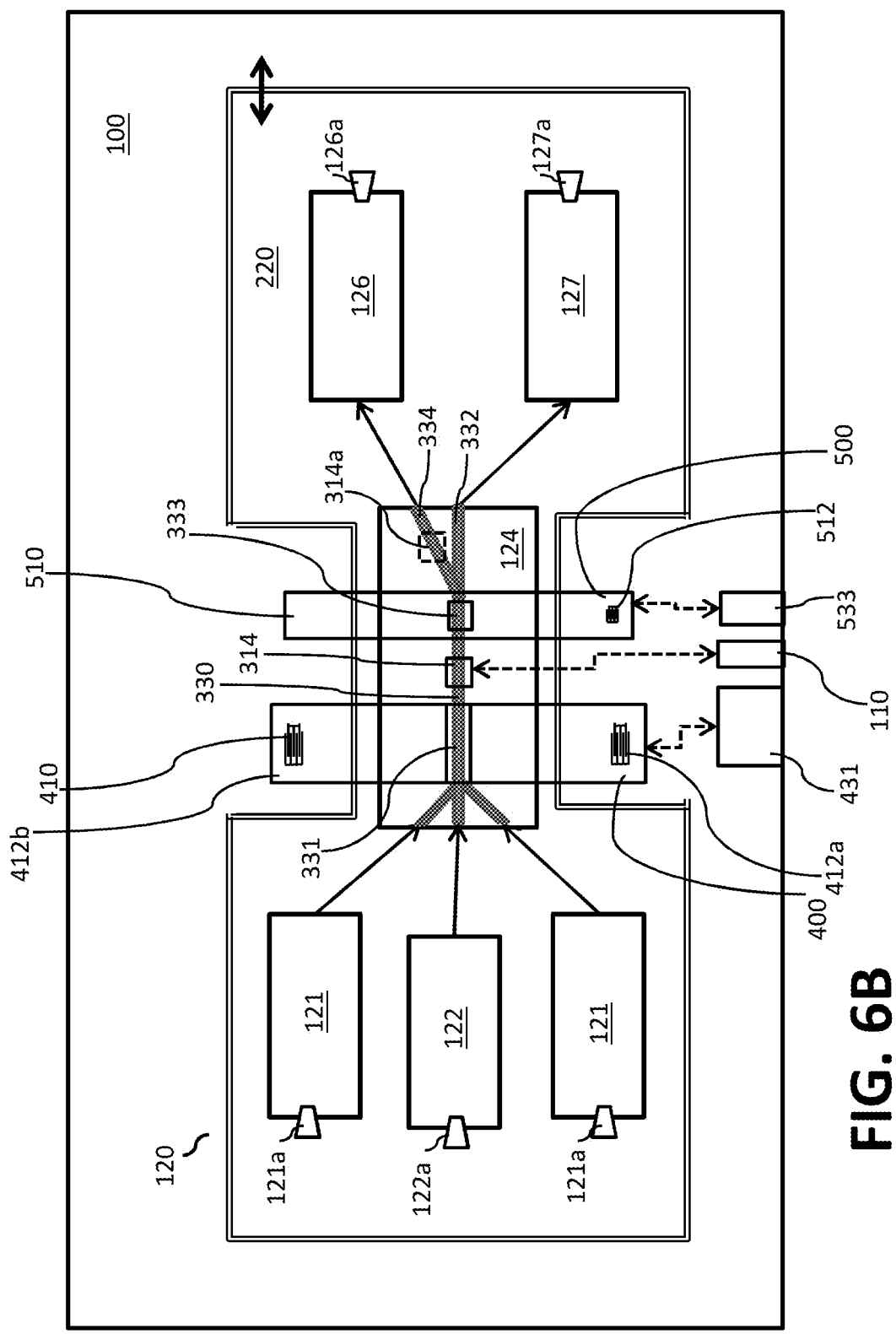
FIG. 6B schematically illustrates an exemplary fluidic system including a microfluidic chip operationally engaged to a cartridge and operationally engaged to a particle processing instrument according to other aspects of the present disclosure.

FIG. 6B schematically illustrates a particle processing system wherein the focusing mechanism 400 (including the surface acoustic wave (SAW) actuator 410 or generation device and one or more IDTs 412) and/or the switching mechanism 500 (including a surface acoustic wave (SAW) actuator 510 or generation device and one or more IDTs 512) are provided on the particle processing instrument 100 (as opposed to being provided on the microfluidic chip 320 or on the cartridge 220). The microfluidic chip 320 (and also the cartridge 220) may be operatively engaged to the particle processing instrument 100 and to the focusing mechanism 400 and/or the switching mechanism 500 during a particle processing operation and then disengaged and removed from the particle processing instrument 100 and from the focusing mechanism 400 and/or the switching mechanism 500.

Figure 7A:
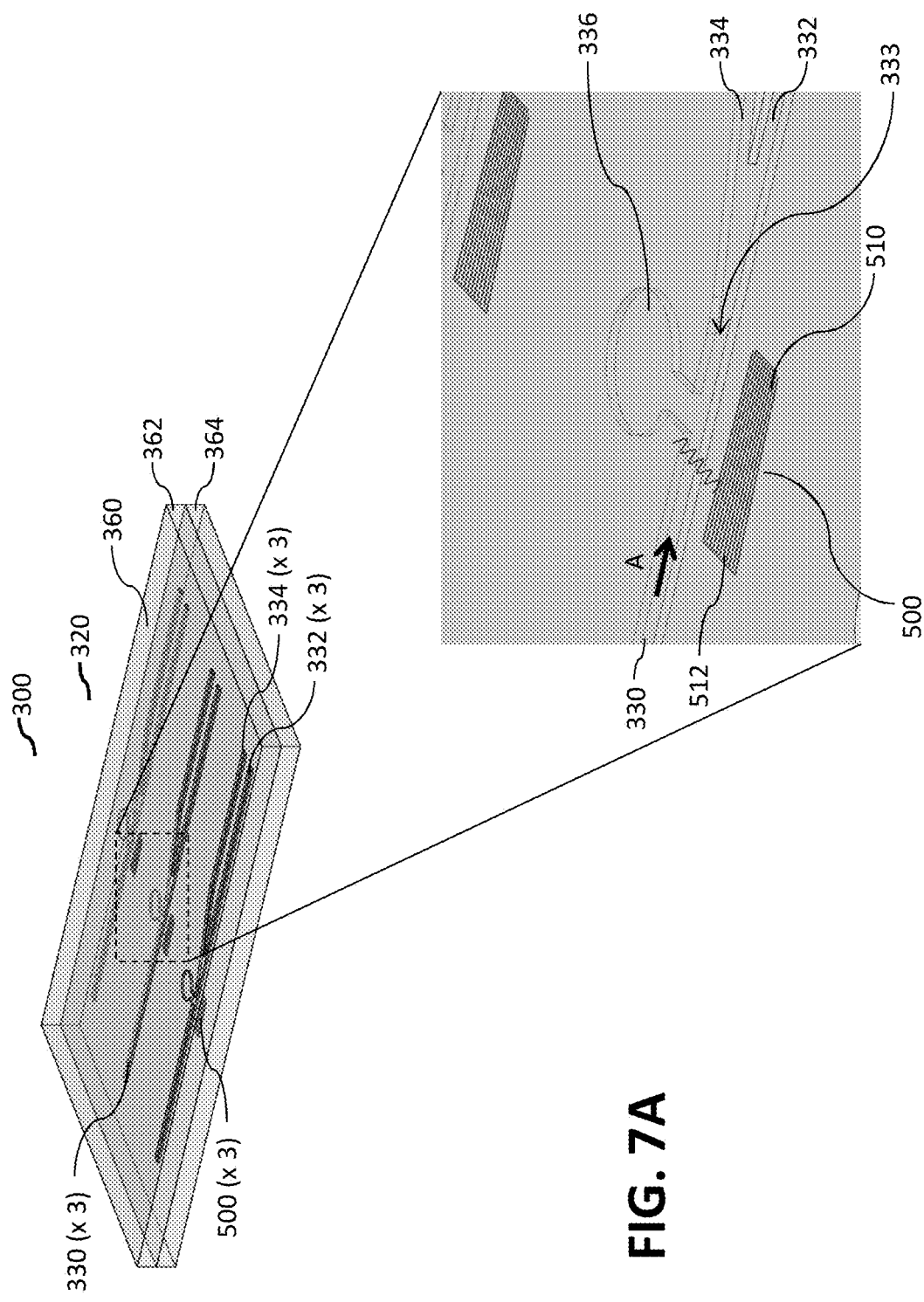
FIG. 7A schematically illustrates a perspective view of a portion of a microfluidic chip, with an enlarged view of a switching region, according to aspects of the disclosure.

FIG. 7A schematically illustrates a portion an exemplary microfluidic chip 320 with an enlarged detail of a portion of a microfluidic flow channel 330 in the vicinity of the particle switching site 333. Microfluidic chip 320 is shown with a plurality of microfluidic channels 330 arranged in parallel to one another with a switch mechanism 500 associated with each of the microfluidic channels 330. The parallel arrays of microfluidic channels 330 and switch mechanisms 500, e.g., may be formed by patterning a series of adjacent channels and surface acoustic wave actuators or generators 510 (e.g., IDTs 512) on one or more substrate layers. In general, any number of microfluidic channels 330 may be provided and they need not be arranged in parallel. Further, in FIG. 7A (and in other figures that follow), inlet ports and outlet ports of the microfluidic channels 330 are not depicted in these simplified schematics. Persons of ordinary skill in the art would recognize that inlet and outlet ports may be formed on any surface (top, bottom, end, side) of the microfluidic chip 320 so as to allow flow through the microfluidic channels 330.

A switch mechanism 500 is formed on one of the substrate layers 360 and located adjacent to the switching site 333. In this particular embodiment, the switch mechanism includes an IDT 512. IDT 512 is shown as a tapered IDT, although more generally, the IDT 512 may take any suitable configuration (including, for example, non-tapered, focused, chirping, unidirectional, bidirectional, etc.). IDT 512 is configured to generate a surface acoustic wave in one of the substrate layers 360, which in turn generates a pressure pulse in the flow in the switching region 333 of the flow channel 330. The surface acoustic wave travels in a direction transverse relative to the inter-digitated fingers of the IDT, and thus in this particular embodiment, the surface acoustic wave travels in a generally transverse direction to the flow direction of the microfluidic channel 330. The pressure pulse generated in the switching region 333 also travels in a generally transverse direction to the flow direction of the microfluidic channel 330.

In operation, particles flow through microfluidic channel 330 in the direction of arrow A. In the absence of a switching event, particles flow into channel 332. During a switching event, IDT 512 receives a periodically-varying electrical signal that generates a surface acoustic wave in one of the substrate layers. When the surface acoustic wave reaches the microfluidic channel 330 it generates a substantially transverse pressure pulse in the fluid within the channel 330 causing a particle acted on by that pressure pulse to move transverse to the flow and ultimately into channel 334.

A pressure pulse dampening element 336 may be formed on one of the substrate layers 360 and may be located adjacent to the switching site 333 on the side of the microfluidic flow channel 330 opposite to the IDT 512. Exemplary pulse dampeners are disclosed, for example, in U.S. Pat. No. 6,877,528, issued Apr. 12, 2005 and U.S. Pat. No. 6,808,075, issued Oct. 26, 2004, the entire contents of which are hereby incorporated by reference in their entireties. Pressure pulse dampening element 336 may minimize perturbations experienced by the fluid flowing within the microfluidic channel 330 due to the pressure pulse.

Microfluidic chip 320 may be formed of a plurality of substrate layers 360. FIG. 7A illustrates an upper (or first) substrate layer 362 and a lower (or second) substrate layer 364. Substrate layers 362, 364 may be bonded to one other, deposited on one another, co-molded to one another, overmolded to one another, etc. At least some of the substrate layers 360 may be formed of any suitable material for forming microfluidic channels therein. For example, substrate layer 362 may be formed of a glass, a metal, a polymer, etc. and microfluidic channel 330 may be patterned therein. Additionally, any of the substrate layers may be formed of one or more sublayers (not shown). Substrate layer 364 may be formed as a substantially flat layer that spans over the channel formed within substrate layer 362 to thereby form a "lid" or wall of the channel 330 (see cross-section FIG. 7B). Substrate layer 364 may be formed of a piezoelectric material. According to certain embodiments, an IDT 512 may be formed on substrate layer 364. When the IDT 512 is energized or actuated, a surface wave may be generated that travels toward the microfluidic channel 330. A portion of the energy of the surface acoustic wave is transferred into the fluid within the channel 330. Optionally, IDT 512 may be formed on a substrate layer 364 that has the microfluidic channel 330 formed at least partially therein (see cross-section FIG. 7C). This embodiment may provide an efficient mechanism for transferring the energy of the surface acoustic wave into the pressure pulse formed within the flow in the microfluidic channel 330.

Figure 7B:
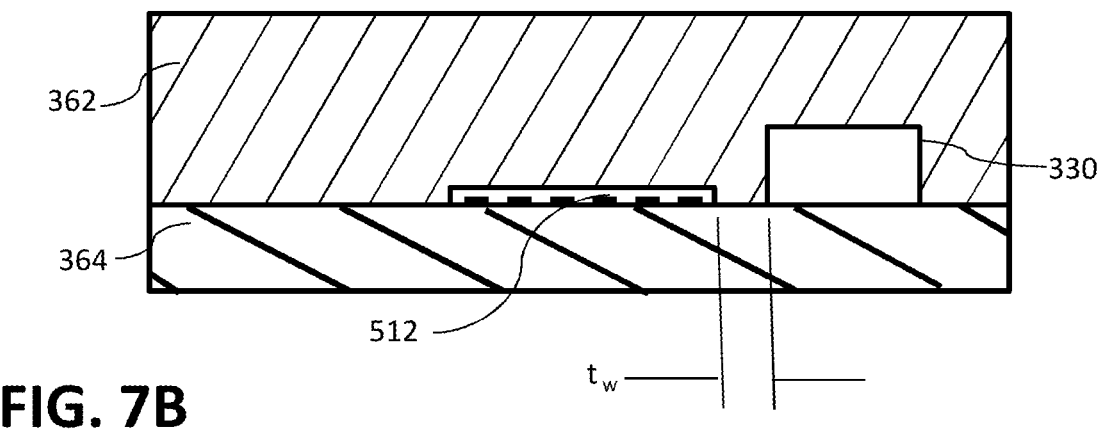
FIG. 7B schematically illustrates a cross-section of a microfluidic chip in the vicinity of the switching region of a microfluidic channel according to one embodiment.
Figure 7C:
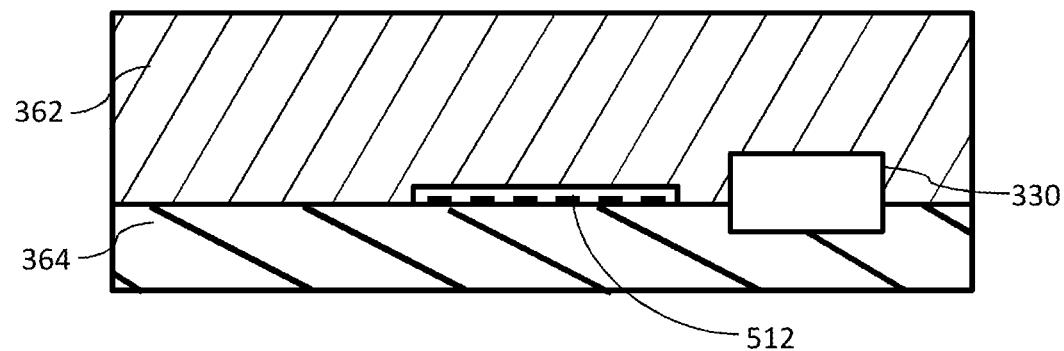
FIG. 7C schematically illustrates a cross-section of a microfluidic chip in the vicinity of the switching region of a microfluidic channel according to another embodiment.

According to certain embodiments, IDT 512 may be formed or patterned on the piezoelectric substrate 364, for example, as shown in FIGS. 7B and 7C, on the surface of the piezoelectric substrate 364 facing substrate layer 362. As shown, IDT 512 may be formed or patterned on a surface of the piezoelectric substrate 364 that comes into direct contact with fluid within the microfluidic channel 330. The opposing surface of substrate layer 362 may be cut-away in the vicinity of IDT 512, so as to not contact IDT 512 and to not impede the formation of the surface acoustic wave. Further, according to some embodiments, the wall thickness ($t_w$) as shown in FIG. 7B of the microfluidic channel 330 between the IDT and the fluid within channel 330 may be minimized to reduce the amount of acoustic energy lost when the surface acoustic wave travels across this thickness.

Figure 7D:
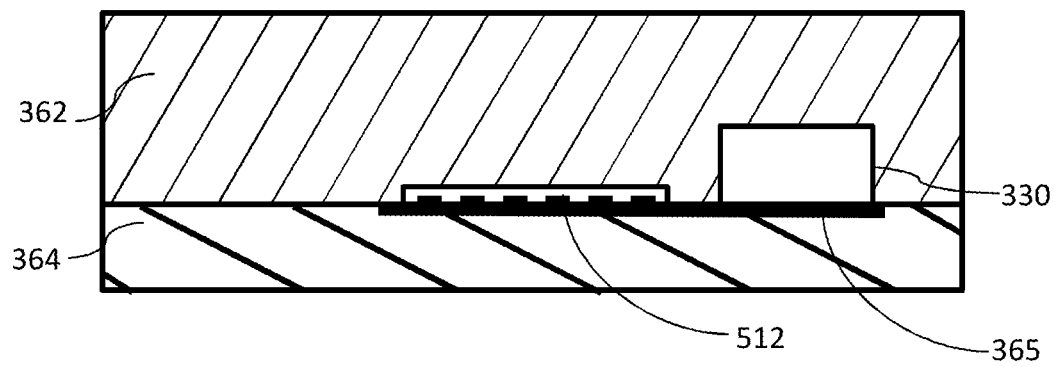
FIG. 7D schematically illustrates a cross-section of a microfluidic chip in the vicinity of the switching region of a microfluidic channel according to even another embodiment.

According to other embodiments and referring now to the cross-section of FIG. 7D, IDT 512 may be formed or patterned on a piezoelectric thin film 365 deposited on a substrate 364, for example a silicon substrate. For example, a piezoelectric thin film 365 of zinc oxide, aluminum nitride, etc. with a thickness of less than 5 µm may be formed on a thicker, conventional substrate 364. The IDT 512 may be formed on the thin film 365 and upon actuation of the IDT 512 a surface acoustic wave may be generated that travels along the thin film 365. Thin films having a thickness of less than 2 µm may be desirable. As one example, a thin film having a thickness approximately equal to the acoustic wavelength may be desirable. The thin film 365 may be formed so as to transmit the surface acoustic wave to the associated microfluidic channel 330, but not to any other channels. Thus, as shown in FIG. 7D, the thin film 365 may substantially stop at and not extend beyond the width of the microfluidic channel 330.

In each of the embodiments disclosed in FIGS. 7A-7D, the piezoelectric material upon which the IDT 512 is formed may be in direct contact with the fluid within the microfluidic channel 330.

Figure 8A:
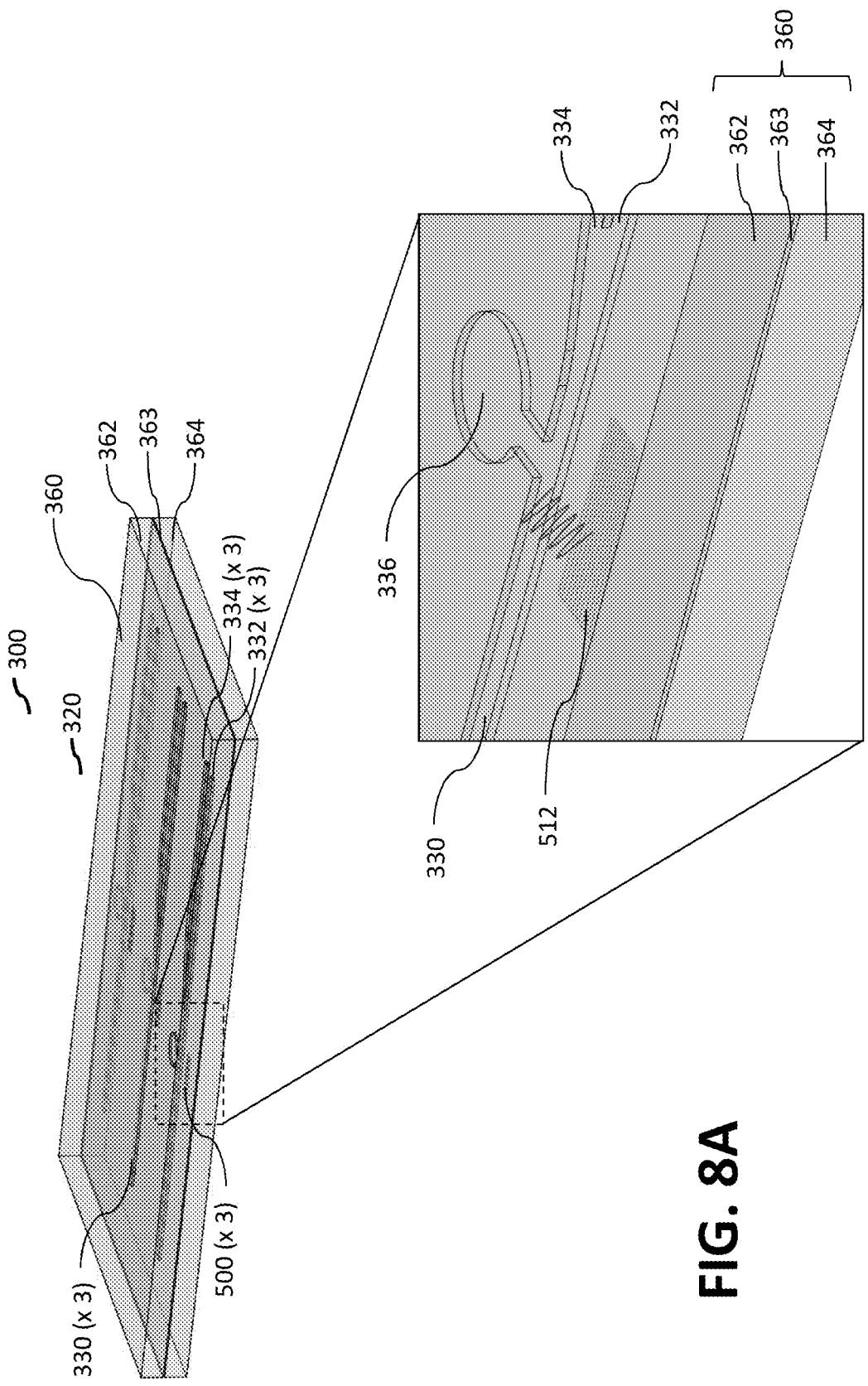
FIG. 8A schematically illustrates a perspective view of a portion of a microfluidic chip, with an enlarged view of a switching region, according to aspects of the disclosure.
Figure 8B:
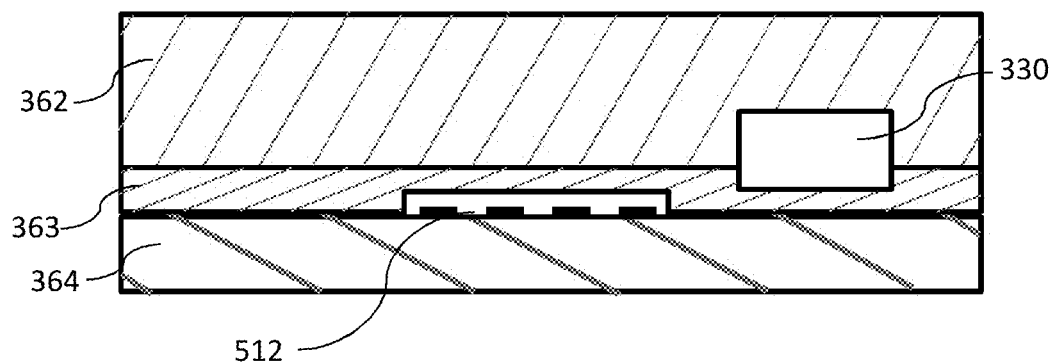
FIG. 8B schematically illustrates a cross-section of a microfluidic chip in the vicinity of the switching region of a microfluidic channel according to one embodiment.
Figure 8C:
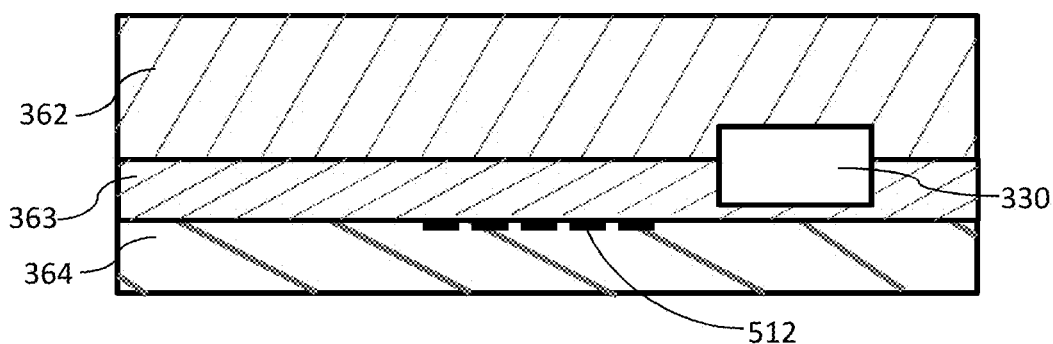
FIG. 8C schematically illustrates a cross-section of a microfluidic chip in the vicinity of the switching region of a microfluidic channel according to another embodiment.

FIG. 8A schematically illustrates a portion an exemplary microfluidic chip 320 with an enlarged detail of a portion of a microfluidic flow channel 330 in the vicinity of the switch mechanism 500. An enclosed channel 330 is formed within two substrate layers 362, 363. As shown in the cross-section of FIG. 8B, the channel 330 may be formed within a single substrate layer 362 and a second thin substrate layer 363 may be used as a cover layer to form the enclosed channel 330. Alternatively, as shown in the cross-section of FIG. 8C, channel features may be patterned into both of the substrate layers 362, 363, which are then aligned and bonded to form the enclosed channel 330. As shown in both FIGS. 8B and 8C, an IDT 512 may be patterned or formed onto a separate piezoelectric substrate 364, which may be temporarily or permanently bonded to the cover layer 363 of the enclosed channel 330. In FIG. 8B, in the vicinity of IDT 512 the opposing surface of substrate layer 363 may be cut-away, so as to not contact IDT 512 and to not impede the formation of the surface acoustic wave. Alternatively, as shown in FIG. 8C, IDT 512 may be in direct contact with the opposing surface of substrate layer 363, so as to transmit the surface acoustic wave into substrate 363. In this embodiment, substrate 363 may be an acoustically transmissive material such as a silicon glass. A substrate 363 having a thickness of less than 2 µm or even less than 1 µm may be desirable. As one example, a substrate 363 having a thickness approximately equal to the acoustic wavelength may be desirable. Further, IDT 512 may be pressed or pre-loaded against the surface of substrate 363.

Figure 8D:
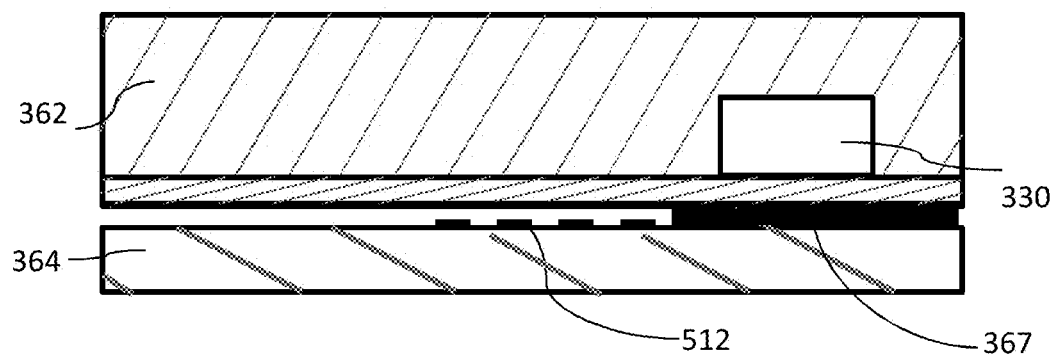
FIG. 8D schematically illustrates a cross-section of a microfluidic chip in the vicinity of the switching region of a microfluidic channel according to even another embodiment.

Alternatively, as shown in FIG. 8D, the IDT 512 may be patterned on piezoelectric substrate 364 that may indirectly contact cover substrate 363 of the channel 330 through a coupling agent 367. Coupling agent 367 may extend over the entire common area between opposed surfaces of substrates 362, 364 or only over a limited area of the opposed surfaces of substrates 362, 364 (as shown in FIG. 8D). Coupling agent 367 may be formed as an intermediate liquid, gel, solid polymer, epoxy, or other acoustically-transmissive layer.

In each of the embodiments disclosed in FIGS. 8A-8D, the piezoelectric material 364 upon which the IDT 512 is formed is in indirect contact with the fluid within the microfluidic channel 330. Either a relatively thin substrate layer 363 or a coupling agent 367 is interposed between the piezoelectric material 364 upon which the IDT 512 is formed and the fluid within the channel 330.

When a single microfluidic chip 320 includes a plurality of microfluidic channels 330, each channel 300 associated with a switching mechanism 500, cross-talk between adjacent channels may become problematic. According to certain embodiments, to avoid cross-talk of surface acoustic waves between channels 330, the channels may be spaced sufficiently far apart such that any acoustic waves dissipate before impacting or reaching neighboring channels.

Figure 9A:
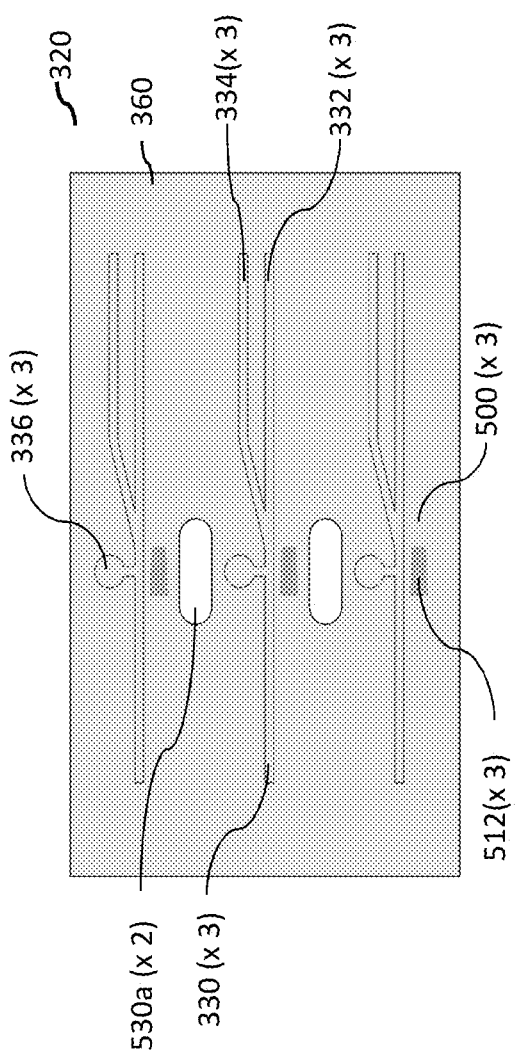
FIG. 9A schematically illustrates a top view of a portion of a microfluidic chip according to aspects of the disclosure.

According to other embodiments, specific attenuation elements 530 may be used to mitigate or element cross-talk between the channels 330. For example, FIG. 9A schematically illustrates a portion of an exemplary microfluidic chip 320 with three microfluidic flow channels 330 in the vicinity of the switch mechanisms 500. FIG. 9A further illustrates a first embodiment of an acoustic isolator or acoustic attenuation element 530a configured to achieve a more tightly packed array of microfluidic channels 330 while reducing cross-talk between channels 330. Specifically, air-gaps or holes 530a may be formed through all layers of the substrates 360 (by powder-blasting, etching, drilling, laser-patterning, stamping, molding, etc.).

Figure 9B:
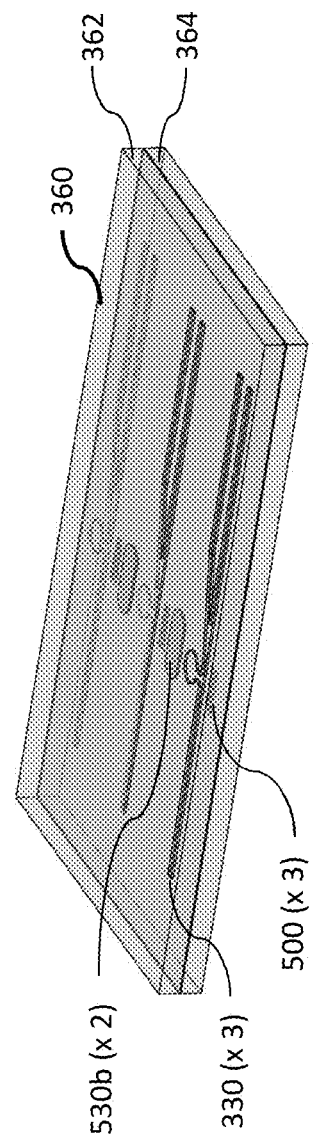
FIG. 9B schematically illustrates a perspective view of a portion of a microfluidic chip of according to a variation of the embodiment of FIG. 9A.

FIG. 9B schematically illustrates a portion of another exemplary microfluidic chip 320 with three microfluidic flow channels 330 in the vicinity of the switch mechanisms 500 with a second embodiment of an acoustic isolator 530b. Specifically, a pocket or hollow 530b can be formed in one or more channel-containing substrate layers 362, 364 or cover layers to reduce or eliminate the transmission of vibrations from neighboring channels. Pocket 530b may also be formed in the piezoelectric substrate for the same purpose. Pocket 530b may contain air or acoustically-lossy material. The fluid pressure may be modified such that it is injected at high pressure (above atmosphere) or at low pressure (below atmosphere, for example, at near-vacuum). Certain embodiments may also include secondary channels for injecting fluid into the pockets 530b.

Figure 10:
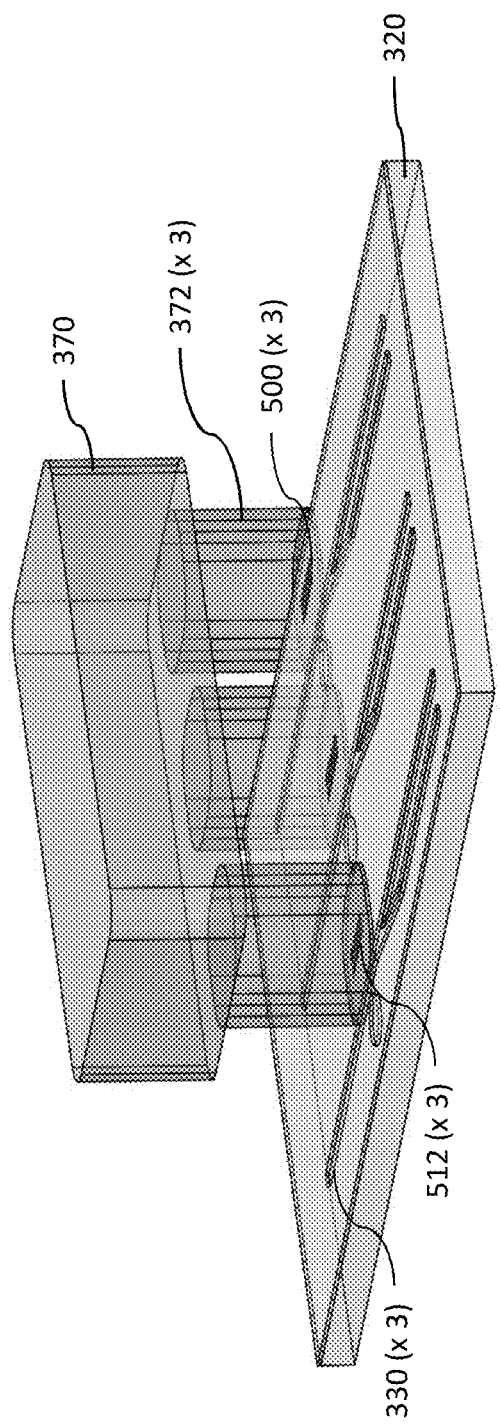
FIG. 10 schematically illustrates a perspective view of a portion of a microfluidic chip according to aspects of the disclosure.

FIG. 10 schematically illustrates a portion an exemplary microfluidic chip 320 showing three partial microfluidic flow channels 330 in the vicinity of the switch mechanisms 500, illustrating a third embodiment for minimizing or eliminating cross-talk between the channels 330. An actuator block 370 may be assembled consisting of an array of spatially-separated substrates 372, each having formed thereon a single IDT 512. The spatially-separated substrates may be a piezoelectric material. The actuator block assembly 370 may transmit surface acoustic waves to a sealed microfluidic chip 320 through direct contact of the IDT and/or piezoelectric substrate 372 to the microfluidic chip 320, or through an intermediary coupling material such as PDMS or an oil layer. The actuator block assembly 370 may be removably operatively engaged or coupled to the microfluidic chip 320. The microfluidic chip 320 may be disposable. Thus, according to certain embodiments, a single reusable actuator block assembly 370 may be operatively engaged to and then disengaged from a plurality of disposable chips 320. For example, a single actuator block assembly 370 may be used to sequentially deflect particles in multiple disposable chips 320.

Figure 11A:
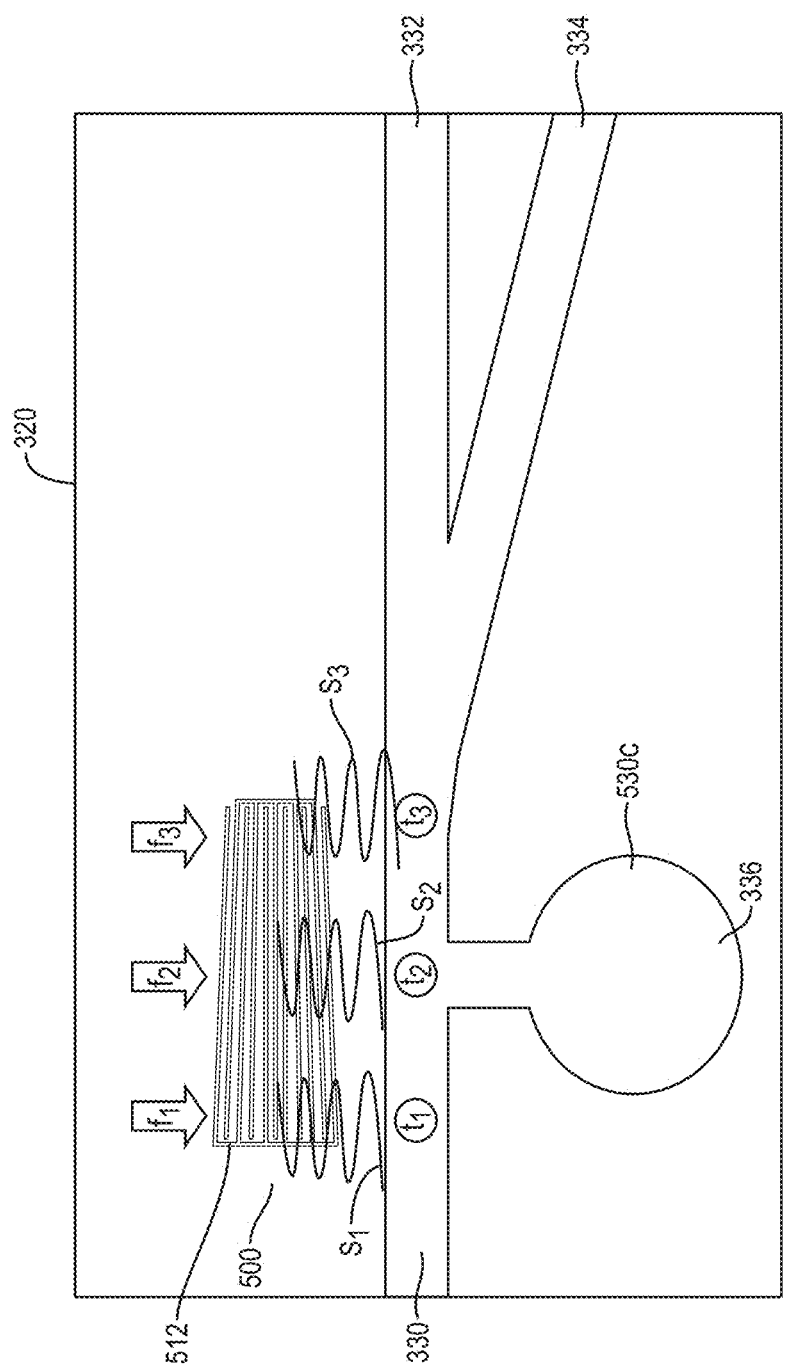
FIG. 11A schematically illustrates a top view of a switching region of a microfluidic channel according to aspects of the disclosure.

FIG. 11A schematically illustrates a portion an exemplary microfluidic chip 320 showing a partial microfluidic flow channel 330 in the vicinity of the switch mechanism 500, illustrating another aspect of the switch mechanism 500. The frequency of a surface acoustic wave produced by an IDT deposited on a piezoelectric substrate is proportional to (the speed of sound/(2*IDT finger spacing)). For this reason, IDTs may be tapered to create a narrow position or aperture where surface acoustic waves are generated (the position with an IDT spacing corresponding to the driving signal frequency). Thus, if the IDT is driven at a first periodically-varying frequency, $f_1$, only a first portion of the IDT generates a surface acoustic wave $S_1$. When the IDT is driven at a second periodically-varying frequency, $f_2$, only a second portion of the IDT generates a surface acoustic wave $S_2$. When the IDT is driven at a third periodically-varying frequency, $f_3$, only a third portion of the IDT generates a surface acoustic wave $S_3$.

As a particle travels across the length of an IDT, the driving frequency may be adjusted so that the surface acoustic waves are sequentially generated at a longitudinal positions or stations that "travel" with the particle. As shown in FIG. 11A, as the particle travels down channel 330 at time $t_1$ the particle is acted on by surface acoustic wave $S_1$ and deflected or pushed away from IDT 512. As the particle continues to travel down channel 330, at time $t_2$ the particle is acted on by surface acoustic wave $S_2$ and again deflected or pushed away from IDT 512. As the particle travels even further down channel 330, at time $t_3$ the particle is acted on by surface acoustic wave $S_3$ and deflected or pushed even further away from IDT 512. In this manner, a particle may be deflected in stages or steps into channel 334. The driving frequency may have a predetermined shape or characteristic based on an expected average velocity, or it may be tailored or adjusted on a particle-by-particle basis based on measured particle velocities.

Optionally, rather than using a single tapered IDT 512 as shown in FIG. 11A, a series of separate IDTs 512', 512", 512''' as shown in FIG. 11B may be placed along the length of a channel 330 to provide targeted deflections to a single particle in a series of comparatively small doses. These separate IDTs may be tapered or non-tapered, focused, chirped, tunable, etc. and may be configured to generate identical surface acoustic waves or, alternatively, waves having differing acoustic wavelengths. Each of the IDTs 512', 512", 512''' may generate a surface acoustic wave having the same or a different acoustic aperture width, i.e., the width of the generated surface acoustic wave. Further, the series of IDTs need not generate surface acoustic waves that travel in parallel paths. For example, IDT 512' may be canted such that its generated surface acoustic wave $S_1$ intersects with the generated surface acoustic wave $S_2$ of IDT 512" in the switching region of the channel 330. Any number of IDTs may be provided in the series. The series of IDTs 512', 512", 512''' may be electrically chained in series or in parallel or may be independently supplied with a driving signal.

FIG. 11A further illustrates another embodiment of an acoustic isolator 530c. In this embodiment, the pressure pulse dampener 336 may also act as an acoustic isolator 530c. Further, one or more pressure pulse dampeners 336 or acoustic isolators 530c may be provided. FIG. 11B illustrates that according to certain embodiments, the pressure pulse dampener may be eliminated.

Figure 12:
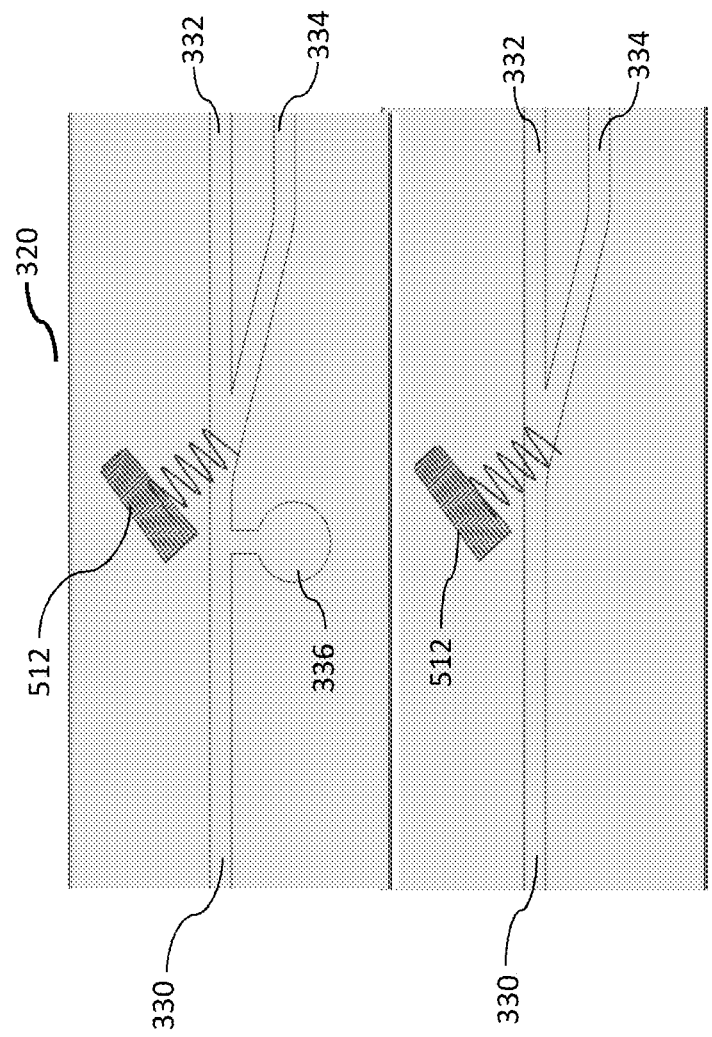
FIG. 12 schematically illustrates a top view of switching regions associated with a pair of microfluidic channels according to other aspects of the disclosure (the lower microfluidic channel illustrating a variation of the upper microfluidic channel).

FIG. 12 schematically illustrates a portion an exemplary microfluidic chip 320 showing two partial microfluidic flow channels 330 in the vicinity of their IDTs 512, which function as switches. FIG. 12 illustrates another configuration for mitigating cross-talk between adjacent channels 330. Specifically, the IDTs 512 may be angled or rotated with respect to the longitudinal axis of the microfluidic channels 330. The surface acoustic waves generated by these angled IDTs are not projected normal to adjacent channels. Even further, as shown in this particular configuration, the IDTs may generate surface acoustic waves that are aligned with and may travel down the channel 334 that receives the switched particle. The IDT excitation frequency profile may also be tailored so that the surface acoustic waves may be generated at a position that travels with the particle. A pressure pulse dampener 336 may be provided with each switch mechanism as shown with the upper channel 330. Alternatively, given that the pressure pulse generated by the surface acoustic wave may be directed down the length of the channel 334, a pressure pulse dampener may not be supplied as shown with the lower channel 330.

FIG. 13A schematically illustrates a portion an exemplary microfluidic chip 320 showing three partial microfluidic flow channels 330 in the vicinity of the switch mechanisms 500, with an enlarged detail of a portion of a microfluidic flow channel 330 in the vicinity of the switch mechanism 500 also shown. In this embodiment, although the microfluidic channels 330 are still arrayed parallel to one another, the configuration or layout of the individual channels 330 may be modified to accommodate an IDT orientation that is substantially perpendicular to the IDT orientation of FIG. 7A. As shown in FIG. 13A, each channel 330 may be provided with a bend portion 337 so that in the switching region the fluid within the channel 330 generally flows toward (or away from) a neighboring channel 330 (as opposed to flowing parallel to the adjacent channels). This allows the IDTs 512 to be positioned alongside and parallel to the bend portion 337 and to direct their generated surface acoustic waves (S) in a direction generally parallel to the neighboring channels 330. In other words, the flow direction of one or more portions of the microfluidic channels 330, particularly the flow direction in the switching region, may oriented such that the SAWs (S) generated by the IDTs 512 are not directed toward neighboring channels 330. In FIG. 13A, a pressure pulse damping element 336 is located opposite the IDT 512. In FIG. 13B, the channel 334 for receiving the selected switched particles is located opposite the IDT 512.

Figure 14A:
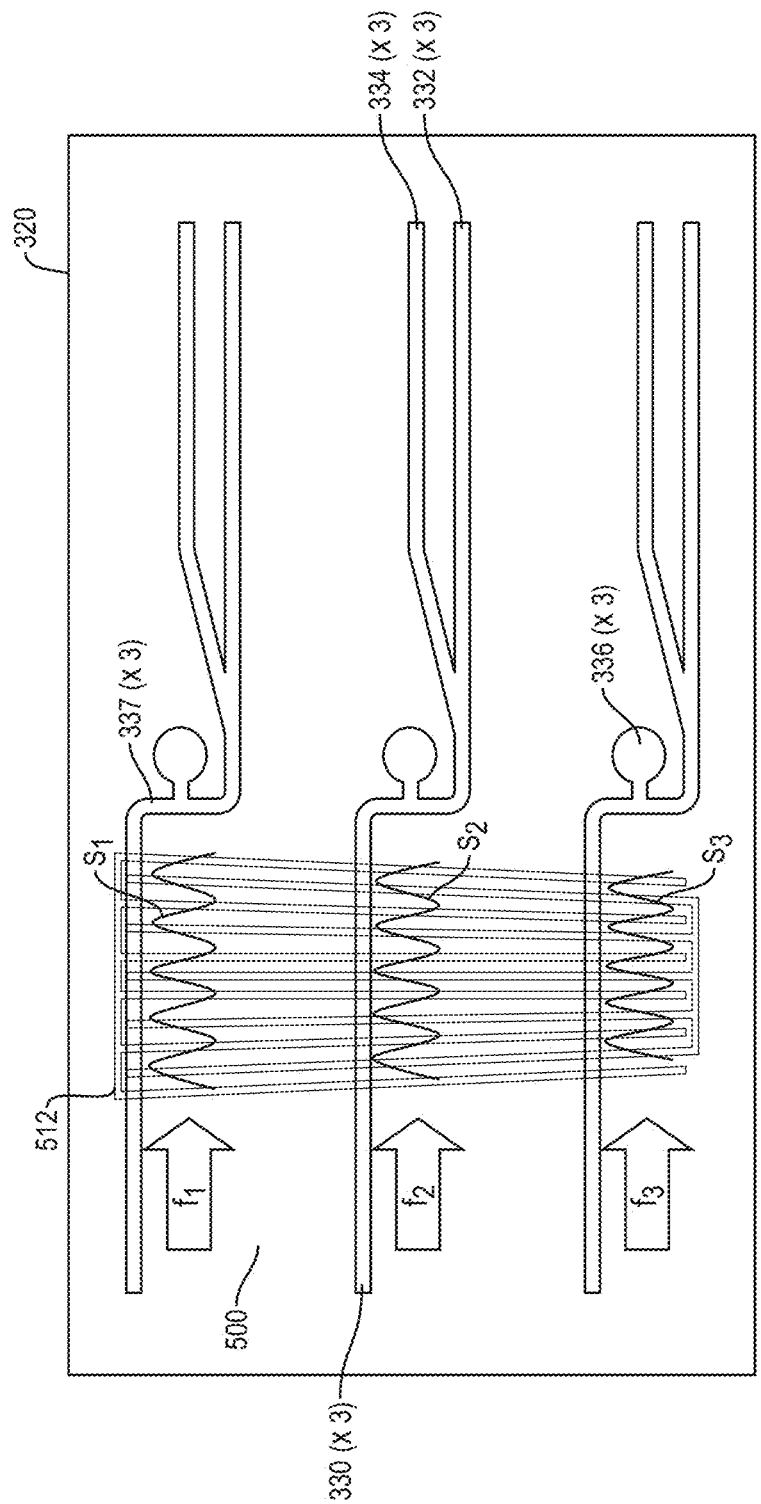
FIG. 14A schematically illustrates a top view of a portion of a microfluidic chip according to aspects of the disclosure.

FIG. 14A schematically illustrates a portion an exemplary microfluidic chip 320 showing three partial microfluidic flow channels 330 in the vicinity of the switch mechanisms 500. This embodiment is similar to that of FIG. 13A, except that a single IDT 512 may be configured to span across several channels 330 and to simultaneously and/or sequentially generate surface acoustic waves $S_1$, $S_2$, $S_3$ to deflect particles flowing within the channels 330. Similar to the embodiment of FIG. 11, the frequency $f_1$, $f_2$, $f_3$, etc. of surface acoustic waves $S_1$, $S_2$, $S_3$, etc. produced by an IDT 512 deposited on a piezoelectric substrate is proportional to (the speed of sound/(2*IDT spacing)). For this reason, IDTs may be tapered to create a relatively narrow position (or generation window) where surface acoustic waves are generated. Thus, a single tapered IDT 512 may be driven at a frequency $f_1$, $f_2$, $f_3$, etc. associated with the finger spacing of the IDT 512 in the vicinity of the particular channel 330 that is selected for switching. The channels 330 may be configured relative to the IDT 512 such that each channel 330 is actuated by a unique frequency $f_1$, $f_2$, $f_3$, etc. corresponding to a unique IDT spacing. Each switch is therefore individually addressable by its unique driving frequency. If simultaneous actuation is required across multiple channels, the driving signal may be a wave created by summing sinusoidal waves with frequencies that correspond to each channel for which actuation is required. Sequential actuation may be achieved by varying the driving signal frequency over time.

Figure 14B:
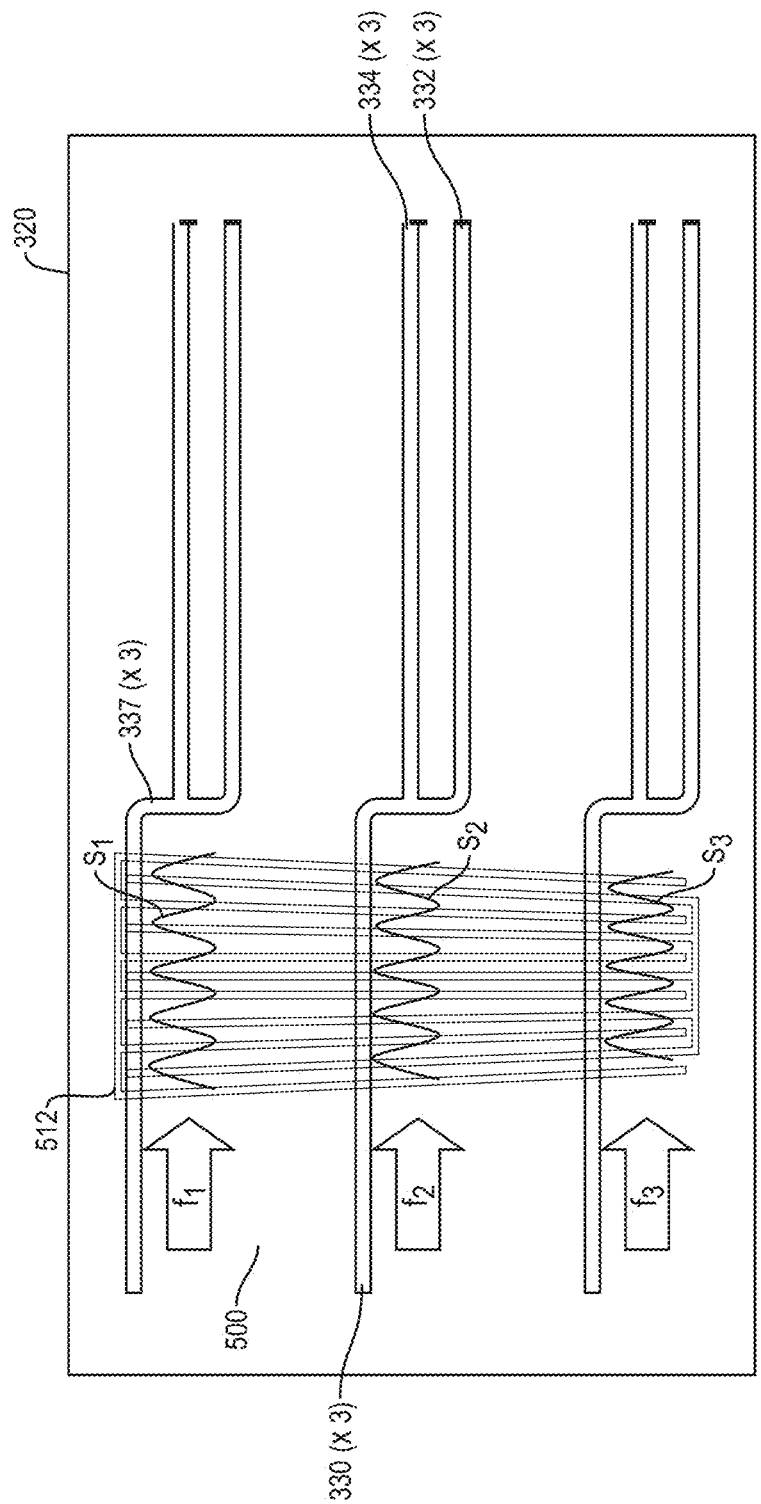
FIG. 14B schematically illustrates a top view of a portion of a microfluidic chip according to a variation of the embodiment of FIG. 14A.

As in FIG. 14A, FIG. 14B illustrates the use of a single IDT 512 to generate multiple surface acoustic waves $S_1$, $S_2$, $S_3$, each driven at a frequency $f_1$, $f_2$, $f_3$, etc. corresponding to the finger spacing of the IDT 512 that is associated with a particular channel 330. In FIG. 14A, a pressure pulse damping element 336 is located opposite the IDT 512. In FIG. 14B, the channel 334 for receiving the selected switched particles is located opposite the IDT 512.

Figure 15:
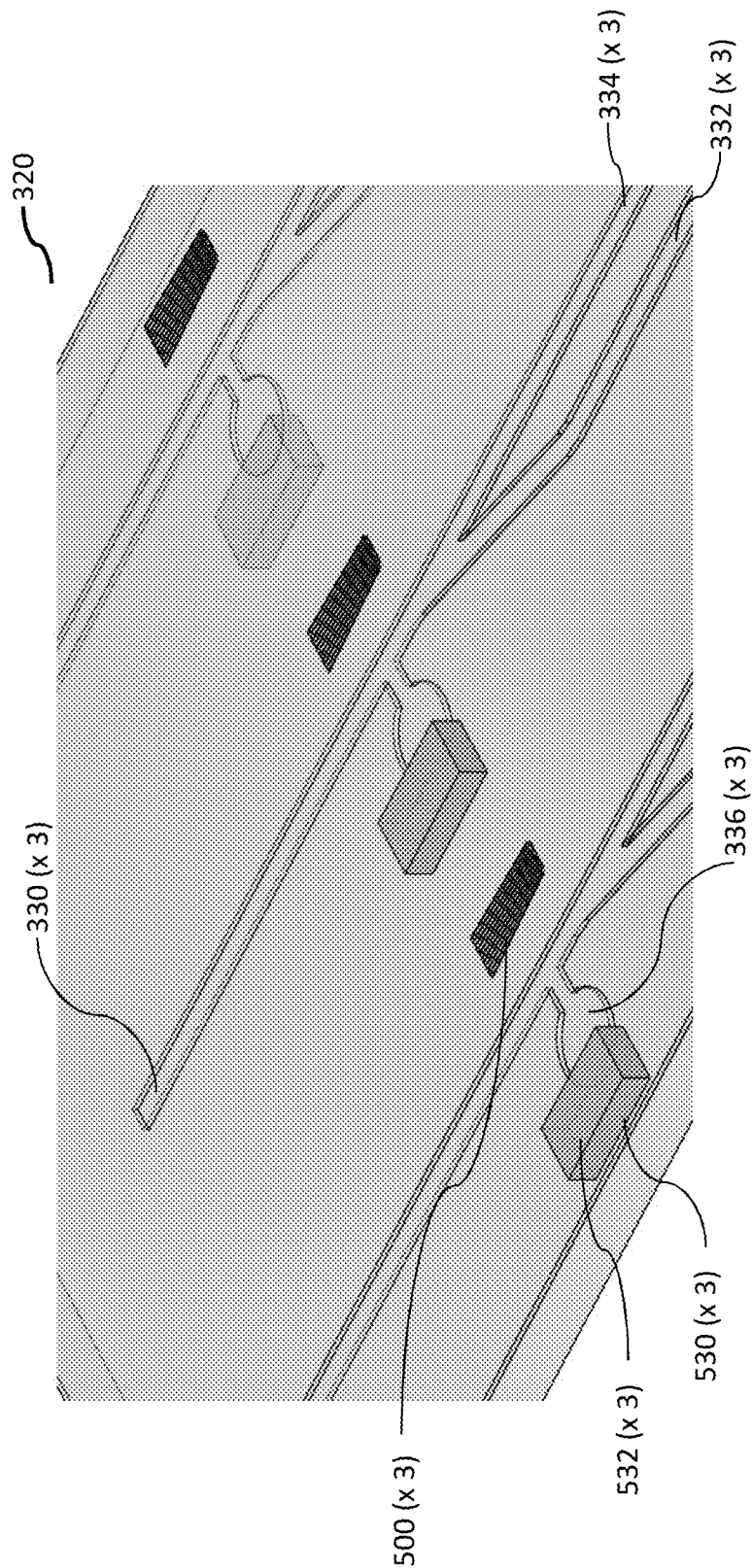
FIG. 15 schematically illustrates a top perspective view of a portion of a microfluidic chip according to certain aspects of the disclosure.

FIG. 15 schematically illustrates a portion an exemplary microfluidic chip 320 showing three partial microfluidic flow channels 330 in the vicinity of the switch mechanisms 500. In this embodiment, an isolation element 530 is provided by placing a dispersive element 532 between the IDT 512 of one channel and neighboring channels 330. The dispersive element 532 may include a dispersive material and may be permanently or temporarily bonded to the surface of the microfluidic chip 320 in order to limit the area impacted by any surface acoustic waves generated by an individual IDT 512. Such a dispersive element 532 may be applied to a single sort junction, as well as to an array of parallel sorters.

Figure 16A:
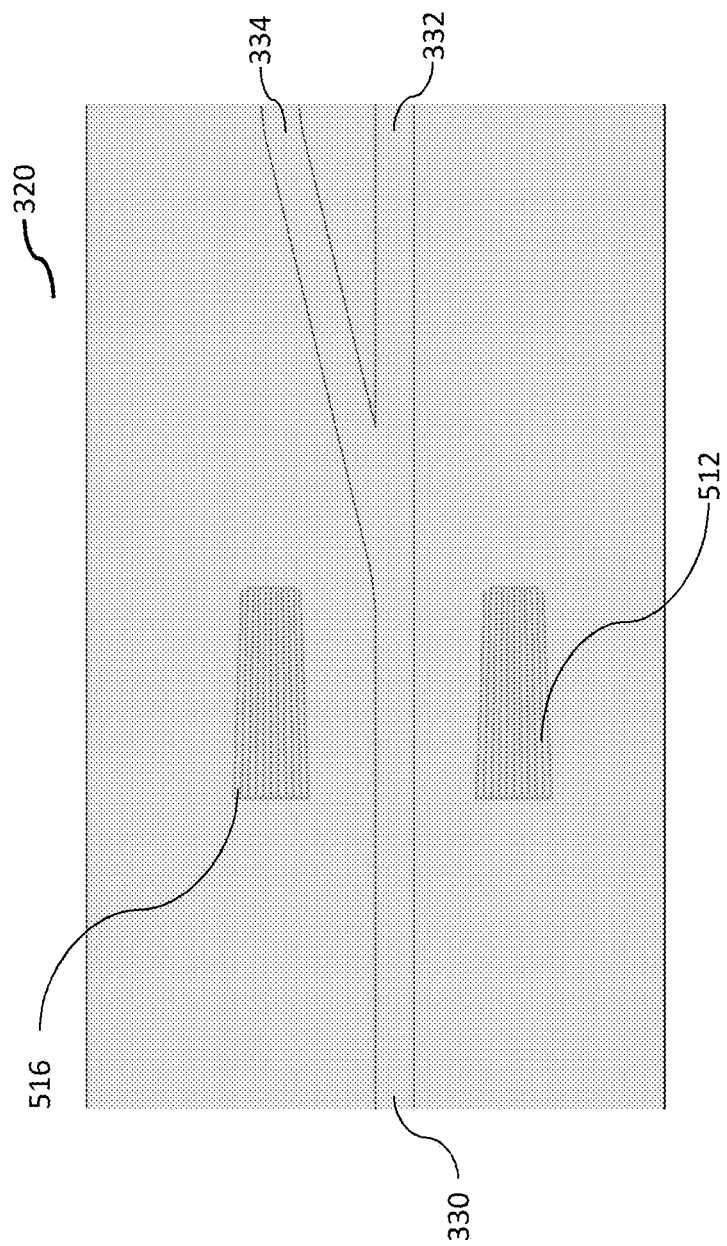
FIG. 16A schematically illustrates a top view of a switching region of a microfluidic channel in a portion of a microfluidic chip according to aspects of the disclosure.

FIG. 16A schematically illustrates a portion an exemplary microfluidic chip 320 showing a partial microfluidic flow channel 330 in the vicinity of the switch mechanism 500. A secondary active element, such as a piezoelectric actuator or another IDT 516 may be positioned across the channel from the actuating IDT 512. The secondary active element 516 may be used to produce "noise-cancelling" vibrations (or perturbation-mitigating pressure waves) that limit the area impacted by any surface acoustic waves generated by the actuating IDT 512.

According to one embodiment, the secondary active element 516 may be used to maintain laminar flow (or reduce turbulence) within the microfluidic flow channel 330 or mitigate pressure waves traveling along the length of the microfluidic flow channel 330. Optionally, the secondary active element 516 may be controlled to produce noise-cancelling or perturbation-mitigating pressure waves that reach the channel 330 at a time after the actuating IDT 512 has shifted the particle out of the focused stream of particles.

The frequency and/or amplitude of the surface acoustic waves generated by IDT 516 need not be the same as the frequency and/or amplitude of the surface acoustic waves generated by IDT 512. Further, the width of the surface acoustic wave (i.e., the acoustic aperture width) and/or the region of the intersection of the surface acoustic wave with the flow within the microfluidic flow channel 330 of IDT 516 need not be coincident with the same width/region as the surface acoustic wave generated by IDT 512. For example, the aperture width of the surface acoustic wave of IDT 516 may be narrow or wider than that of IDT 512. As another non-limiting example, the surface acoustic wave of IDT 516 may be directed at a portion of microfluidic flow channel 330 that is at least partially upstream of the portion of microfluidic flow channel 330 at which the surface acoustic wave of IDT 512 is directed. A noise-cancelling element pair may be applied to a single sort junction, as well as to an array of parallel sorters. IDT 516 may be tapered, non-tapered, focused, chirped, tunable, etc.

Figure 16B:
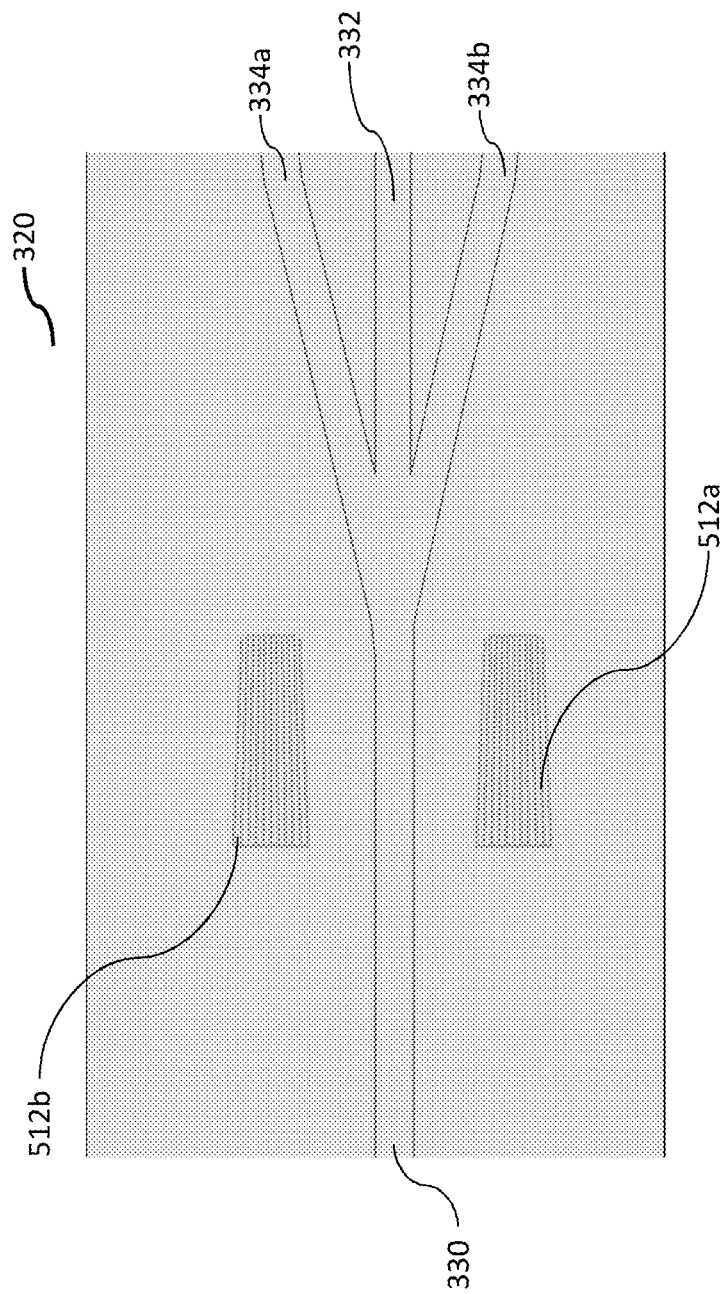
FIG. 16B schematically illustrates a top view of a switching region of a microfluidic channel in a portion of a microfluidic chip according to other aspects of the disclosure.

FIG. 16B schematically illustrates a portion an exemplary microfluidic chip 320 showing a partial microfluidic flow channel 330 in the vicinity of the switch mechanism 500. A secondary active element, such as IDT 512b may be positioned across the channel from the actuating IDT 512a. IDT 512b may function as a noise-cancelling element, as a perturbation-mitigating element, and/or as an actuating element. Thus, in the absence of a switching event, particles flow into channel 332. During a first switching event, IDT 512a may generate a pressure pulse in the fluid within the channel 330 causing a particle acted on by that pressure pulse to move transverse to the flow and ultimately into channel 334a. During a second switching event, IDT 512b may generate a pressure pulse in the fluid within the channel 330 causing a particle acted on by that pressure pulse to move transverse to the flow and ultimately into channel 334b. Optionally, when IDT 512a is functioning as the actuating element, IDT 512b may be used to produce "noise-cancelling" vibrations (or perturbation-mitigating pressure waves) as disclosed above with respect to FIG. 16A (and vice versa).

Figure 16C:
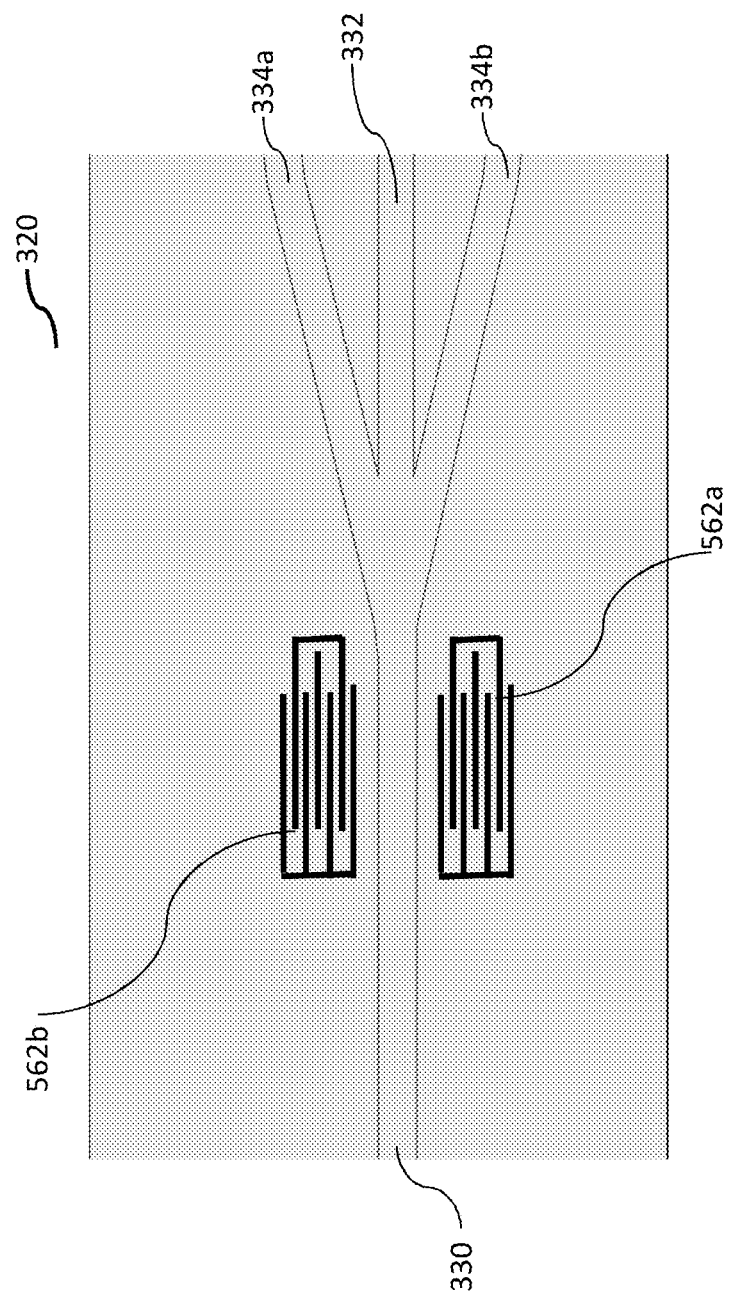
FIG. 16C schematically illustrates a top view of a switching region of a microfluidic channel in a portion of a microfluidic chip according to other aspects of the disclosure.

FIG. 16C schematically illustrates a portion an exemplary microfluidic chip 320 showing a partial microfluidic flow channel 330 in the vicinity of a switch mechanism 500. A pair of IDTs 562a, 562b may be positioned on either side of the flow channel 330. This embodiment uses standing surface acoustic waves (SSAW) or traveling standing surface acoustic waves (TSSAW) to direct segregated streams of particles into channels downstream of the switching region. Each of the IDTs 562a, 562b may generate an opposing surface acoustic wave that merge to create a standing interference pattern within the fluid of the microfluidic channels 330. For example, each of the IDTs 562a, 562b may generate equal and opposite surface acoustic waves. Switching may rely on acoustic radiation forces exerted on the particles within the microfluidic channel 330 to move the particles from areas of higher pressure to lower pressure. Specifically, the pairs of IDTs 562a, 562b may generate a SSAW that forms a plurality of pressure nodes and anti-nodes within the channel, thereby dividing the particles as they flow along a length of the channel into a plurality of particle streams aligned with the plurality of nodes or anti-nodes. The particles may be segregated based on their volume, density, compressibility or other acoustic contrast factor. Downstream of the particle separating stage, the various segregated streams of particles may flow into multiple collection outlets 332, 334a, 334b that are aligned with the streams. According to alternative embodiments, a single IDT 562 may be provided for each microfluidic channel 330 and the geometry and/or the surface of the microfluidic channels 330 in the switching region may be configured to reflect the acoustic waves in the channels 330 so as to create standing interference patterns (including, optionally, traveling standing surface acoustic wave (TSSAW)).

FIG. 17A schematically illustrates a portion of an exemplary microfluidic chip 320 with a microfluidic flow channel 330, illustrating an embodiment of an acoustic isolator 530. FIG. 17B schematically illustrates a portion an exemplary microfluidic chip 320 with a microfluidic flow channel 330, illustrating another embodiment of an acoustic isolator 530. In both FIGS. 17A and 17B, the acoustic isolators 530 may act as reflective elements or acoustic reflectors 534. Surface acoustic waves may also be used to focus particles along the centerline of a channel 330 at a focusing region 400 with is generally located upstream of the switching region 500. An IDT 512 may be used to generate a surface acoustic wave on one side of a channel 330, while a reflective element 534a position on the other side of the channel 330 may be used to direct this wave in an opposing direction. In FIG. 17B, in an alternate configuration, the opposing reflective element 534b may be incorporated directly into the wall of channel 330. According to some embodiments, the generated SAW and the reflected SAW may interfere with one another within the microfluidic channel 330 such that standing pressure nodes (or anti-nodes) are formed in the fluid. Particles may congregate (i.e., be focused) along these nodes. Focused particle streams may be maintained at an equilibrium position along a channel 330 centerline. Similar configurations of opposing IDTs 512 and reflective elements 534 may be utilized along multiple axes to produce 3-dimensional focusing of particles. Although FIGS. 17A and 17B show a tapered IDT 512, other suitable IDT configurations, for example non-tapered, focused, chirped, unidirectional, stepped, chained, etc., may be used.

According to certain aspects, and referring generally to FIGS. 18A through 24, it may be desirable to provide a switch mechanism 500 and a separately formed microfluidic chip 320 which may be operatively engaged to the switch mechanism 500. The switch mechanism 500 may be provided as part of a particle processing instrument 620 (schematically represented in these figures). As one option, the microfluidic chip 320 may be removably operatively engaged with the switch mechanism 500 provided on the instrument 620. The microfluidic chip 320 may be inserted into the instrument 620 or otherwise operatively engaged to the switch mechanism 500, the particle processing operation may be conducted, and then the microfluidic chip 320 may be removed from the instrument 620. The used microfluidic chip 320 may be disposed of and a new microfluidic chip 320 may be inserted into the instrument 620 or otherwise operatively engaged to the switch mechanism 500 for a subsequent particle processing operation. In these figures, the top view (a) illustrates the microfluidic chip 320 as a transparent element with opaque fluid within the channels 330 and with certain features of the surface acoustic wave generator assembly 505 visible through the transparent microfluidic chip 320. The side view (b) provided in these figures is generally taken through Section B-B of top view (a).

According to certain embodiments, a particle processing system may include a microfluidic chip 320 having one or more channels 330 configured for receiving a surface acoustic wave and using the pressure pulse created by the surface acoustic wave to direct or deflect selected particles into selected branch channels, while providing a surface wave generator assembly 505 off chip. In other words, switch mechanism 500 may include a surface acoustic wave generator assembly 505 which may be formed separately from the microfluidic chip 320 and which may be associated with and provided as part of the instrument 620. As one option, the microfluidic chip 320 may be removably operatively engaged with the surface acoustic wave generator assembly 505 on the instrument 620. The microfluidic chip 320 may be removed and disposed of after a particle processing operation and another microfluidic chip 320 may be inserted into the instrument 620 or otherwise operatively engaged to the surface acoustic wave generator assembly 505 for a subsequent particle processing operation. During the particle processing operation the microfluidic chip 320 may be clamped or resiliently pre-loaded against the acoustic wave generator assembly 505 to facilitate the transmission of the acoustic energy.

Figure 18A:
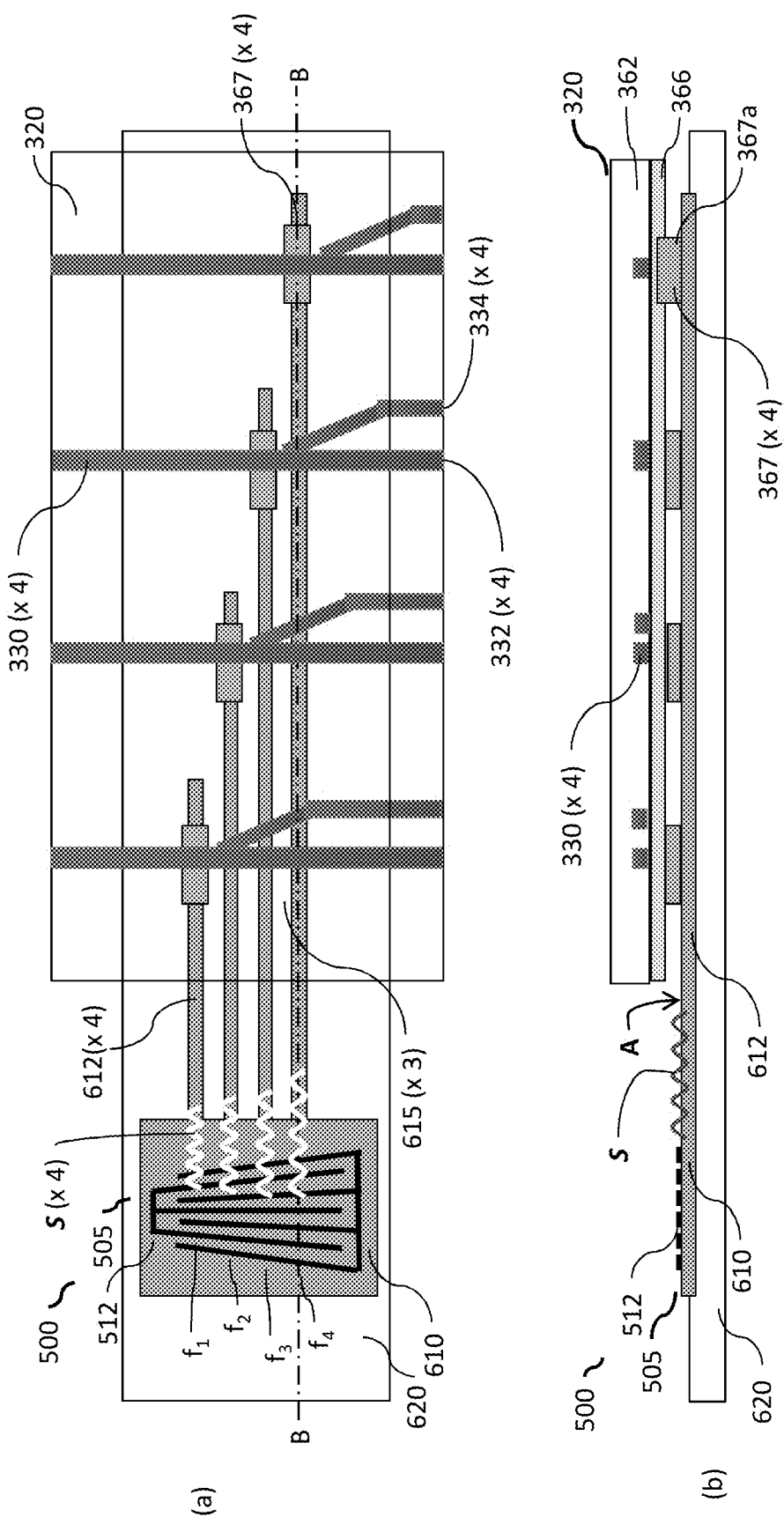
FIG. 18A schematically illustrates a top view (a) and a side view (a) of a portion of a microfluidic chip operatively engaged in a switching region to a plurality of SAW generation devices according to aspects of the disclosure.

FIG. 18A schematically illustrates an embodiment of a microfluidic chip 320 that may be removably operatively engaged with the surface acoustic wave generator assembly 505 on the instrument 620. The surface acoustic wave generator assembly 505 includes one or more surface acoustic wave generators 510. In this particular embodiment, surface acoustic wave generator assembly 505 includes a single tapered IDT 512 for generating surface acoustic waves at a plurality of frequencies $f_1$, $f_2$, $f_3$, $f_4$, etc. wherein a given frequency is associated with a given microfluidic channel 330. IDT 512 is formed on surface (A) of a piezoelectric material layer 610 which is included as part of the surface acoustic wave generator assembly 505 of the instrument 620. In this particular embodiment, the IDT 512 may selectively generate a plurality of surface acoustic waves (S) each of which travels along a first acoustically-transmissive (i.e., low-acoustically lossy) material band 612 toward an associated microfluidic channel 330. Thus, IDT 512 may be activated to selectively generate a first surface acoustic wave (S) at a first frequency $f_1$, this wave being aligned with and traveling along a first band 612 to eventually reach the vicinity of the switching region of the first microfluidic channel. Similarly, IDT 512 may be activated to selectively generate any number of surface acoustic waves (S) at select frequencies f, which travel along a band 612 associated with a switching region of each of the microfluidic channels. To simplify manufacturing, it may be desirable to form the piezoelectric material layer 610 and the acoustically-transmissive material bands 612 from the same material during the same manufacturing step.

In a multi-channel configuration for a microfluidic particle sorter, may be desirable to be able to operate each of the surface acoustic wave actuators or generators 510 independently of the other surface acoustic wave generators 510. This may be done by acoustically isolating the surface acoustic wave generators 510 from each other. For example, each acoustically-transmissive material band 612 may be isolated along at least a portion of its length (via an air gap or a gap filled with an acoustically-lossy material) from the other acoustically-transmissive material bands 612. For example, a space or gap 615 may be provided in-between and parallel to adjacent pairs of bands 612. The gaps 615 may have a depth approximately the thickness of the piezoelectric material layer, such that there is no piezoelectric material between the bands 612. In certain embodiments, the gaps 615 may be approximately one (1) acoustic wavelength deep. This acoustic isolation of the plurality of acoustically-transmissive paths or bands 612 from one another may reduce or eliminate cross-talk between the surface acoustic waves and between channels 330. Optionally, it may be desired to reduce or eliminate cross-talk between the surface acoustic waves and between channels 330 by operating the surface acoustic wave generators 510 at non-interfering frequencies. Thus, signal control and/or processing algorithms may be used to reduce or eliminate cross-talk. US Patent Publication No. 2014/0370536, (U.S. Ser. No. 14/210,366, filed Mar. 13, 2014) to Sharpe, which is incorporated by reference in its entirety herein, discloses multiple methods for controlling and/or reducing optical cross-talk from a plurality of microfluidic channels, which teachings may be applied to controlling and/or reducing acoustic cross-talk from a plurality of microfluidic channels.

As shown in FIG. 18A, in the vicinity of switching regions of the individual microfluidic channels 330, each acoustically-transmissive material band 612 may contact an acoustic-energy coupling element 367 in order to direct the acoustic energy of the surface acoustic wave (S) into a superstrate 366 provided on the microfluidic chip 320. As best shown in FIG. 18A, top view (a), each of the switching regions of the microfluidic channels 330 may be longitudinally offset or staggered so that the switching region of each of the channels 330 is aligned with the acoustically-transmissive material bands 612 and the coupling elements 367.

Various coupling elements 367 and materials may be used to couple the surface acoustic wave generator assembly 505 to the microfluidic chip 320 and to efficiently transmit the acoustic energy. For example, a thin stiff bondline, as may be provided by an epoxy, may efficiently and in many cases, permanently, couple one layer to another. However, in order to removably couple the surface acoustic wave generator assembly 505 to the microfluidic chip 320, non-permanent couplings must be used. According to certain embodiments, a removable coupling may include fluidic-type coupling elements providing high conformability. Thus, the coupling elements 367 or a portion of the coupling elements may be deformable (elastic, quasi-elastic, viscoelastic, etc.) so as to account for minor misalignments between the IDT/piezoelectric material (i.e., the surface acoustic wave generating assembly 505) and the microfluidic chip 320. Deformable coupling elements 367 may include water, water-based gels, glycerol, oils, etc. Incompressible fluids may be used. To retain the fluidic-type couplings, blister-type packaging (for example, using relatively stiff, very thin-film materials, such as cellophane), highly-conformable, elastomeric-type thin-film membrane balloon/bubble-type packaging, and combinations thereof may be employed. As a non-limiting example, a blister pack may include an acoustically transmissive membrane such as a urethane-based, flexibly thin (i.e., a few mils or less thick), polymeric material may enclose an acoustically transmissive fluidic medium (i.e., water, a water-based gel, etc.). (See, for example, U.S. Pat. No. 8,102,734 to Sliwa which is incorporated by reference in its entirety herein.) As another non-limiting example, PDMS may serve either as a temporary or a permanent coupling element, depending upon bonding conditions and/or surface treatment of the bonded materials.

According to another embodiment, a compression or friction coupling may be possible if the mating surfaces are sufficiently complementary such that good surface-to-surface coupling may be achieved. Very smooth surfaces may be provided and/or high compressive coupling loads may be applied. Smearing of one (relatively soft) surface relative to the other surface due to the application of compressive or clamping loads during engagement of the microfluidic chip 320 with the surface acoustic wave generator assembly 505 may be used to conform the relatively soft surface to the other and to thereby increase the surface-to-surface coupling and the acoustic transmissivity.

According to certain embodiments, coupling element 367 may be a provided as a removably or reversible epoxy bondline. For example, an epoxy adhesive that melts or softens at relatively low temperatures (i.e., less than approximately 200° C.) may be used for temporarily bonding the microfluidic chip 320 to the surface acoustic wave generator assembly 505. One such known "reversible" epoxy is disclosed in U.S. Pat. No. 6,825,315 to Aubert, the contents of which is entirely incorporated herein by reference. This removable epoxy liquefies (i.e., melts) and loses its bonding capability at relatively low elevated temperatures (approximately from 90° C. to 130° C. depending upon the exact formulation) and then rebonds when the temperature is lowered (approximately from 20-25° C. to 60° C.). Another reversible polymer material for providing a temporary solidified or hard polymer interface between the microfluidic chip 320 and the surface acoustic wave generator assembly 505 is disclosed in U.S. Pat. No. 8,952,094 to Mayo, the contents of which is entirely incorporated herein by reference. This solid/liquid reversible polymer material transitions from a liquid state to a solid state by reversible cycloaddition reactions within a time period of less than about 10 seconds. Thus, providing a temporary epoxy bondline or a temporary hard polymer interface becomes a matter of temperature change. According to certain embodiments, it may be desirable to provide bondline or other interface having a thickness that is on the order of (or even less than) the wavelength of the surface acoustic wave. Optionally, it may be advantageous to have a bondline thickness less than 2.0 µm, less than 1.5 µm, less than 1.0 µm, or even less than 0.50 µm. Localized heating elements (not shown) may be provided with the surface acoustic wave generator assembly 505 or otherwise on the instrument 620 and such localized heating elements may be used to facilitate the operative engagement of the microfluidic chip 320 to the surface acoustic wave generator assembly 505.

The coupling elements 367 may be supplied with and/or permanently coupled to surface acoustic wave generator assembly 505 (e.g., the acoustically-transmissive material bands 612), may be supplied with and/or permanently coupled to the microfluidic chip 320 (e.g., the superstrate 366), or may be supplied as stand-alone elements or as a stand-alone assembly of elements. It may be preferred to have the coupling elements 367 supplied with the microfluidic chip 320.

Superstrate 366 may be provided as a layer of a relatively high acoustically-transmissive material (i.e., a low acoustically-lossy material (piezoelectric, silicon, glass, etc.)) for directing acoustic energy into the fluid within the microfluidic channel 330. As best shown in the side view (b) of FIG. 18A, this acoustic transmission layer 366 may form at least one side of the microfluidic channel 330 (i.e., superstrate 366 may be in direct contact with the fluid within the channel). Superstrate 366 may be relatively thin (again, to minimize acoustic losses). In particular, superstrate 366 may be relatively thin in the localized vicinity of the switching region of each channel 330. For example, as shown in FIG. 18A, side view (b), superstrate 366 is locally thinned in the vicinity of coupling element 367a. A superstrate 366 having a thickness of less than 2 µm or even less than 1 µm may be desirable. As one example, a superstrate 366 having a thickness approximately equal to the acoustic wavelength may be desirable. For certain applications, having a superstrate thickness of approximately half the acoustic wavelength, at least locally, may be advantageous. This may reduce acoustic energy losses, prevent the formation of unwanted acoustic wave modes in the superstrate, and/or increase efficiency of the switching operation.

As discussed above in the context of FIGS. 13A, 13B and FIGS. 14A, 14B, the single IDT may be replaced by a plurality of IDTs—one for each channel, one for a plurality of channels, more than one per channel, etc. The IDTs may be tapered, untapered, focused, unidirectional, chirp, etc. Further, if a plurality of IDTs is provided, the IDTs may be arranged in a single row or may be staggered or offset from one another so as to reduce the amount of longitudinal stagger of the channels or so as to provide sufficiently large IDTs over the same region. The distance of each of the plurality of IDTs from each associated microfluidic channel need not be constant.

Figure 18B:
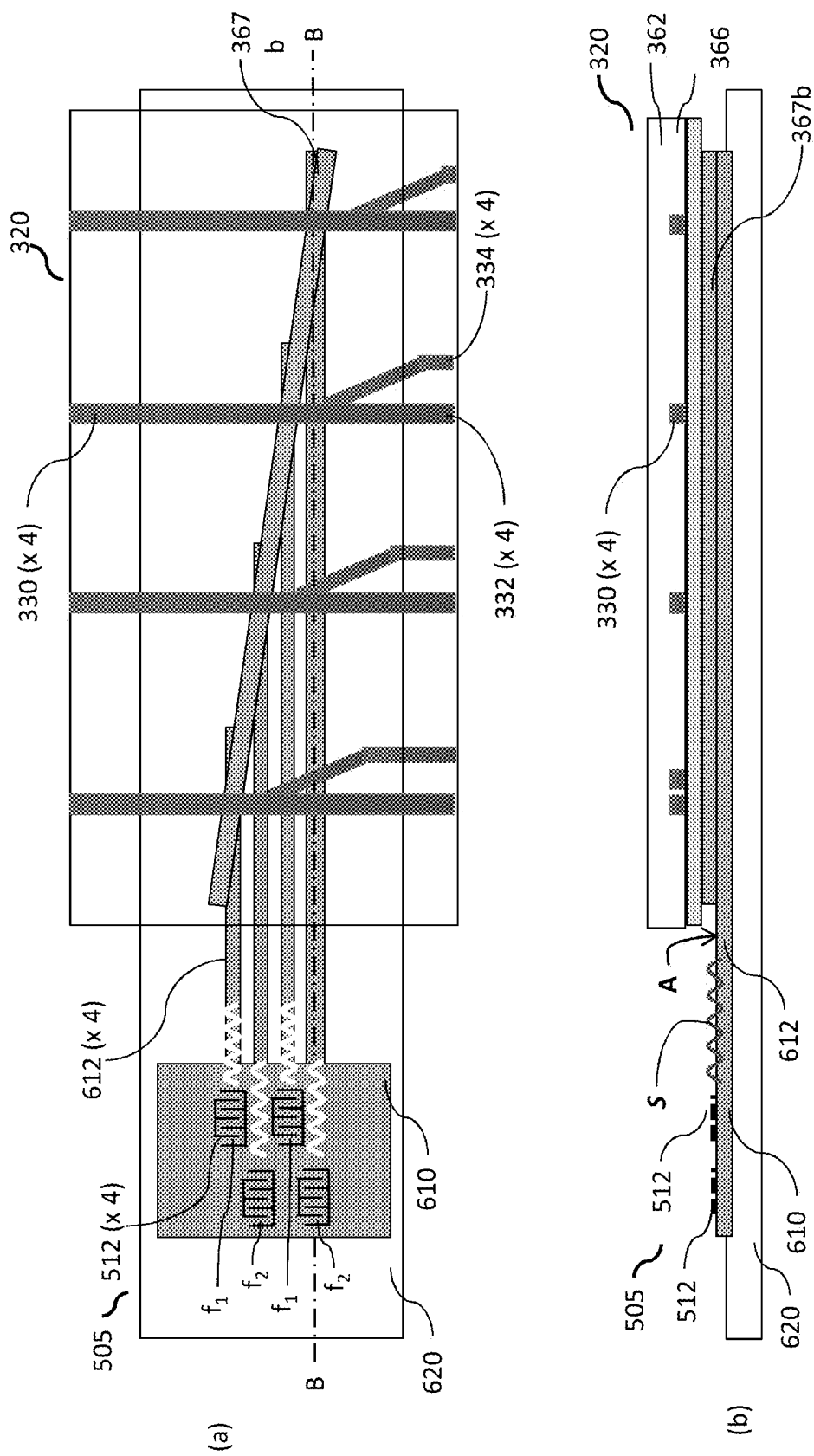
FIG. 18B schematically illustrates a top view (a) and a side view (a) of a portion of a microfluidic chip operatively engaged in a switching region to a plurality of SAW generation according to a variation of the embodiment of FIG. 18A.

FIG. 18B schematically illustrates an embodiment similar to FIG. 18A, but with a plurality of IDTs 512 providing the surface acoustic waves. Each of the IDTs 512 may be identical and may provide an identical surface acoustic wave. Optionally, as shown in this particular embodiment, the IDTs may generate surface acoustic waves at different frequencies. For example, pairs of IDTs generating surface acoustic waves at frequencies $f_1$ and $f_2$ may be provided. The IDTs may be staggered to allow for compactness. FIG. 18B also illustrates a single coupling element 367b extending across a plurality of microfluidic channels 330, rather than the plurality of discrete coupling elements 367 illustrated in FIG. 18A. Use of a single coupling element 367b for more than one channel 330 may allow for ease of manufacturing, simplicity of operatively engaging the microfluidic chip 320 to the surface acoustic wave generator assembly 505, and/or robustness of the coupling element itself.

Figure 19A:
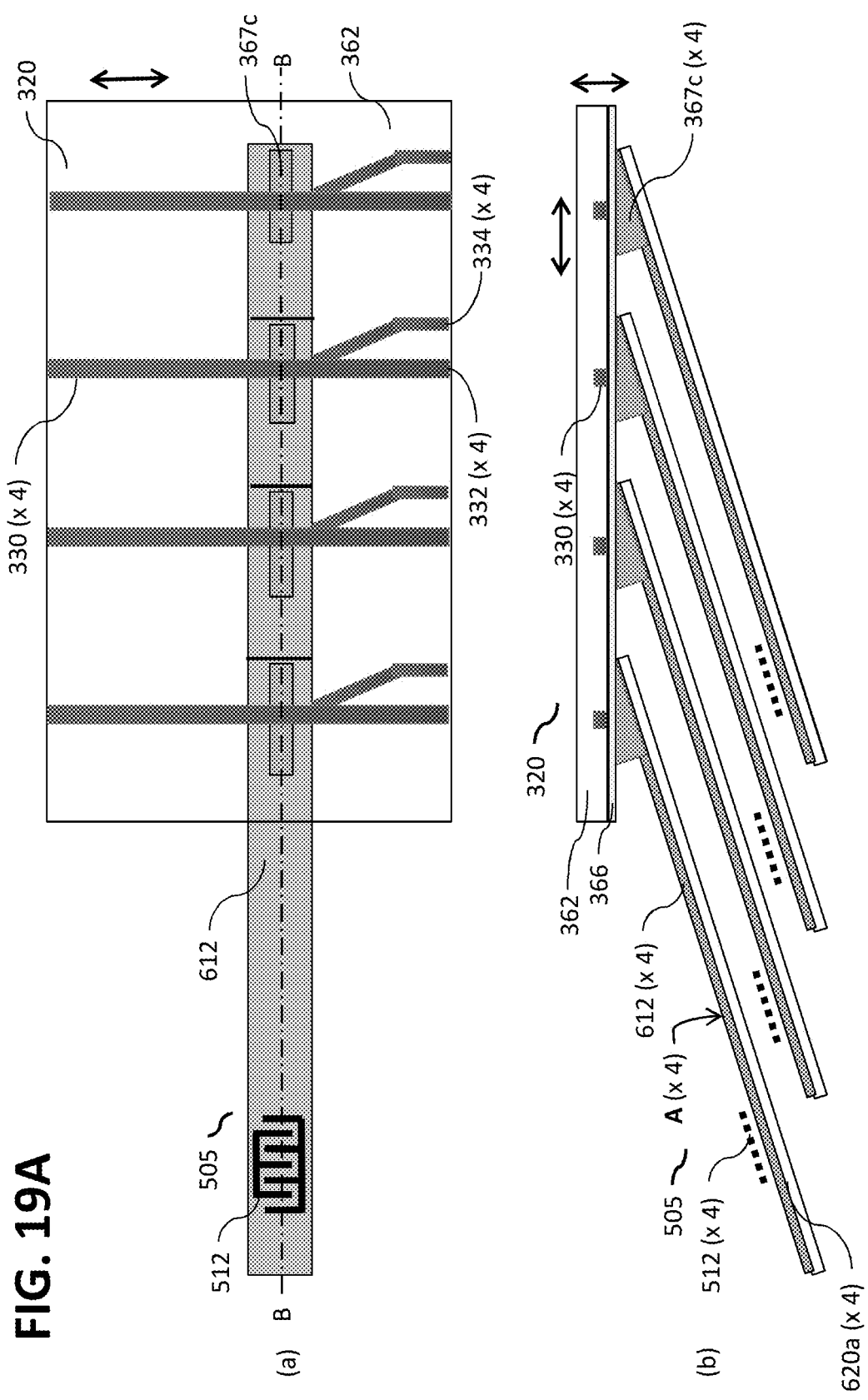
FIG. 19A schematically illustrates a top view (a) and a side view (a) of a portion of a microfluidic chip operatively engaged in a switching region to a plurality of SAW generation devices according to aspects of the disclosure.

FIG. 19A schematically illustrates a surface acoustic wave generator assembly 505 having a plurality of "stacked and canted" IDTs capable of generating surface acoustic waves at one or more frequencies. Each IDT 512 is associated with an instrument mounting element 620a, an acoustically-transmissive material layer or band 612, a coupling element 367 and a microfluidic channel 330. Instrument mounting elements 620a, which are schematically presented in the figures, would be provided as part of the instrument 620.

Supplying a driving frequency to one of the IDTs 512 causes that IDT 512 to generate a surface acoustic wave that travels along the length of the acoustically-transmissive material band 612, into the coupling element 367, into the superstrate 366 and then into the microfluidic channel 330. Referring to the side view (b) of FIG. 19A, the IDTs are shown "stacked" above one another so that the switching regions of the individual channels 330 are in transverse alignment. This arrangement may simplify the architecture of the microfluidic channels 330 and of the microfluidic chip 320. Still referring to the side view (b) of FIG. 19A, the IDTs 512 and the acoustically-transmissive material bands 612 are provided in on an instrument mounting element 620a that is oriented at an angle to the major plane of the microfluidic chip 320. This angled or "canted" orientation allows the plurality of IDTs and acoustically-transmissive material bands 612 to be identically configured in the "stacked" arrangement.

As with the embodiments shown in FIGS. 18A and 18B, surface acoustic wave generator assembly 505, e.g., the IDTs 512 and their associated acoustically-transmissive material bands 612, illustrated in FIG. 19A may be formed separately from the microfluidic chip 320 and may be associated with and provided as part of the instrument 620. Again, the microfluidic chip 320 may be operatively engageable to the surface acoustic wave generator assembly 505 provided with the instrument 620 and may be removable from the instrument 620. The arrows represent possible relative movements of the microfluidic chip 320 relative to the instrument 620 when the chip 320 is being engaged and/or disengaged from the instrument 620. Rotational motions may also be used to engage and/or disengage the chip 320 from the instrument 620. Further, the canted mounting elements 620a may be provided as hinged and/or flexible finger-like elements in order to provide engagement tolerances and/or to establish a preloaded engagement of the coupling elements 367 to the surface acoustic wave generator assembly 505 and/or to the microfluidic chip 320.

The coupling elements 367 shown in FIG. 19A may be configured to accommodate a non-parallel or angular alignment of the transmission surface (A) of the surface acoustic wave generator assembly's transmission surface with the superstrate 366 of the chip 320. Thus, for example, coupling element 367c may be configured to complementarily engage the transmission surface (A) and the lower surface of superstrate 366. As shown in the side view (b) of FIG. 19A, the coupling elements 367c may be substantially wedge-shaped. As disclosed above, the coupling elements 367 may be deformable (elastic, quasi-elastic, viscoelastic, etc.) and/or may include water, gel, water-based gel, a thin-film, a fluid-filled blister pack (with a stiff membrane or with a highly elastic membrane). Also as disclosed above, the coupling elements 367 need not be deformable, but may be provided as a reversible solid/liquid polymer, epoxy, etc. that temporarily provides acoustic coupling between the microfluidic chip 320 and the surface acoustic wave generator assembly 505.

Figure 19B:
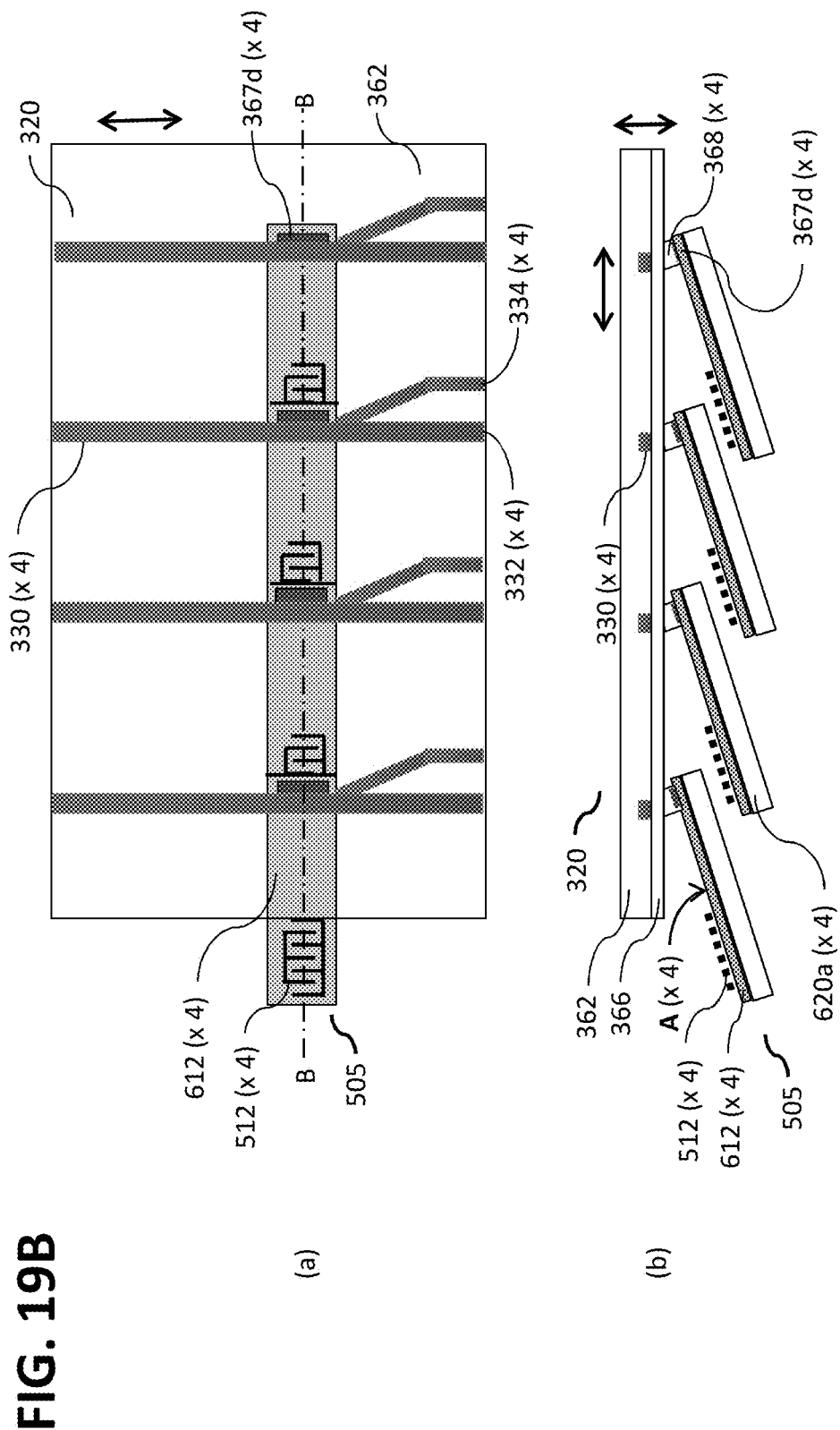
FIG. 19B schematically illustrates a top view (a) and a side view (a) of a portion of a microfluidic chip operatively engaged in a switching region to a plurality of SAW generation devices according to a variation of the embodiment of FIG. 19A.

Similar to the embodiment of FIG. 19A, the embodiment schematically illustrated in FIG. 19B includes a surface acoustic wave generator assembly 505 which is formed separately from the microfluidic chip 320 and is provided as part of the instrument 620. The microfluidic chip 320 may be removably and operatively engageable to the surface acoustic wave generator assembly 505. Surface acoustic wave generator assembly 505 includes a plurality of "stacked and canted" IDTs capable of generating surface acoustic waves at one or more frequencies. Each IDT 512 is associated with an instrument mounting element 620a, which is provided as part of instrument 620, an acoustically-transmissive material layer 612, and a microfluidic channel 330. Referring to the side view (b) of FIG. 19B, the IDTs are shown "stacked" above one another so that the switching regions of the individual channels 330 may be transversely alignment (as shown in top view (a) of FIG. 19B).

Microfluidic chip 320 may include a substrate 362 and a superstrate 366. Generally, microfluidic chip 320 may be formed of any number of substrate layers. To assist in the transmission of acoustic energy from the surface acoustic wave generator assembly 505 to the microfluidic channels 330, tranmissive elements 368 may be provided with the microfluidic chip 320. Transmissive elements 368, which are provided in the vicinity of the switching regions of the microfluidic channels 330, may be integrally formed with superstrate 366. In order to minimize acoustic losses in surrounding material, transmissive elements 368 may be formed as standoffs or other projecting elements and of a relatively high acoustically-transmissive material. It may be desirable for the transmissive elements 368 to be formed of any the materials that may be used to form substrate 366. Optionally, transmissive elements 368 may be formed of a material different from superstrate 366 and may be, for example, press fit into microfluidic chip 320.

Supplying a driving frequency to each IDT 512 causes the IDT 512 to generate a surface acoustic wave that travels along the length of the acoustically-transmissive material band 612, into the transmissive element 368 and then into the microfluidic channel 330. The surface (A) of the band 612, wherein the surface acoustic wave is traveling, contacts the transmissive element 368 and acoustic energy from the surface acoustic wave is conveyed to the fluid within the channel 330. According to some embodiments, the transmissive elements 368 may be provided at an angle, taking into account the propagation of the acoustic wave via diffraction at the Rayleigh angle, such that a Lamb wave traveling toward the switching region may be most efficiently directed.

Optionally (as shown in FIG. 19B), a coupling element 367*d* may be provided between each band 612 of the surface acoustic wave generator assembly 505 and the associated transmissive element 368. In one preferred embodiment, the coupling element 367*d* may be provided as a releasable epoxy (or other bonding element). As would be apparent to persons of ordinary skill in the art, given the benefit of this disclosure, other coupling elements 367 as described herein may be provided. Alternatively and/or additionally, acoustic coupling of the surface acoustic wave generator assembly 505 to the microfluidic chip 320 may be facilitated by subjecting the engagement surface area to a compressive load. For example, the canted mounting elements 620*a* may be provided as spring-loaded elements in order to manage engagement tolerances and/or to establish a preloaded engagement of the layers 612 to the microfluidic chip 320.

Figure 20:
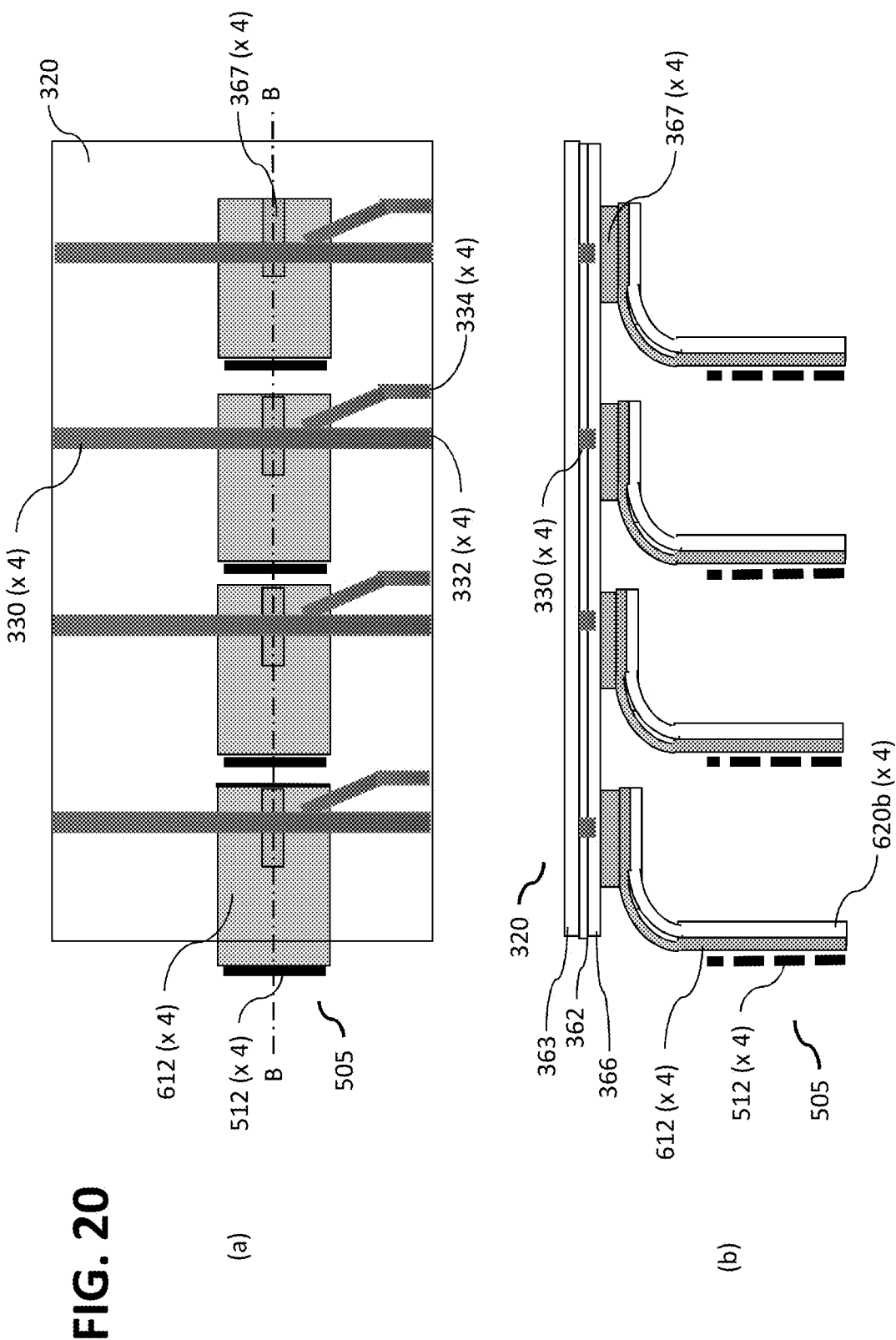
FIG. 20 schematically illustrates a top view (a) and a side view (a) of a portion of a microfluidic chip operatively engaged in a switching region to a plurality of SAW generation devices according to aspects of the disclosure.

FIG. 20 schematically illustrates a surface acoustic wave generator assembly 505 having a plurality of acoustic wave generators provided on "bent" or curved instrument mounting elements 620*b* capable of supplying surface acoustic waves to a plurality of microfluidic channels 330. Each surface acoustic wave generator includes an IDT 512 and its associated acoustically-transmissive material band 612. Additionally, a coupling element 367 and a microfluidic channel 330 are associated with each surface acoustic wave generator. Supplying a driving frequency to IDT 512 causes the IDT 512 to generate a surface acoustic wave that travels along the length of the acoustically-transmissive material band 612, into the coupling element 367, into the superstrate 366 and into the microfluidic channel 330.

Referring to FIG. 20(*a*), the IDTs 512 are arranged so that the switching regions of the individual channels 330 are in alignment. This arrangement may simplify the architecture of the microfluidic channels 330 and the microfluidic chip 320. Each IDT 512 may be provided in a plane of the instrument mounting elements 620*b* that is oriented at an angle to the plane of the microfluidic chip 320. Referring to FIG. 20(*b*), this angle may be substantially 90 degrees. The surface acoustic waves generated by the IDT travel on the surface of the transmissive material band 612 around the bend where the acoustic energy is then transmitted into the coupling element 367. In the vicinity of the microfluidic channels 330 the surface of the transmissive material band 612 may be parallel to the major plane of the microfluidic chip 320 in the vicinity of the microfluidic channels 330. The bend may be more than 90 degrees or less than 90 degrees. A bend less than 90 degrees may be desirable to minimize surface acoustic wave energy loss as the surface acoustic wave travels around the bend.

As with the embodiments shown in FIGS. 18 and 19, the IDTs 512 and their associated piezoelectric material bands 612 illustrated in FIG. 20 may be formed separately from the microfluidic chip 320 and may be associated with and provided as part of the instrument 620. Again, the microfluidic chip 320 may be removably and operatively engaged with the IDTs provided with the instrument. In the embodiment of FIG. 20, the microfluidic chip 320 is shown with two substrate layers, 362, 363 and superstrate layer 366. Further, the channels 330 may be formed partially or completely within superstrate layer 366.

Figure 21:
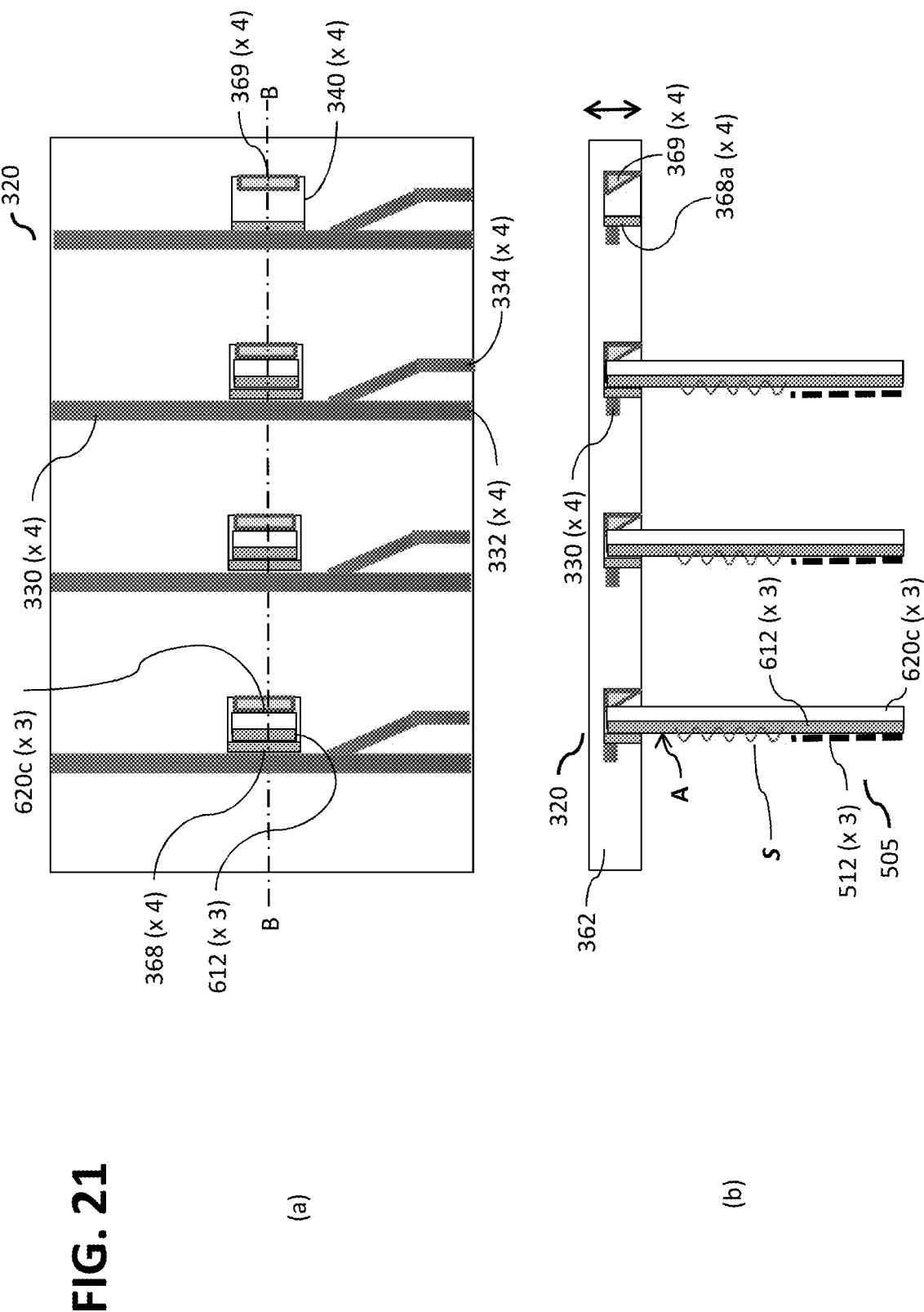
FIG. 21 schematically illustrates a top view (a) and a side view (a) of a portion of a microfluidic chip operatively engaged in a switching region to a plurality of SAW generation devices according to aspects of the disclosure.

FIG. 21 schematically illustrates an embodiment of a surface acoustic wave generator assembly 505 having a plurality of surface acoustic wave generators 510 provided on instrument mounting elements 620*c* that extend substantially perpendicular to the major plane of the microfluidic chip 320 and which are capable of supplying surface acoustic waves to a plurality of microfluidic channels 330. For explanatory purposes, the fourth surface acoustic wave generator and associated instrument mounting element 620*c* is not shown. In general, a surface acoustic wave generator assembly 505 may include any number of one or more surface acoustic wave actuators or generators associated with any number of one or more microfluidic channels.

Referring to FIG. 21, the surface acoustic wave generator assembly 505 is configured so that the switching regions of the individual channels 330 are in alignment. Each surface acoustic wave generator includes an IDT 512 and its associated acoustically-transmissive material band 612. Additionally, a transmissive element 368*a* and a microfluidic channel 330 are associated with each surface acoustic wave generator. Supplying a driving frequency to IDT 512 causes the IDT 512 to generate a surface acoustic wave that travels along the length of the acoustically-transmissive material band 612, into the transmissive element 368*a* and into the microfluidic channel 330.

Transmissive element 368*a* may form a sidewall of the microfluidic channel 330, at least in the vicinity of the switching region, and may be in direct contact with fluid within the microfluidic channel 330. Transmissive element 368*a* may be formed of any relatively high acoustically transmissive materials. As one non-limiting example, transmissive element 368*a* may be formed of any the materials that may be used to form substrate 366.

The distal end of each instrument mounting element 620*c* and its associated acoustically-transmissive material band 612 extend into a pocket or other recessed region 340 of the microfluidic chip 320. The surface (A) of the band 612, wherein the surface acoustic wave is traveling, contacts the transmissive element 368*a* and acoustic energy from the surface acoustic wave is conveyed to the fluid within the channel 330. Optionally (not shown in FIG. 21, but similar to embodiments previously described), a coupling element such as a fluid filled blister pack may be used to facilitate the operative engagement of the surface acoustic wave generator assembly 505 to the microfluidic chip 320.

A camming or pre-load element 369 may be provided between the instrument mounting element 620*c* and the chip 320 to ensure that the distal end of the surface acoustic wave generator is sufficiently operatively engaged to the microfluidic chip 320. The camming or pre-load element 369 may include a ramp, a toggle, a spring, an elastomeric pad, etc. As shown in FIG. 21, the pre-load element 369 may be provided with the chip 320 and may be located within the recessed region 340 that accommodates the distal end of the surface acoustic wave generator. Optionally (not shown), the pre-load elements 369 may be included as part of the surface acoustic wave generator assembly 505, and thus, provided with the instrument 620.

The basic substrate assembly of the microfluidic chip 320 may be formed from a plurality of layers bonded or otherwise integrated together, or optionally, the basic substrate of the chip 320 maybe formed from a 3D or other additive manufacturing process.

Figure 22:
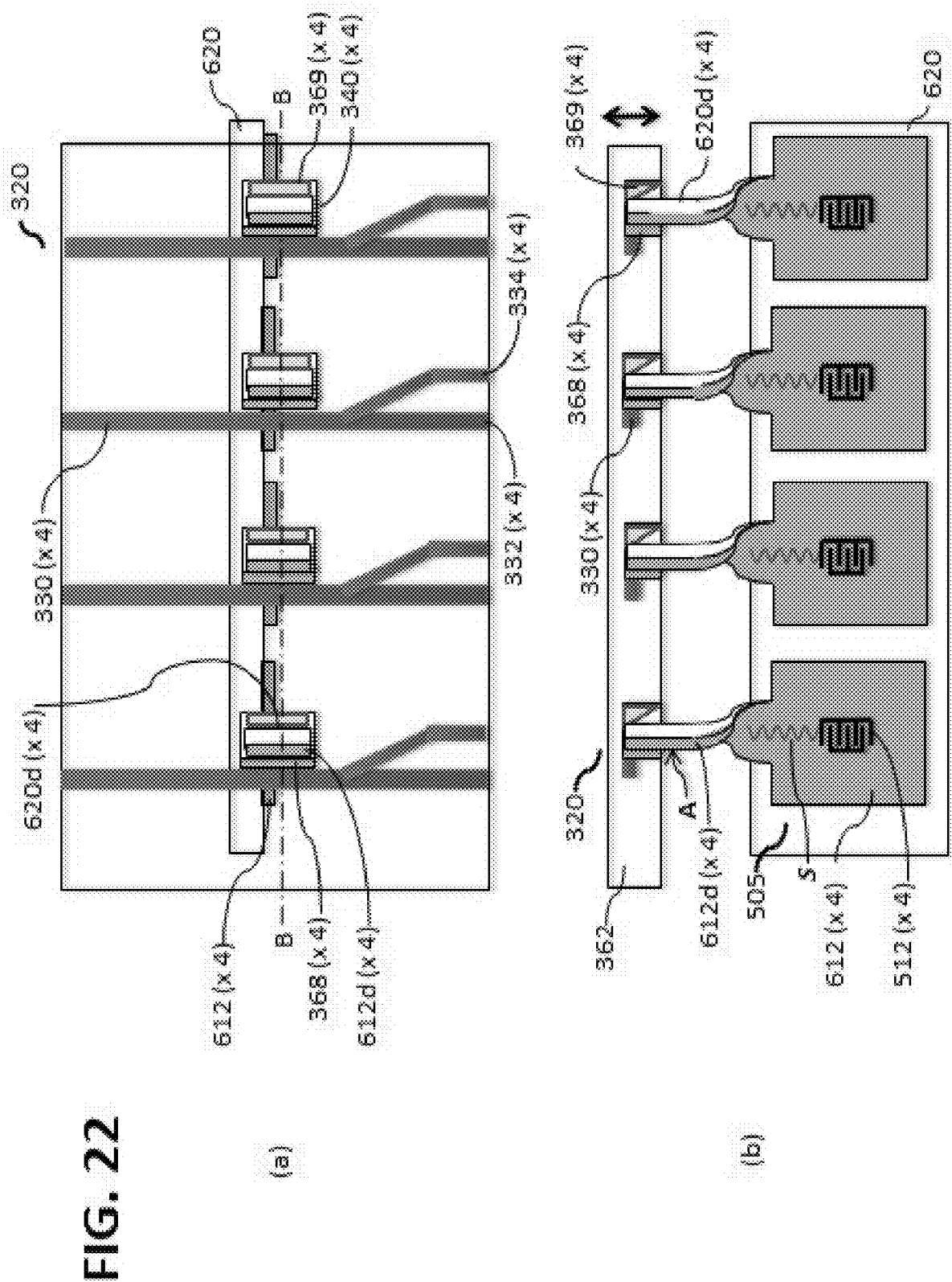
FIG. 22 schematically illustrates a top view (a) and a side view (a) of a portion of a microfluidic chip operatively engaged in a switching region to a plurality of SAW generation devices according to aspects of the disclosure.

FIG. 22 schematically illustrates an embodiment of a surface acoustic wave generator assembly 505 having a plurality of surface acoustic wave generators provided on instrument mounting elements 620d that extend substantially perpendicular to the major plane of the microfluidic chip 320 and which are capable of supplying surface acoustic waves to a plurality of microfluidic channels 330. Similar to FIG. 21, the surface acoustic wave generator assembly 505 is configured so that the switching regions of the individual channels 330 are in alignment. Each surface acoustic wave generator includes an IDT 512 and its associated acoustically-transmissive material band 612d. Additionally, a transmissive element 368a may be associated with each surface acoustic wave generator. Supplying a driving frequency to IDT 512 causes the IDT 512 to generate a surface acoustic wave (S) that travels along the length of the acoustically-transmissive material band 612d, into the transmissive element 368a and then into the microfluidic channel 330.

However, unlike the instrument mounting elements 620c of FIG. 21, the instrument mounting elements 620d of FIG. 22 are provided with a longitudinal twist. In this particular embodiment, the amount of longitudinal twist is 90 degrees. In general, the amount of twist is not limited to 90 degrees and may be greater than 90 degrees or less than 90 degrees. At the distal end of each of the instrument mounting elements 620d, the surface (A) of the layer of acoustically-transmissive material 612d is arranged parallel with the longitudinal axis of the associated flow channel 330. At the proximal end of each of the instrument mounting elements 620d, the surface (A) of the layer of acoustically-transmissive material 612d is arranged perpendicular to the longitudinal axis of the associated flow channel 330. Between the distal and proximal ends of the instrument mounting elements 620d the surface (A) of the layer of acoustically-transmissive material 612d is provided with a smooth half twist. At the proximal end of the instrument mounting elements 620d, the acoustically-transmissive material 612d forms a continuous layer with the acoustically-transmissive material 612 upon which the IDTs 512 are provided. Thus, a plurality of IDTs 512 may be formed in the same plane and the associated plurality of surface acoustic waves (S) may be delivered to one or more planes different from the plane within which the plurality of IDTs 512 lie.

As shown in FIG. 22, the acoustically-transmissive material 612 upon which the IDTs 512 are provided may be formed as separate pads (i.e., items 612 (×4)) and there may be a one-to-one correspondence between the IDTs 512 and the associated instrument mounting elements 620d and microfluidic channels 330. Optionally (not shown), the acoustically-transmissive material 612 upon which the IDTs 512 are provided may be formed as a single pad that extends under a plurality of the IDTs 512. This may allow a single IDT 512, for example a tapered IDT, to provide surface acoustic waves (S) to a plurality of channels 330 (similar to the IDT shown in FIG. 18A).

As with the embodiments shown in FIGS. 18, 19 and 20, the surface acoustic wave generator assembly 505 (e.g., the IDTs 512 and their associated piezoelectric or acoustically-transmissive material bands 612) illustrated in FIGS. 21 and 22 may be formed separately from the microfluidic chip 320 and may be associated with and provided as part of the instrument 620. The microfluidic chip 320 may be removably and operatively engaged with the surface acoustic wave generator assembly 505 that is provided with the instrument 620.

Further, coupling elements 367 (not shown in FIGS. 21 and 22) as described with respect to FIGS. 18, 19 and 20 may also be provided to facilitate the transmission of the surface acoustic wave energy from the surface acoustic wave generator assembly 505 to the microfluidic chip 320. As disclosed above, such coupling elements 367 may be deformable (elastic, quasi-elastic, viscoelastic, etc.) and/or may include water, gel, water-based gel, a thin-film, a fluid-filled blister pack (with a stiff membrane or with a highly elastic membrane). Also as disclosed above, the coupling elements 367 need not be deformable, but may be provided as a reversible solid/liquid polymer, epoxy, etc. that temporarily provide acoustic coupling between the microfluidic chip 320 and the surface acoustic wave generator assembly 505.

Figure 23:
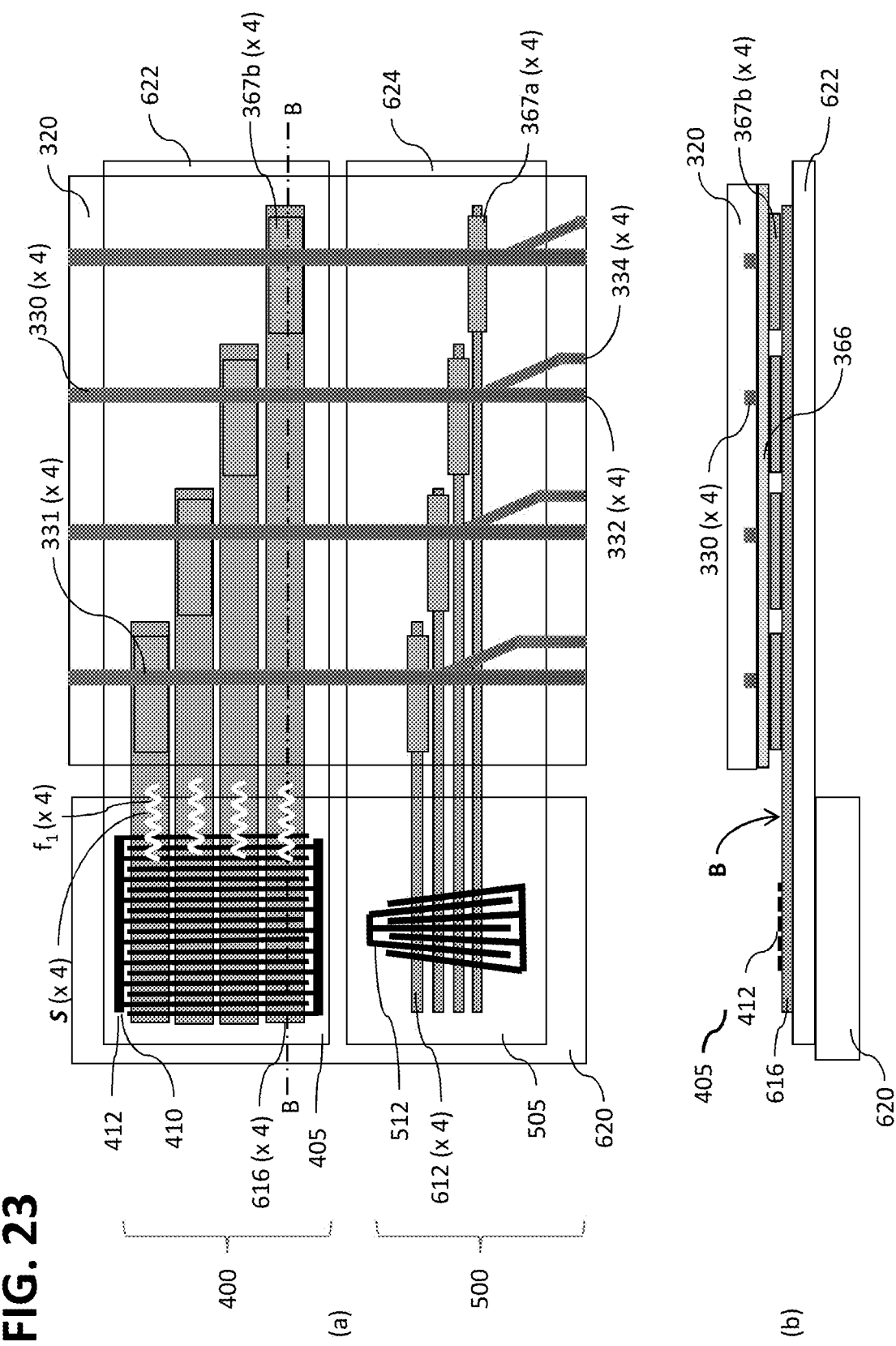
FIG. 23 schematically illustrates a top view (a) and a side view (a) of a portion of a microfluidic chip operatively engaged in a focusing region and a switching region to SAW generation devices according to aspects of the disclosure.
Figure 24:
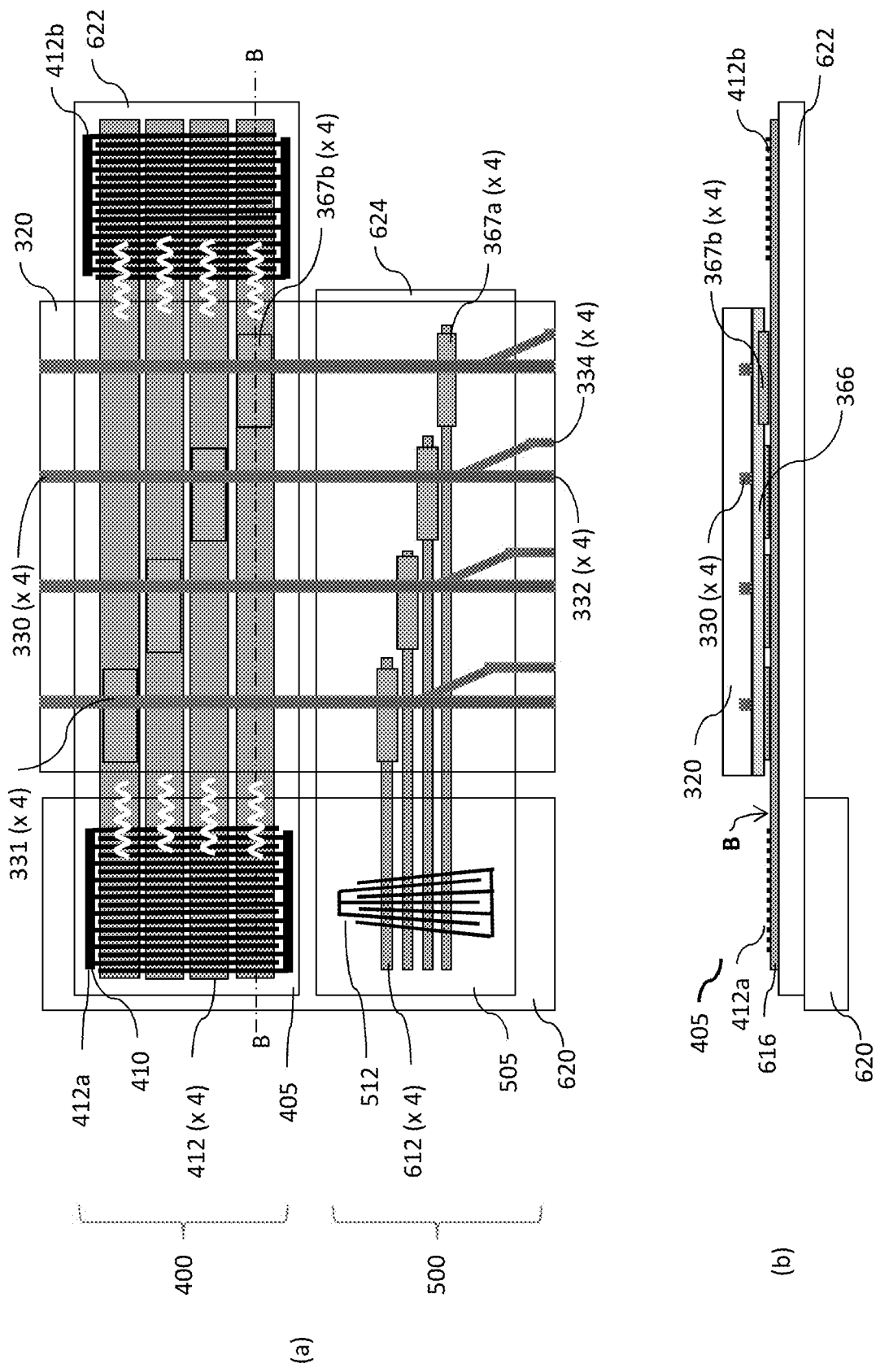
FIG. 24 schematically illustrates a top view (a) and a side view (a) of a portion of a microfluidic chip operatively engaged in a focusing region and a switching region to SAW generation devices according to aspects of the disclosure.
Figure 25:
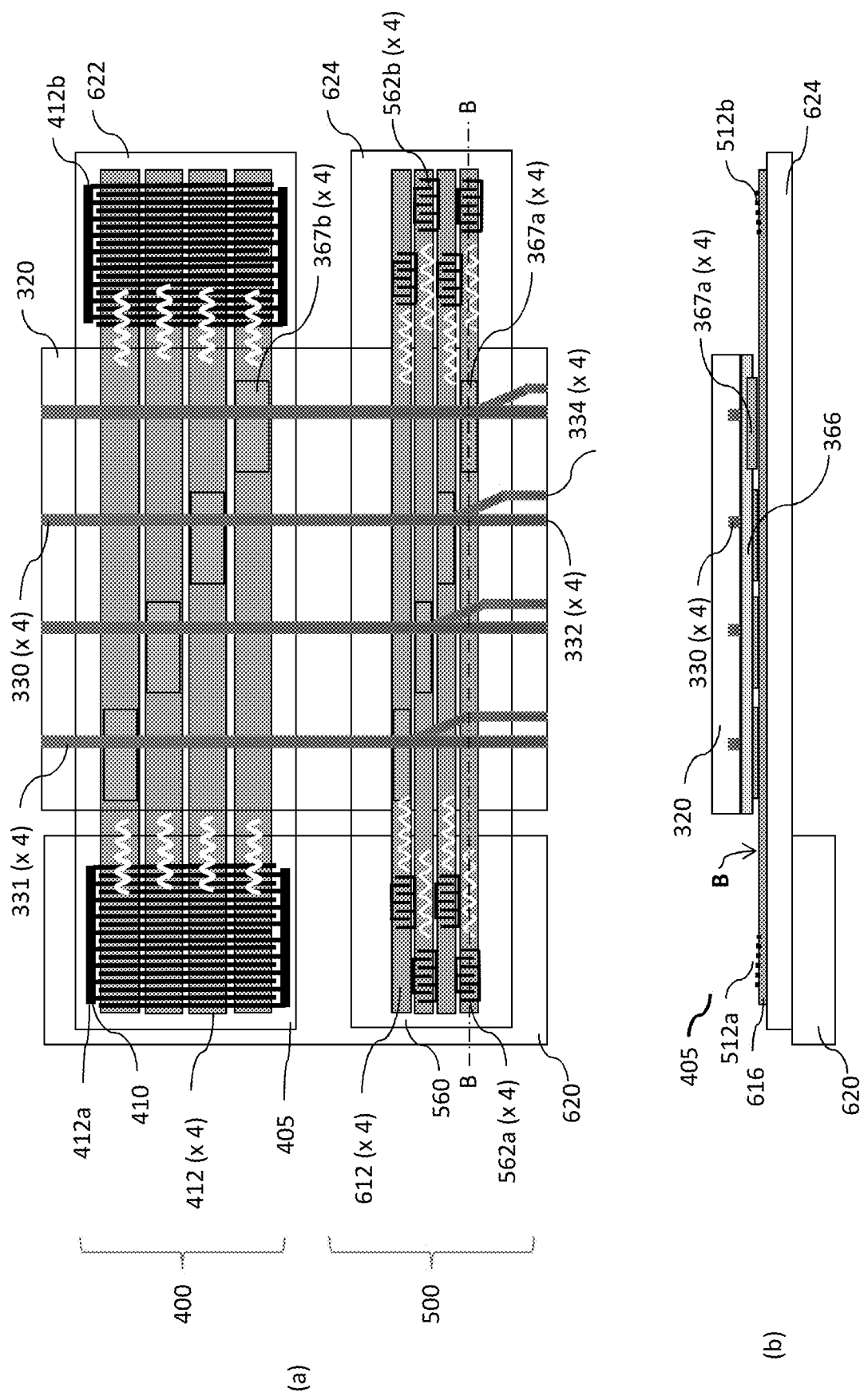
FIG. 25 schematically illustrates a top view (a) and a side view (a) of a portion of a microfluidic chip operatively engaged in a focusing region and a switching region to SAW generation devices according to aspects of the disclosure.

Referring now to FIGS. 23, 24 and 25, according to certain embodiments, each of the plurality of microfluidic flow channels 330 of the microfluidic chip 320 may include both a focusing mechanism 400 for entraining particles flowing within the channels 330 and a switch mechanism 500 for sorting, deflecting, diverting and/or directing particles flowing within the channels 330 into various selected channel portions or collection elements 332, 334. Both the focusing mechanism 400 and the switch mechanism 500 may be provided with the instrument and the microfluidic chip 320 may be removably operatively engaged to these mechanisms. Referring to FIGS. 7 to 22, the switch mechanism 500 may be provided according to any of the aspects and embodiments described above.

According to certain aspects, the focusing mechanism 400 may include a surface acoustic wave (SAW) generation device. As such, the disclosure presented above with respect to a surface acoustic wave generator assembly 505 for the switch mechanism 500 may be similarly applied to a surface acoustic wave generator assembly 405 for the focusing mechanism 400.

According to certain preferred aspects, the focusing mechanism 400 may include a surface acoustic wave (SAW) actuator 410 or generation device. Surface acoustic wave generator 410 may include one or more IDTs 412. According to some embodiments and as shown in FIG. 23, a single IDT 412 may be provided and the geometry and/or the surface of the microfluidic channels 330 at the focusing site 331 may be configured to reflect the acoustic wave in the channel 330 so as to create a standing interference pattern or a standing surface acoustic wave (SSAW). Alternatively, as shown in FIG. 24, a pair of IDTs 412a, 412b may be provided, one on either side of the microfluidic channels 330 and aligned with the focusing sites 331. Each of the IDTs 412a, 412b may generate opposing (for example, equal and opposite) surface acoustic waves that merge to create standing interference patterns within the fluid of the microfluidic channels 330.

FIG. 23 schematically illustrates an embodiment of a microfluidic chip 320 that may be operatively engaged with and then disengaged from both the surface acoustic wave generator assembly 405 and the surface acoustic wave generator assembly 505 on the instrument 620. In this particular embodiment, surface acoustic wave generator assembly 405 includes a single IDT 412 for generating surface acoustic waves at a single frequency for focusing particle streams flowing through the plurality of microfluidic channels 330. IDT 412 is formed on surface (B) of the piezoelectric material layers 616 which are included as part of the surface acoustic wave generator assembly 405 of the instrument 620/622. IDT 512 may generate a plurality of surface acoustic waves (S), one for each microfluidic channel 330, which travel along a plurality of acoustically-transmissive (i.e., low-acoustically lossy) material bands 616. Each band 616 is associated with a focusing region 331 of a microfluidic channel 330. Thus, IDT 412 may be activated to generate a plurality of surface acoustic wave (S) at a frequency $f_1$, each of the waves being aligned with and traveling along one of the plurality of bands 616 to eventually reach the focusing region 331 of each of the microfluidic channels 330. Each acoustically-transmissive material band 616 may be isolated along at least a portion of its length (via an air gap or a gap filled with an acoustically lossy material) from the other acoustically-transmissive material bands 616.

As shown in FIG. 23, in the vicinity of focusing regions 331 of the individual microfluidic channels 330, each acoustically-transmissive material band 616 may contact an acoustic-energy coupling element 367 (as described above) in order to direct acoustic energy from the surface acoustic wave S into a superstrate 366 of the microfluidic chip 320. As best shown in FIG. 23, top view (a), each of the focusing regions 331 of the microfluidic channels 330 may be longitudinally offset or staggered so that the focusing region of each of the channels 330 is aligned with the acoustically-transmissive material bands 616 and the coupling elements 367.

As discussed with respect to FIGS. 17A and 17B, the microfluidic channels 330 of FIG. 23 may be provided with acoustic wave reflective elements (534a, 534b, not shown) on the side of the channel opposite the IDT 412 so that a standing interference pattern or a standing surface acoustic wave (SSAW) may be formed within the microfluidic channel. Further, the microfluidic channels 330 may be spaced apart by an integer multiple of wavelengths. According to certain embodiments, a low pressure node of the standing surface acoustic waves may be centered within the microfluidic channels.

Alternatively, as shown in FIG. 24, first and second IDTs 412a, 412b may be provided on opposite sides of the microfluidic channels 330. A standing interference pattern or a standing surface acoustic wave (SSAW) may be formed within the microfluidic channels when the IDTs 412, 421b generate equal and opposite surface acoustic waves. The microfluidic channels 330 may be spaced apart by an integer multiple of wavelengths. According to certain embodiments, a low pressure node of the standing surface acoustic waves may be centered within the microfluidic channels.

According to certain aspects as shown in FIG. 25, the focusing mechanism 400 may include a standing surface acoustic wave generator (SSAW) 405 provided with one or more IDTs 412 (for example, as disclosed in FIG. 24) and the switch mechanism 500 may also include a standing surface acoustic wave (SSAW) actuator 560 or generation device. Surface acoustic wave generator 560 may include one or more IDTs 562. According to some embodiments, a single IDT 562 may be provided for each microfluidic channel 330 and the geometry and/or the surface of the microfluidic channels 330 in the switching region may be configured to reflect the acoustic waves in the channels 330 so as to create standing interference patterns (including, optionally, traveling standing surface acoustic wave (TS-SAW)).

Alternatively as shown in FIG. 25, pairs of IDTs 562a, 562b may be provided, one on either side of the microfluidic channels 330 in the switching region. Each of the IDTs 562a, 562b may generate opposing surface acoustic waves that merge to create a standing interference pattern within the fluid of the microfluidic channels 330. For example, each of the IDTs 562a, 562b may generate equal and opposite surface acoustic waves. Switching may rely on pressure gradients or acoustic radiation forces exerted on the particles within the microfluidic channel 330 to move the particles from areas of higher pressure to lower pressure. Specifically, the pairs of IDTs 562a, 562b may generate a SSAW that forms one or more pressure nodes and anti-nodes within the channel, thereby dividing the particles as they flow along a length of the channel into a plurality of particle streams aligned with the nodes or anti-nodes. The particles may be segregated based on their volume, density, compressibility or other acoustic contrast factor. Downstream of the particle separating stage, the various segregated streams of particles may flow into multiple collection outlets that are aligned with the streams.

FIGS. 23, 24 and 25 illustrate that each of the plurality of microfluidic flow channels 330 of the microfluidic chip 320 may include both a focusing mechanism 400 for entraining particles flowing within the channels 330 and a switch mechanism 500 for sorting, deflecting, diverting and/or directing particles flowing within the channels 330. FIGS. 23, 24 and 25 further illustrate that one or both of the focusing mechanism 400 and the switch mechanism 500 may be provided with the instrument and the microfluidic chip 320 may be removably operatively engaged to these mechanisms. Referring to FIGS. 18A, 18B, 19 to 22, any of the various embodiments of the switch mechanism 500 may be provided according to any of the aspects and embodiments described above. Further, any of the various embodiments of the focusing mechanism 400 may be provided according to any of the aspects and embodiments described above for the switch mechanism 500 as persons of ordinary skill in the art, given the benefit of this disclosure, would understand these aspect to be applicable to the focusing mechanism 400.

Any of a variety of manufacturing techniques may be used to form the microfluidic chip, including molding, bonding, micromachining, lithography or other patterning technique, etching, electro-discharge machining, deposition, 3D printing, surface preparation, etc. According to some aspects, the microfluidic chip (or portions thereof) may be formed using microelectromechanical (MEMS) technology. Thus, for example, semiconductor device fabrication techniques may be used to form the focusing mechanism 400, the switch mechanism 500, and/or portions thereof.

According to certain other aspects, a sorting algorithm may be implemented and/or optimized using the particle processing system embodiments disclosed above. An exemplary sort monitoring system for monitoring performance of a particle processing system is disclosed in US Patent Publication No. 2012/0277902 (Ser. No. 13/342,756; filed Jan. 3, 2012), "Method and Apparatus for Monitoring and Optimizing Microfluidic Particle Sorting," the content of which is hereby incorporated by reference in its entirety.

For example, referring to FIGS. 6A and 6B, a sorting mechanism 500 is associated with microfluidic flow channel 330 and located downstream of a primary particle interrogation site 314. Particle interrogation site 314 may be operatively engaged with particle interrogation system 110 and further may be operatively engaged with the control system 150 (see FIG. 3) in order to detect certain particle characteristics and make sorting decisions based on those particle characteristics. Switching mechanism 500 is also operatively engaged with control system 150 to receive instructions consistent with the sorting decisions. As part of the sort monitoring system, one or more secondary particle interrogation sites 314*a* may be provided downstream of the switching mechanism 500 in one or more of the downstream channels 332, 334.

In FIG. 6A, a secondary particle interrogation site 314*a* (dashed lines) is shown associated with keep channel 334. Particle interrogation site 314*a* may be operatively associated with a secondary particle interrogation system and further may be operatively associated with the control system 150 so as to form a sort monitoring system. The secondary particle interrogation system may be provided as part of the primary particle interrogation system 110 or as a stand-alone particle interrogation system and may use optical sensors, passive or active electrical detection including but not limited to conductance, capacitance, RF field monitoring through devices fabricated on the microchip, or located off-chip near channels of interest, magnetic detection, such as using a Hall-effect device or other field probes located in the proximity of flow-channels, and acoustic detection such as ultrasound absorption, reflection, scatter or the like using on-board or remote devices. Other optornechanical or electromagnetic sensing systems may also be employed.

The sort monitoring system (e.g., at least in part, the particle interrogation system, control system and associated sort monitoring algorithm) may be used to monitor the sort performance, to confirm the adequacy of the focusing, detection and/or switching optimization algorithms, to provide feedback to the sorting algorithm, and/or to control or modify one or more operational parameters of the particle processing system (flow rate, pressure, particle throughput, interrogation beam intensity, sort delay, switching parameters, etc.). As non-limiting examples, optimum sort performance may be determined or based on a purity of the sorted sample, a retention of a predetermined particle type in the sorted sample, an exclusion of a predetermined particle type in the sorted sample, an expected sort particle count of the sorted sample, a sort fraction of the sorted sample, a sort accuracy of the sorted sample, a throughput speed, a viability of the sample, and/or a combination of the above. Thus, sort monitoring to determine and/or maintain an optimum sort performance may be based on evaluating a statistically-based characteristic of the sorted sample. The statistically-based characteristic of the sorted sample may be related to an individual performance of one of the particle sorters or to a collective performance of a plurality the particle sorters. The sort monitoring method may include evaluating the statistically-based characteristic of the sorted sample relative to a statistically-based characteristic of the sort decisions and/or switch mechanism actuations. The sort monitoring system may evaluate the characteristic of the sorted sample relative to its expected characteristic and/or desired characteristic and take an action based thereon According to various embodiments, the sort monitoring system may include a switching optimization algorithm which may be used to control or modify one or more operational parameters of the switching mechanism to thereby optimize the performance of the switching mechanism. For example, the sort monitoring system may be used to determine and/or maintain the optimum sort delay (i.e., the time between the upstream detection of a particle and the actuation of the downstream switching mechanism). The sort delay may be tuned using the switching optimization algorithm and embodiments of the switching mechanism disclosed above. As another example, the sort monitoring system may be used to determine and/or maintain the location of the optimum switching region. The location of the switching region may be tuned using the switching optimization algorithm and embodiments of the switching mechanism disclosed above.

Figure 26:
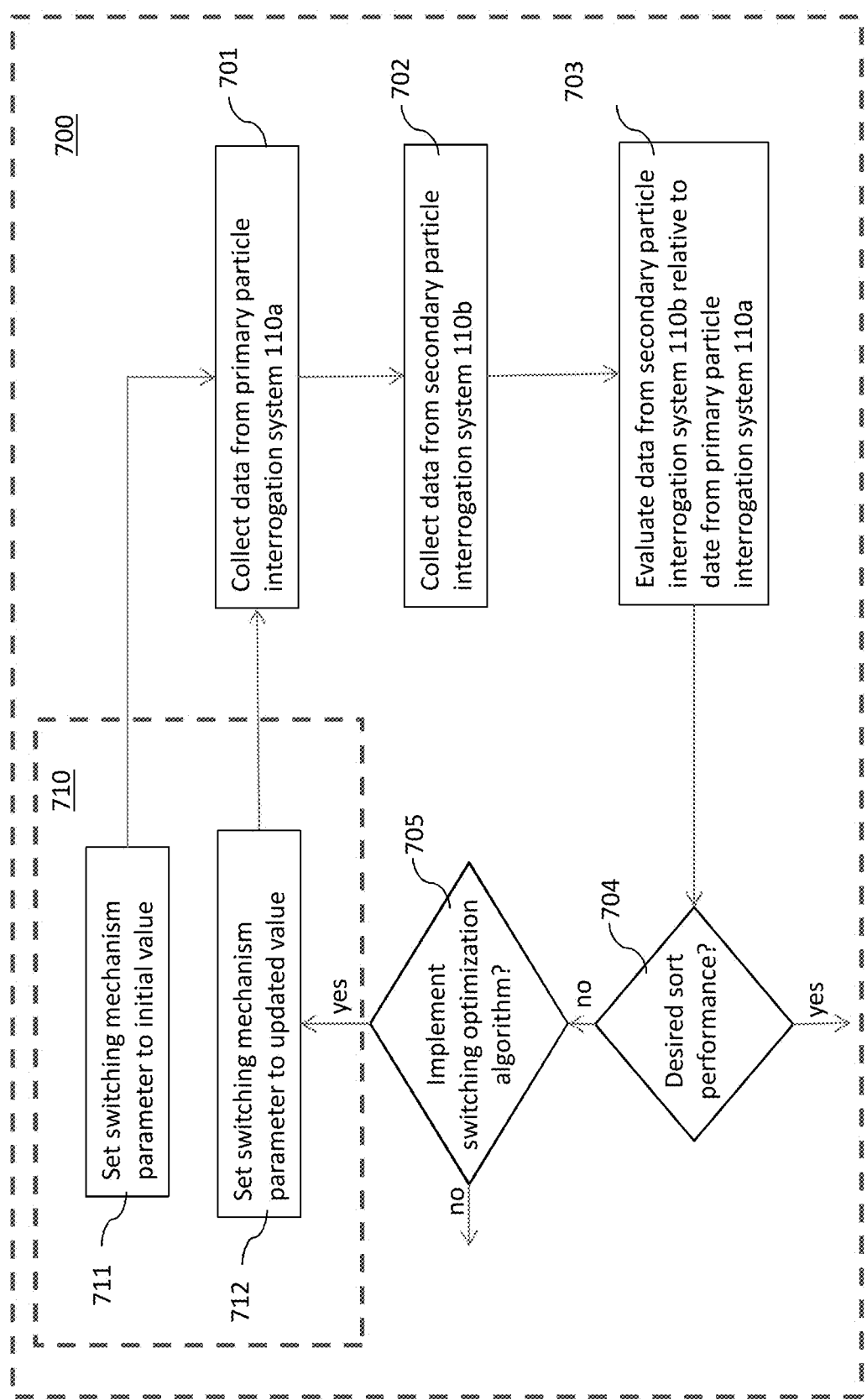
FIG. 26 is a flow chart illustrating an embodiment of a sort monitoring algorithm with a switching optimization algorithm according to aspects of the disclosure It is to be noted that the various features and combinations of features described below and illustrated in the figures can be arranged and/organized differently to result in embodiments which are still within the spirit and scope of the present disclosure. Further, components in the drawings are not necessarily to scale nor are they necessarily rendered proportionally, emphasis instead being placed upon clearly illustrating the relevant principles. Even further, various features may not be show in certain figures in order to simplify the illustrations. Additionally, for the purposes of describing or showing items between layers or behind other elements or for generally simplifying the views in certain of these figures, various components or elements may be illustrated as transparent and/or cross-hatching or other standard drawing techniques may be not be presented. To assist those of ordinary skill in the art in making and using the disclosed systems, assemblies and methods, reference is made to the appended figures.

Referring to FIG. 26, a sort monitoring system includes a sort monitoring algorithm 700. In a first step 701, data is collected from the primary particle interrogation system 110*a*. This data may include information on the number of particles detected; specific characteristics of the particles detected including for example, one or more optical signatures, velocity, etc.; time of particle detection; sort decision associated with the particle; one or more operating parameters of the particle processing system including, for example, one or more operating parameters of the switching mechanism; etc. In a second step 702, data is collected from the secondary particle interrogation system 110*b*. This data may include information on the number of particles detected; specific characteristics of the particles detected including for example, one or more optical signatures, velocity, etc.; time of particle detection; sort decision associated with the particle; one or more operating parameters of the particle processing system including, for example, one or more operating parameters of the switching mechanism; etc. In a third step 703, data collected from step one and from step two may be evaluated to determine if the desired sort performance is being met. The third step may involve a statistical evaluation of the data collected in step one, a statistical evaluation of the data collected in step two, and a comparison or relation of data from the secondary particle interrogation system 110*b* to the data from the primary particle interrogation system 110*a*. Notwithstanding that the steps are labeled "first," "second," "third," etc., any of the steps may occur in any order and may be carried out sequentially, simultaneously, partially simultaneously, etc. Further, the sort monitoring algorithm may be implemented real-time, i.e., during a sorting operation. Optionally, the sort monitoring algorithm, particularly third step 703, may be performed off-line, subsequent to a sorting operation run, for purposes of evaluating a sorted sample, sort performance of the instrument, and/or operating characteristics of the instrument.

Even further, the operating characteristics of the instrument and/or of the switch mechanism may be evaluated and/or modified during a sorting operation based on real-time implementation of the sort monitoring algorithm 700. Thus, still referring to FIG. 26, a switching optimization algorithm 710 may be provided to real-time modify switch operating parameters and real-time evaluate the sort performance using the sort monitoring algorithm. For example, according to one embodiment, in a first step 711, the switching optimization algorithm 710 may set a switching parameter to an initial value. In a second step 712, the switching optimization algorithm 710 may set the switching mechanism parameter to an updated value. After the switching mechanism parameter is updated, data may be collected from the primary and secondary particle interrogation systems 110*a*, 110*b* and evaluated to determine if the desired sort performance is being met. This second step 712 may only be implemented if the desired sort performance (as determined by the sort monitoring algorithm) has not been met. Further, this second step 712 may only be implemented if a decision has been made to implement the switching optimization algorithm 710 (as opposed to implementing a separate, distinct optimizing algorithm).

Switching mechanism parameters that may be set and modified or updated as part of implementing sort monitoring may include a drive signal frequency, for example, as applied to a tapered IDT. Varying the drive signal frequency applied to a tapered IDT corresponds to varying the location of the aperture of the generated surface acoustic wave along the length of the tapered IDT (see, e.g., FIG. 11A). Thus, given a set sort delay value, at a first drive signal frequency, the IDT may generate a surface acoustic wave that operates on a region of the microfluidic channel exactly when the particle reaches that region from the primary interrogation site. However, it may be that at a first drive signal frequency, the IDT may generate a surface acoustic wave that operates on a region of the microfluidic channel before or after the particle reaches that region from the primary interrogation site. In such case, in order to optimize sort performance, the drive signal frequency may be increased or decreased so that the IDT generates a surface acoustic wave that operates on a region of the microfluidic channel slightly upstream or slightly downstream of the first frequency region. In other words, an optimized drive signal frequency may be determined so that the sort delay value triggers the surface acoustic wave to be generated so that the surface acoustic wave and the particle simultaneously occupy the same region. Similarly, if the switching mechanism is provided as a series of IDTs (see, e.g., FIG. 11B), then optimizing the sort performance may include determining whether the drive signal should be supplied to the first, second, third, etc. IDT in the series.

Optionally, switching mechanism parameters that may be set and modified or updated during the sort monitoring procedure may include whether one or more drive signal frequencies are applied to a tapered IDT. Sort performance may be optimized by applying a plurality of drive signal frequencies sequentially or simultaneously. If a series of IDTs are supplied, then sort performance may be optimized by applying a plurality of drive signals sequentially or simultaneously to certain of the IDTs in the series.

Further, switching mechanism parameters that may be set and modified or updated during the sort monitoring procedure may include the shape of the drive signal. For example, sort performance may be optimized by applying a drive signal that gradually increases (or decreases or both) in strength, that changes frequency over time, that is pulsed multiple times as an individual particle passes through the switching region, etc.

By implementing a sort monitoring algorithm with a switching optimization algorithm, the ideal input drive signal characteristic (e.g., frequency, waveform, etc.), acoustic wave aperture region, etc. may be determined. A switching optimization algorithm may be implemented with any of the above described switching mechanisms, including both TSAW switching mechanisms and SSAW (or TSSAW) switching mechanisms. Advantageously, with a single hardware configuration (e.g., tapered IDTs, a series of IDTs, focused IDTs, tunable IDTs, and/or combinations thereof, etc.), a plurality of switching algorithms may be implemented. For a given desired sort performance, the switching optimization algorithm may determine which specific switching algorithm is best. If operational conditions shift during a sorting operation, the sort monitoring system may real-time activate its switching optimization algorithm and the specific switching algorithm may be updated.

Thus, according to certain aspects, a particle processing system may include a microfluidic sort module having a branched flow-channel configured to receive a stream of particles and a particle sorter configured to selectively sort particles between a first output branch channel and a second output branch channel of the branched flow-channel; and a sort monitoring system configured to monitor the performance of a sorting operation by determining a statistically-based characteristic of a sorted sample, wherein the sort monitoring system is configured to real-time evaluate the statistically-based characteristic of the sorted sample, and wherein the sorting monitoring system includes a switching optimization algorithm. The particle processing system may include a programmable controller responsive to an output of the sort monitoring system. The programmable controller may be configured to control one or more operations of the particle processing system based on a statistically-based characteristic of the sorted sample. For example, the programmable controller may be configured to adjust one or more input drive signals applied to a switching mechanism in order to align the actual sort performance with the desired sort performance.

In general, the sort monitoring system may be configured to track a particle at different locations in the particle processing system. The sort monitoring system rimy be configured to real-time evaluate the particle sorter performance based on one or more sort parameters. The one or more sort parameters may include a baseline event rate or a baseline margin of error for one of the output branch channels. The microfluidic sort module of the particle processing system may include a plurality of the branched channels and a plurality of the particle sorters for sorting particles within the branched channels, wherein the sort monitoring system includes a monitor sensor configured to monitor a statistically-based characteristic of a sorted sample, and wherein the sort monitoring system is configured to real-time evaluate a collective performance of the plurality of particle sorters.

A method for processing particles flowing through a particle sorting system may include receiving a stream of particles in a branched flow-channel of the particle sorting system; using a particle sorter to selectively sort the particles in the stream of suspended particles between a first output branch channel and a second output branch channel of the branched flow-channel; monitoring a sorting operation to determine a statistically-based characteristic of a sorted sample; evaluating the statistically-based characteristic of the sorted sample in real-time relative to a predetermined sort performance criteria; and implementing a switching optimization algorithm to optimize the sort performance. The characteristic may be related to an individual performance of one of the sorters and/or to a collective performance of a plurality of the sorters. The statistically-based characteristic of the sorted sample may be at least one of a purity of the sorted sample, a retention of a predetermined particle type in the sorted sample, an exclusion of a predetermined particle type in the sorted sample, an expected sort particle count of the sorted sample, a sort fraction of the sorted sample, or a sort accuracy of the sorted sample. A programmable microprocessor may be used for evaluating the characteristic and taking an action based thereon. The method may include controlling the operation of the switching mechanism based on an output of the sort monitoring system. For example, the method may include controlling the operation of the switching mechanism based on the evaluated statistically-based characteristic of the sorted sample. The method may include adjusting an input drive signal applied to the switching mechanism as the stream of particles continues to flow through the particle processing system based on an evaluation of the statistically-based characteristic of the sorted sample.

The predetermined sort performance criteria may include a baseline event rate or a baseline margin of error for one of the output branch channels. The method may include monitoring an individual output of one of the particle sorters, for example, detecting a presence or absence particles at a monitor region downstream of a first of the particle sorters. The method may include detecting a presence or absence of particles at a plurality of monitor regions. The method may include detecting a presence or absence of particles at a plurality of particle sorters. Further, the method may include evaluating in real-time a collective performance of the plurality of particle sorters.

According to some embodiments, a calibration sample or a small portion of an actual sample may be run through the particle processing system 100. Particles in the sample flowing through the microfluidic flow channel 330 may be interrogated at the primary particle interrogation site 314 and sorting decisions made on the basis of a sorting algorithm. The sorted sample (either the keep and/or the waste stream) may be interrogated or monitored downstream of the switching mechanism 500 at the secondary particle interrogation site 314a. Instructions based on a switching optimization algorithm may be provided to the switching mechanism 500 to implement the sorting decisions. The switching optimization algorithm may, for example, include a step of updating a switching mechanism operating parameter. In order to maintain optimum sort performance one or more operational parameters of the switching mechanism may be adjusted, e.g., switch timing, drive signal and/or surface acoustic wave frequency, surface acoustic wave location, drive signal waveform, pressure pulse force or acceleration, pulse width, pulse duration, etc.

As can be easily understood from the foregoing, the basic concepts of the present disclosure may be embodied in a variety of ways. As such, the particular embodiments or elements disclosed by the description or shown in the figures accompanying this application are not intended to be limiting, but rather illustrative of the numerous and varied embodiments generically encompassed by the present disclosure or equivalents encompassed with respect to any particular element thereof. In addition, the specific description of a single embodiment or element may not explicitly describe all embodiments or elements possible; many alternatives are implicitly disclosed by the description and figures. For example, any of the IDTs disclosed above may be provided as tapered, non-tapered, focused, unidirectional, chirped, tunable, etc. Even further, any of the IDTs disclosed above may be provided as a series of IDTs (either electrically chained or independently wired to a signal generator.

Unless defined otherwise, all technical and scientific terms used herein have the same meaning as commonly understood by one of ordinary skill in the art to which this disclosure belongs. It is also to be understood that the terminology used herein is for the purpose of describing particular embodiments only, and is not intended to be limiting, since the scope of the present disclosure will be limited only by the appended claims. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Moreover, for the purposes of the present disclosure, the term "a" or "an" entity refers to one or more of that entity. As such, the terms "a" or "an", "one or more" and "at least one" can be used interchangeably herein.

All numeric values herein are assumed to be modified by the term "about", whether or not explicitly indicated. As described herein, ranges may be expressed as from "about" one particular value to "about" another particular value. It will be understood that the endpoints of each of the ranges are significant both in relation to the other endpoint, and independently of the other endpoint. When a value is expressed as an approximation by use of the antecedent "about," it will be understood that the particular value forms another embodiment.

We claim:

1. A microfluidic particle processing chip assembly comprising;
    a substrate;
    a plurality of flow channels formed in the substrate, each flow channel having:
        a focusing region for focusing a flow of particles within the flow channel;
        an interrogation region at least partially downstream of the focusing region; and
        a switching region at least partially downstream of the interrogation region; and
    a plurality of switching surface acoustic wave generators formed on the substrate, each switching surface acoustic wave generator associated with one of the plurality of flow channels and configured to generate a surface acoustic wave in the substrate and a pressure pulse in the flow in the switching region of the flow channel.

2. The microfluidic particle processing chip assembly according to claim 1, further comprising a plurality of attenuation elements formed on the substrate, each attenuation element associated with one of the plurality of switching surface acoustic wave generators, the attenuation element configured to attenuate the transmission of the surface acoustic wave through the substrate.

3. The microfluidic particle processing chip assembly according to claim 2, wherein the attenuation element is configured to isolate the other flow channels from the surface acoustic wave generated in the substrate by the switching surface acoustic wave generator.

4. The microfluidic particle processing chip assembly according to claim 2, wherein the attenuation element includes an air-filled gap in the substrate.

5. The microfluidic particle processing chip assembly according to claim 1, wherein each switching surface acoustic wave generator includes an inter-digitated transducer.

6. The microfluidic particle processing chip assembly according to claim 1, further comprising a plurality of focusing surface acoustic wave generators formed on the substrate, each focusing surface acoustic wave generator associated with one of the plurality of flow channels and configured to generate a surface acoustic wave in the substrate and a standing pressure wave in the flow within the flow channel in the focusing region.

7. The microfluidic particle processing chip assembly according to claim 6, wherein each focusing surface acoustic wave generator includes an inter-digitated transducer.

8. The microfluidic particle processing chip assembly according to claim 6, wherein each focusing surface acoustic wave generator includes a pair of inter-digitated transducers one on each side of the focusing region.

9. The microfluidic particle processing chip assembly according to claim 1, wherein each of the plurality of flow channels includes a pulse dampening element in the switching region.

10. The microfluidic particle processing chip assembly according to claim 1, wherein substrate includes a piezoelectric material layer and the plurality of switching surface acoustic wave generators are formed on the piezoelectric material layer.

11. A microfluidic particle processing chip assembly comprising;
  a substrate;
  at least one flow channel formed in the substrate, the flow channel having an interrogation region, a switching region and a first branch channel, wherein a flow within the interrogation region has a first flow direction and flow within the first branch channel has a branch flow direction; and
  a switching surface acoustic wave generator assembly formed on the substrate and associated with the switching region of the flow channel, the switching surface acoustic wave generator assembly configured to selectively generate a surface acoustic wave in the substrate and a pressure pulse in the flow in the switching region of the flow channel;
  wherein the surface acoustic wave is substantially aligned with the first flow direction within the interrogation region.

12. The microfluidic particle processing chip assembly according to claim 11, wherein the surface acoustic wave is substantially aligned with the branch flow direction of the branch channel.

13. The microfluidic particle processing chip assembly according to claim 11, wherein the at least one flow channel includes a plurality of substantially identical flow channels, and wherein the switching surface acoustic wave generator assembly is configured to selectively generate a surface acoustic wave in the substrate for each of the plurality of flow channels.

14. The microfluidic particle processing chip assembly according to claim 13, wherein the switching surface acoustic wave generator assembly includes a plurality of surface acoustic wave actuators, each switching surface acoustic wave actuator configured to generate a surface acoustic wave in the substrate for one of the plurality of flow channels.

15. A microfluidic particle processing system comprising;
  a microfluidic chip assembly including:
    a chip substrate provided with a plurality of flow channels formed in a substrate, each flow channel having a focusing region for focusing a flow of particles within the flow channel, an inspection region at least partially downstream of the focusing region, and a switching region at least partially downstream of the inspection region; and
  a particle processing instrument including:
    a switching surface acoustic wave generator assembly formed on a switching substrate associated with the instrument and configured to generate at least one surface acoustic wave in the switching substrate,
  wherein the microfluidic chip assembly is configured for operative engagement via the at least one switching coupling element with the particle processing instrument, the operative engagement providing for transmission of acoustic energy from the switching surface acoustic wave generator assembly to at least one switching region of at least one flow channel, wherein the transmitted acoustic energy generates a pressure pulse in the flow in the switching region of the flow channel, and
  wherein the microfluidic chip assembly is further configured for disengagement from the particle processing instrument.

16. The microfluidic particle processing system according to claim 15, wherein the switching surface acoustic wave generator assembly includes a plurality of switching surface acoustic wave actuators.

17. The microfluidic particle processing system according to claim 15, wherein the switching surface acoustic wave generator assembly includes a switching surface acoustic wave actuator that selectively generates a plurality of surface acoustic waves in the switching substrate.

18. The microfluidic particle processing system according to claim 15, further comprising at least one switching coupling element configured to transmit the acoustic energy from the switching surface acoustic wave generator assembly to the microfluidic chip assembly.

19. The microfluidic particle processing system according to claim 15, further comprising at least one switching transmissive element configured to direct the acoustic energy from the switching surface acoustic wave generator assembly to at least one switching region of at least one flow channel.

20. The microfluidic particle processing system according to claim 15, wherein the particle processing instrument further includes:
  a focusing surface acoustic wave generator assembly formed on a focusing substrate associated with the particle processing instrument and configured to generate a surface acoustic wave in the focusing substrate and a standing pressure wave in the flow in the focusing region of the flow channel; and
  at least one focusing coupling element configured to transmit acoustic energy from the focusing surface acoustic wave generator assembly to the focusing region of each of the flow channels,
  wherein the microfluidic chip assembly is configured for operative engagement via the at least one focusing coupling element with the particle processing instrument.

* * * * *